US012699530B2

(12) United States Patent
Kanno

(10) Patent No.: US 12,699,530 B2
(45) Date of Patent: Aug. 4, 2026

(54) MEMORY SYSTEM AND CONTROL METHOD

(71) Applicant: KIOXIA CORPORATION, Tokyo (JP)

(72) Inventor: Shinichi Kanno, Ota (JP)

(73) Assignee: KIOXIA CORPORATION, Tokyo (JP)

( * ) Notice: Subject to any disclaimer, the term of this patent is extended or adjusted under 35 U.S.C. 154(b) by 55 days.

(21) Appl. No.: 18/735,865

(22) Filed: Jun. 6, 2024

(65) Prior Publication Data

US 2024/0319924 A1     Sep. 26, 2024

Related U.S. Application Data

(63) Continuation of application No. 18/312,978, filed on May 5, 2023, now Pat. No. 12,045,515, which is a
(Continued)

(30) Foreign Application Priority Data

Sep. 19, 2018     (JP) ................................. 2018-175148

(51) Int. Cl.
*G06F 3/06* (2006.01)
*G06F 11/07* (2006.01)

(52) U.S. Cl.
CPC .......... *G06F 3/0659* (2013.01); *G06F 3/0604* (2013.01); *G06F 3/0634* (2013.01);
(Continued)

(58) Field of Classification Search
CPC .... G06F 3/0659; G06F 3/0604; G06F 3/0634; G06F 3/0679; G06F 11/073;
(Continued)

(56) References Cited

U.S. PATENT DOCUMENTS

2005/0135180 A1* 6/2005 Roohparvar ........... G11C 16/10
                                                   365/230.06
2010/0023672 A1 1/2010 Gorobets
(Continued)

FOREIGN PATENT DOCUMENTS

JP     2015-532985     11/2015
JP     2017-162065 A     9/2017

OTHER PUBLICATIONS

Wikipedia "flash memory" page, retrieved from https://en.wikipedia.org/wiki/Flash_memory#NAND_flash (Year: 2025).*
(Continued)

*Primary Examiner* — Yair Leibovich
(74) *Attorney, Agent, or Firm* — Oblon, McClelland, Maier & Neustadt, L.L.P.

(57) ABSTRACT

According to one embodiment, a memory system is connectable to a host. The memory system includes a nonvolatile memory and a controller. The nonvolatile memory includes a plurality of blocks. The controller is electrically coupled to the nonvolatile memory. The controller controls the nonvolatile memory. When receiving, from the host, a first command for changing a state of an allocated block to a reallocatable state in a case where a second command that is yet to be executed or being executed involving read of data from the allocated block has been received from the host, the controller changes the state of the allocated block to the reallocatable state after the second command is finished.

20 Claims, 46 Drawing Sheets

Related U.S. Application Data continuation of application No. 17/554,092, filed on Dec. 17, 2021, now Pat. No. 11,681,473, which is a continuation of application No. 16/353,293, filed on Mar. 14, 2019, now Pat. No. 11,237,759.

(52) U.S. Cl.
CPC .......... *G06F 3/0679* (2013.01); *G06F 11/073* (2013.01); *G06F 11/0751* (2013.01); *G06F 11/0772* (2013.01)

(58) Field of Classification Search
CPC ............. G06F 11/0751; G06F 11/0772; G06F 2201/815; G06F 2201/88; G06F 2212/1016; G06F 2212/1032; G06F 3/061; G06F 3/0616; G06F 3/064; G06F 11/0727; G06F 11/0793; G06F 11/3034; G06F 12/0246; G06F 3/0688; G06F 2212/7202; G06F 2212/7203; G06F 2212/7205; G06F 2212/7208
USPC ......................................................... 714/57
See application file for complete search history.

(56) References Cited

U.S. PATENT DOCUMENTS

| | | |
|---|---|---|
| 2010/0039861 A1 | 2/2010 | Park |
| 2010/0169452 A1 | 7/2010 | Atluri |
| 2011/0296420 A1 | 12/2011 | Pegushin |
| 2012/0224425 A1 | 9/2012 | Fai |
| 2013/0067294 A1 | 3/2013 | Flynn et al. |
| 2013/0268720 A1* | 10/2013 | Ito ...................... H04L 67/1097 |
| | | 711/E12.008 |
| 2014/0215129 A1 | 7/2014 | Kuzmin |
| 2015/0181760 A1 | 6/2015 | Stephens |
| 2015/0181774 A1 | 6/2015 | Baetz et al. |
| 2015/0212937 A1 | 7/2015 | Stephens |
| 2015/0222705 A1 | 8/2015 | Stephens |
| 2016/0188223 A1* | 6/2016 | Camp ................... G06F 3/0653 |
| | | 711/103 |
| 2017/0180477 A1 | 6/2017 | Hasimoto |
| 2017/0262175 A1 | 9/2017 | Kanno |
| 2017/0262365 A1 | 9/2017 | Kanno |
| 2018/0188970 A1* | 7/2018 | Liu ...................... G06F 3/0653 |
| 2019/0004710 A1 | 1/2019 | Ebsen |

OTHER PUBLICATIONS

Yiying Zhang, et al. "De-indirection for Flash-based SSDs with Nameless Writes", 10th USENIX Conference on File and Storage Technologies (FAST '12), Feb. 14-17, 2012, downloaded on Sep. 13, 2017 from: https://www.usenix.org/system/files/conference/fast12/zhang.pdf, 16 pages.
Wikipedia "Memory segmentation page" from date Apr. 7, 2018, retrieved using the Way Back Machine from https://web.archive.org/web/20180407025923/https://en.wikipedia.org/wiki/Memory_segmentation (Year: 2018).
Wikipedia "Backup" from date Apr. 9, 2018, retrieved using the Way Back Machine from https://web.archive.org/web/20180409002826/https://en.wikipedia.org/wiki/Backup (Year: 2018).
Wikipedia "memory management" page, retrieved from https://en.wikipedia.org/wiki/Memory_management#ALLOCATION (Year: 2021).

* cited by examiner

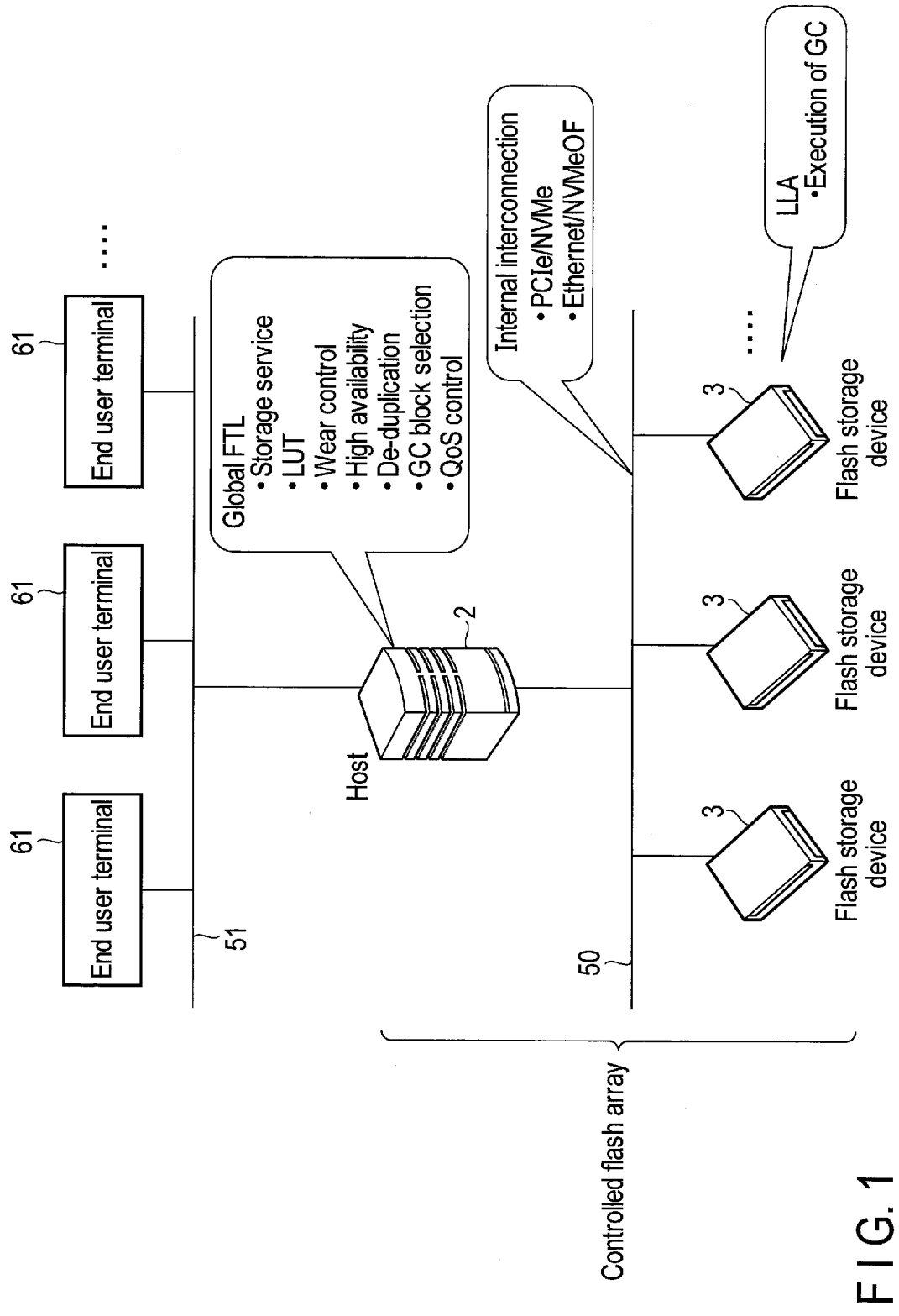
F I G. 1

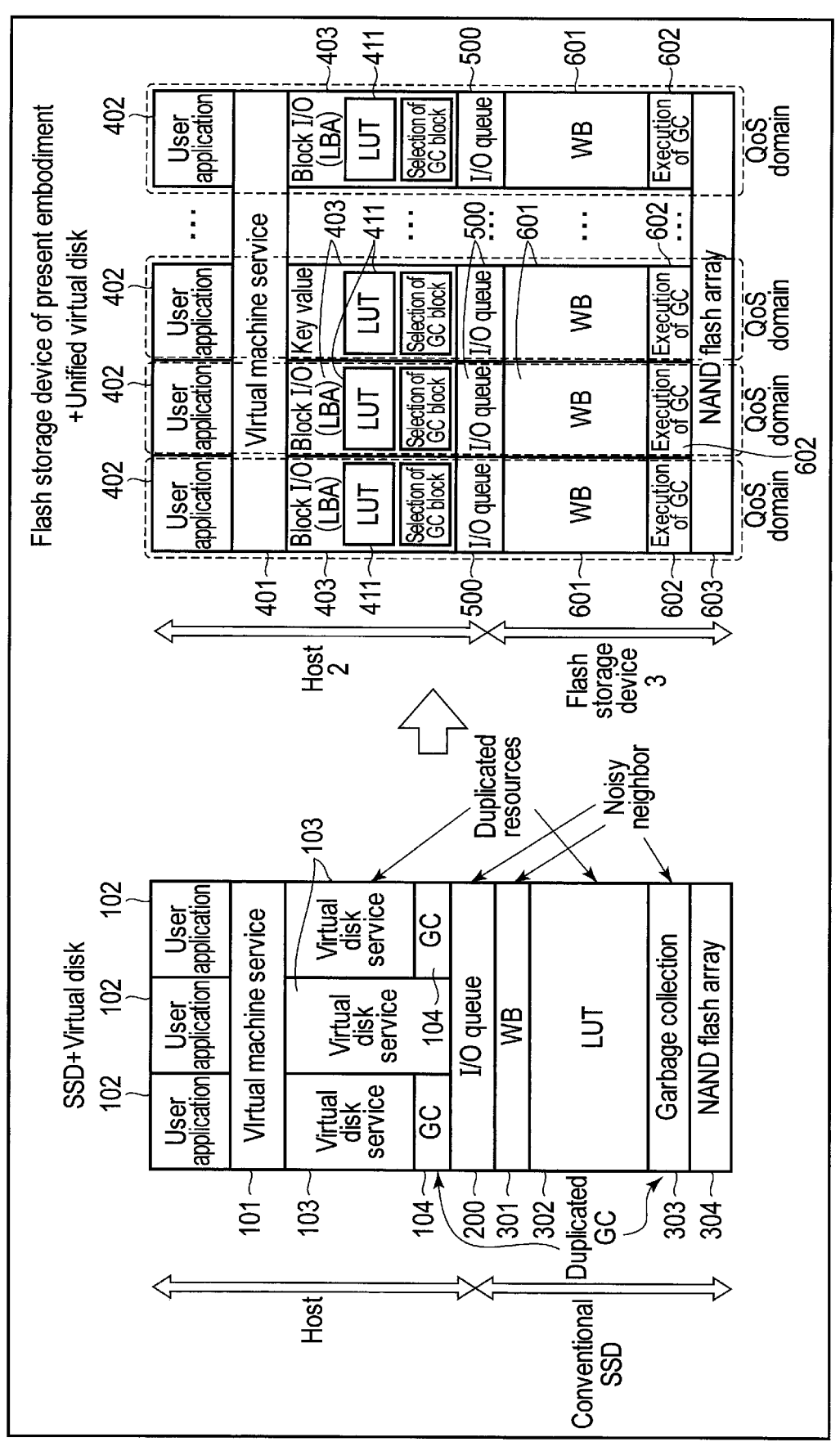
F I G. 2

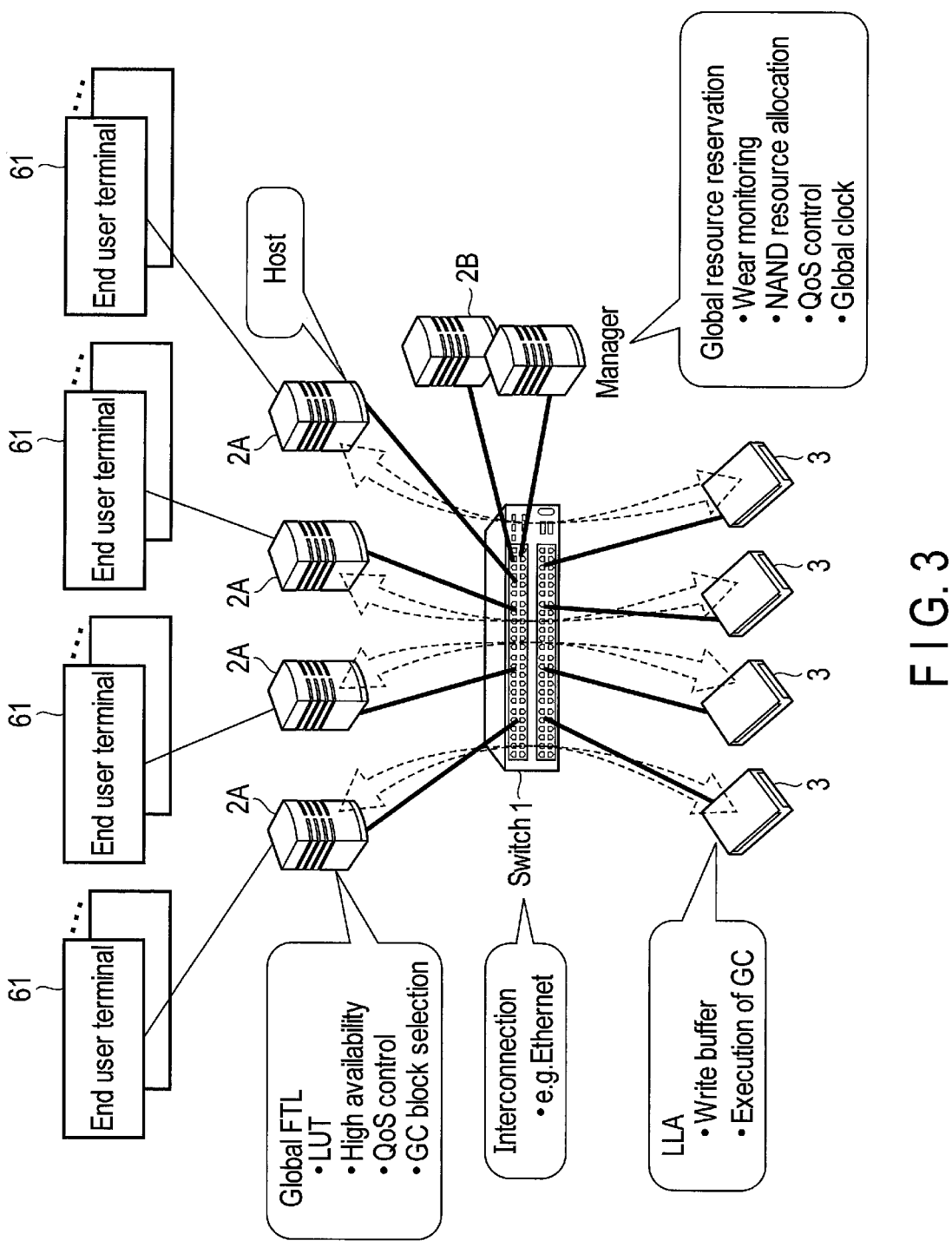
F I G. 3

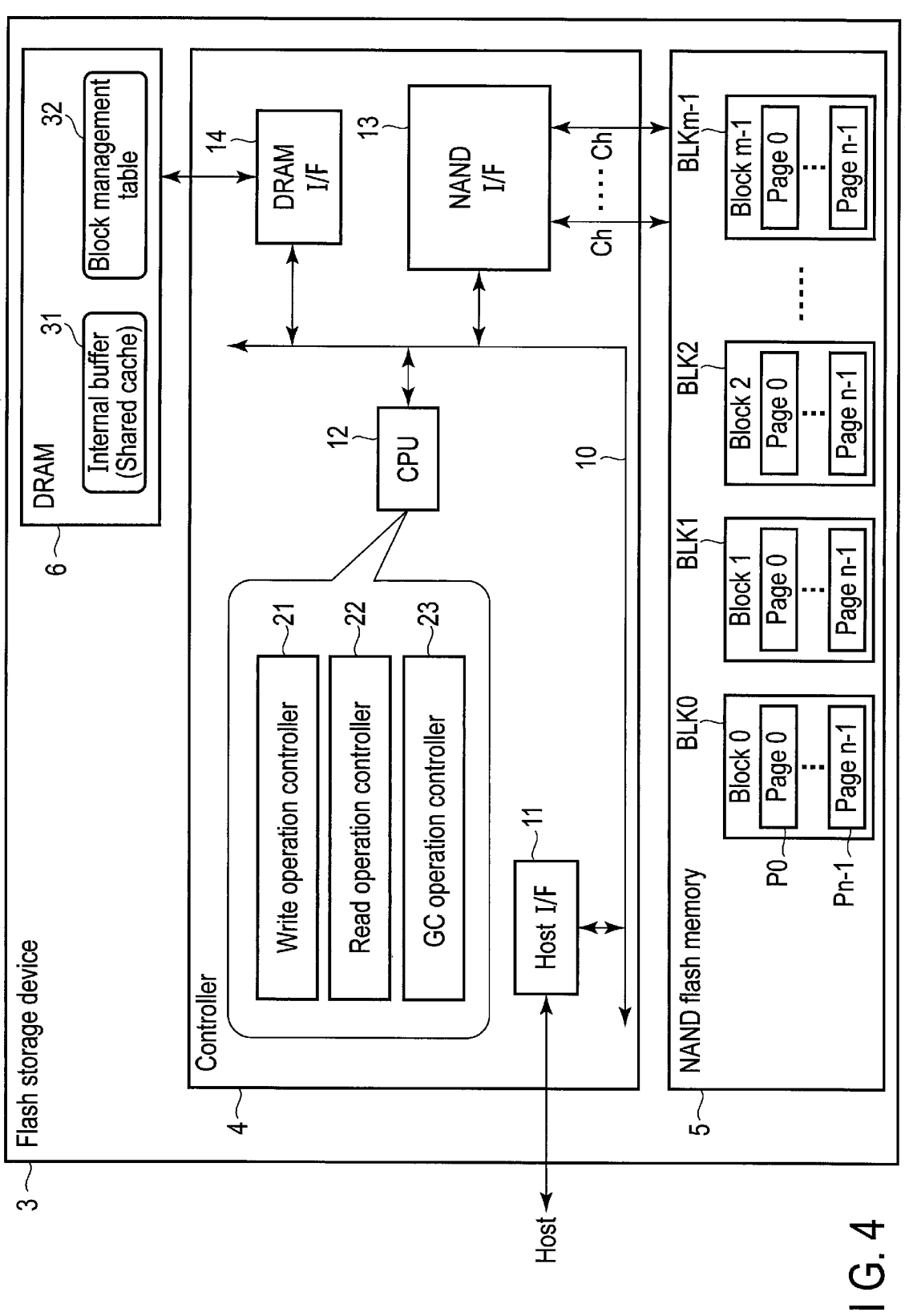
F I G. 4

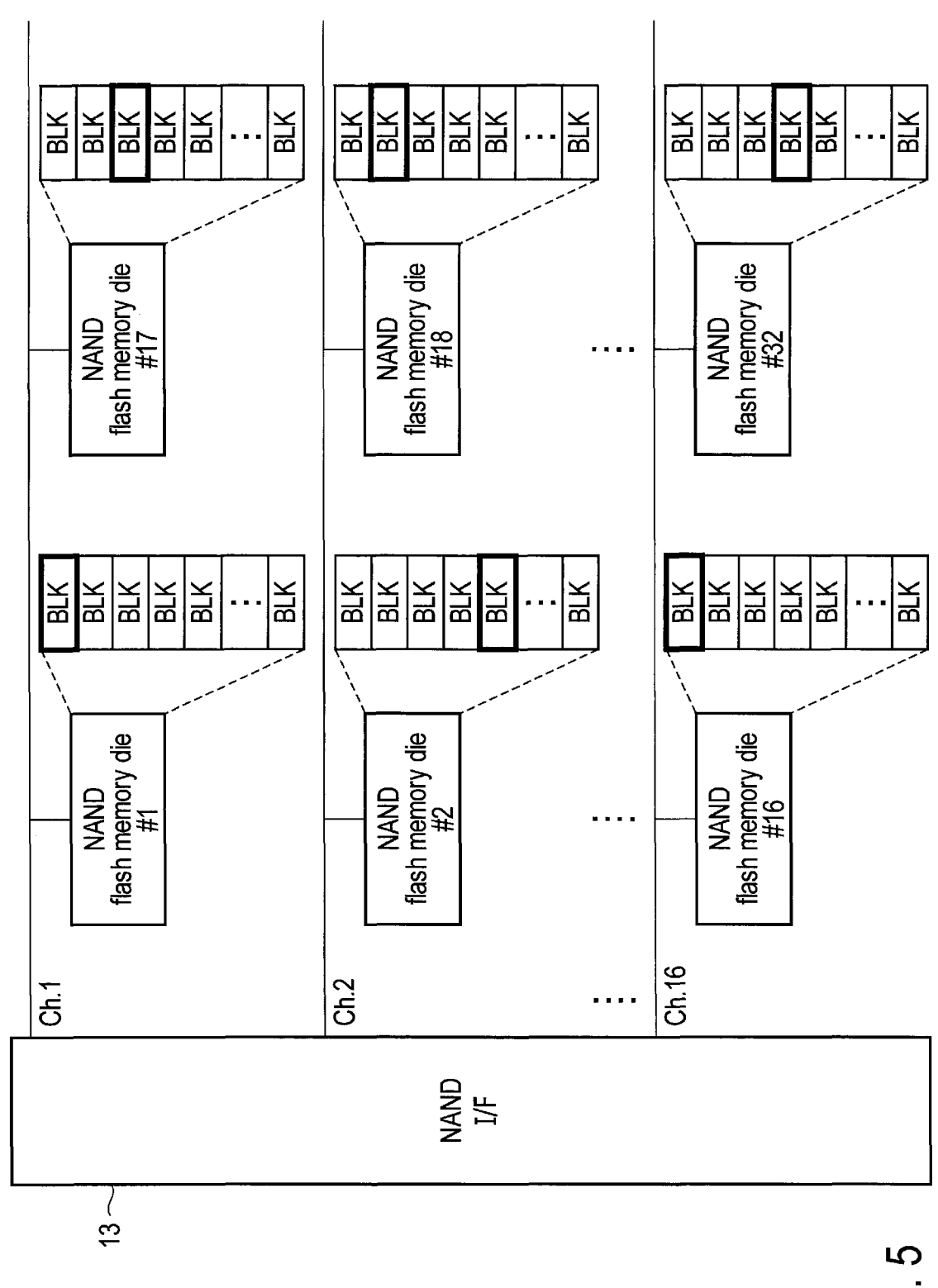
F I G. 5

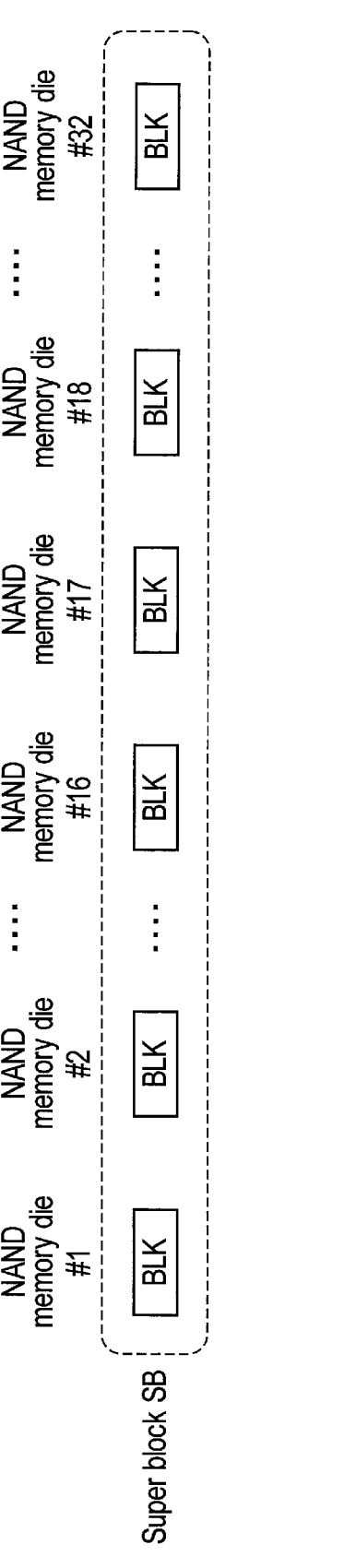
F I G. 6

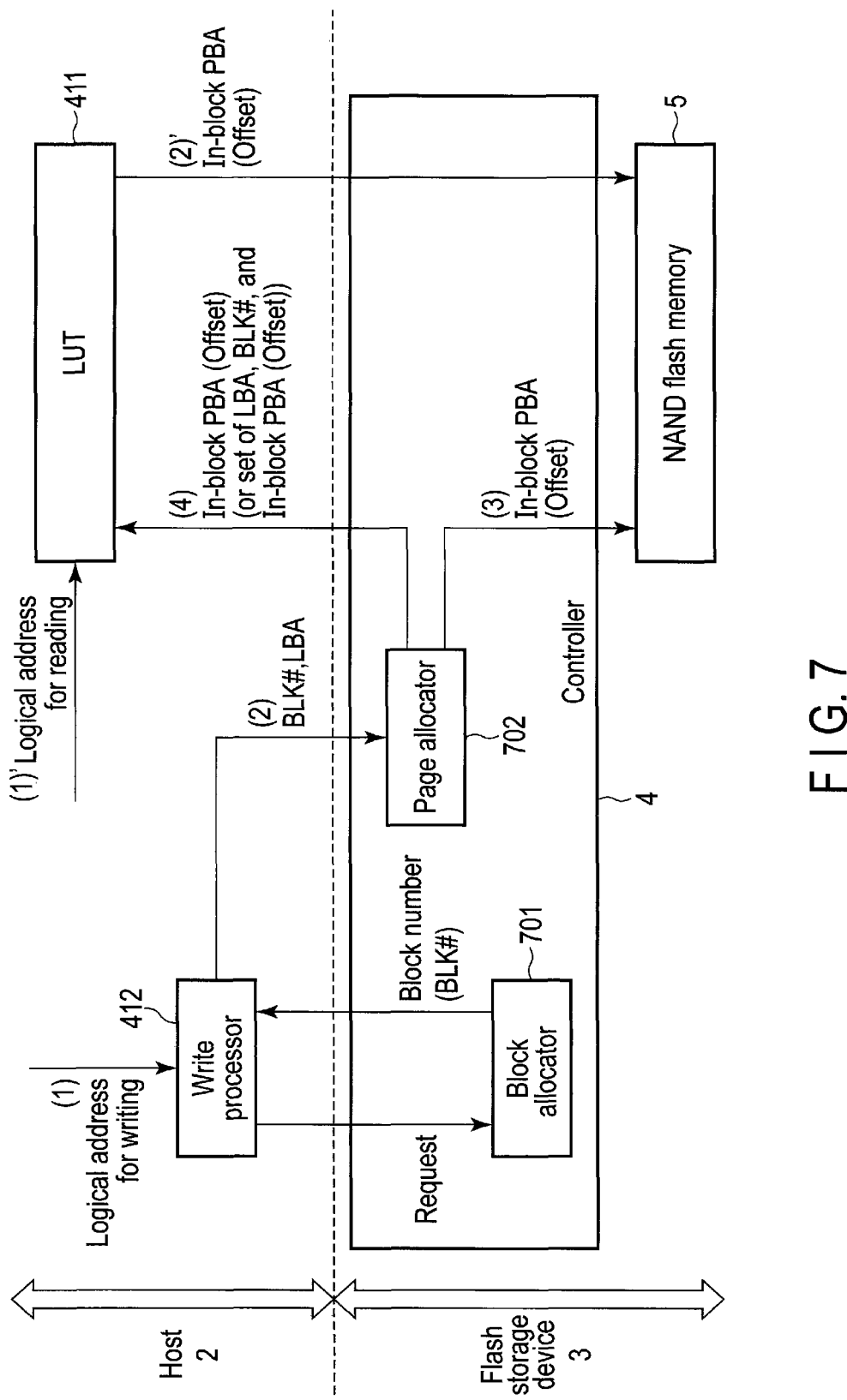
F I G. 7

Write command

| | Description |
|---|---|
| Command ID | Command ID for write command |
| Block number (BLK#) | Physical address designating block to which data is to be written |
| Logical address | Logical address indicates first logical position at which data is to be written |
| Length | Size of data to be written |

F I G. 8

Response to write command

| | Description |
|---|---|
| In-block physical address | In-block physical address indicates position in block to which data is written. In-block physical address can be designated by in-block offset. |
| Length | Length of written data (data length can be designated by number of Grains) |

F I G. 9

Trim command (Physical address can be designated)

| | Description |
|---|---|
| Command ID | Command ID for Trim command |
| Physical address | Physical address indicates first physical storage position at which data to be invalidated is stored. Physical address can be designated by block number and offset. |
| Length | Length of data to be invalidated (data length can be designated by number of Grains) |

F I G. 10

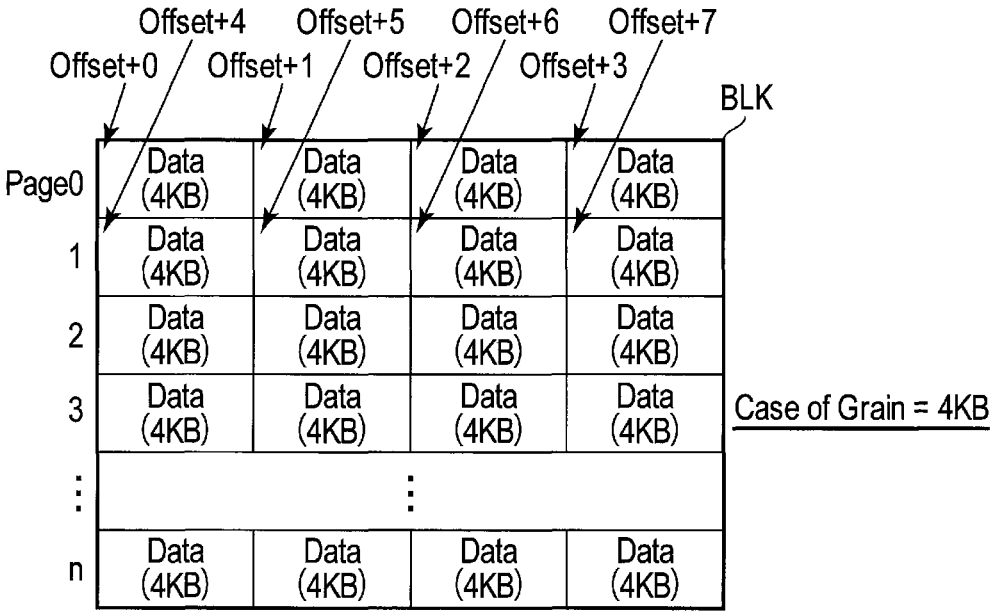
F I G. 11
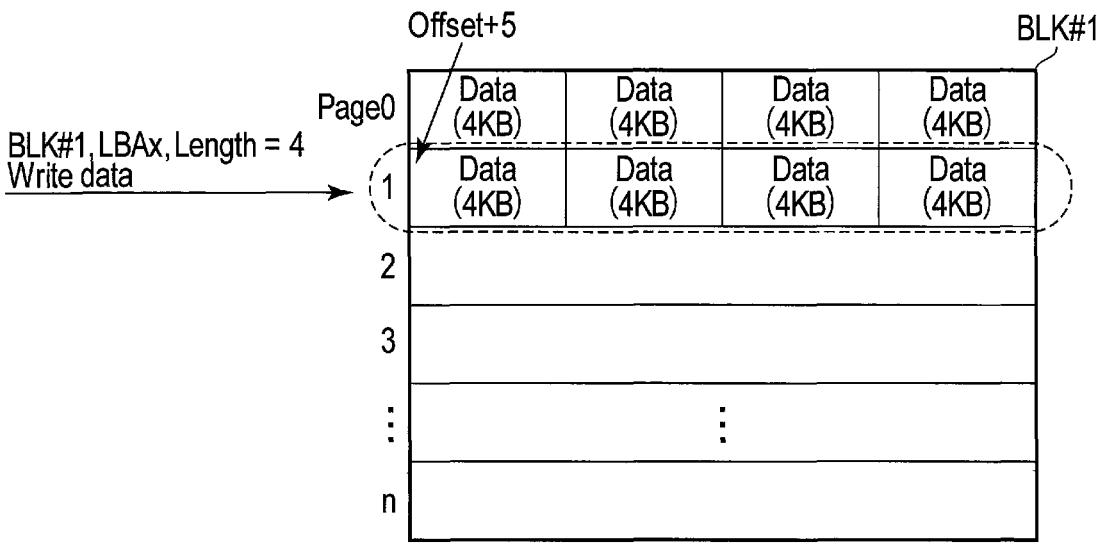
F I G. 12

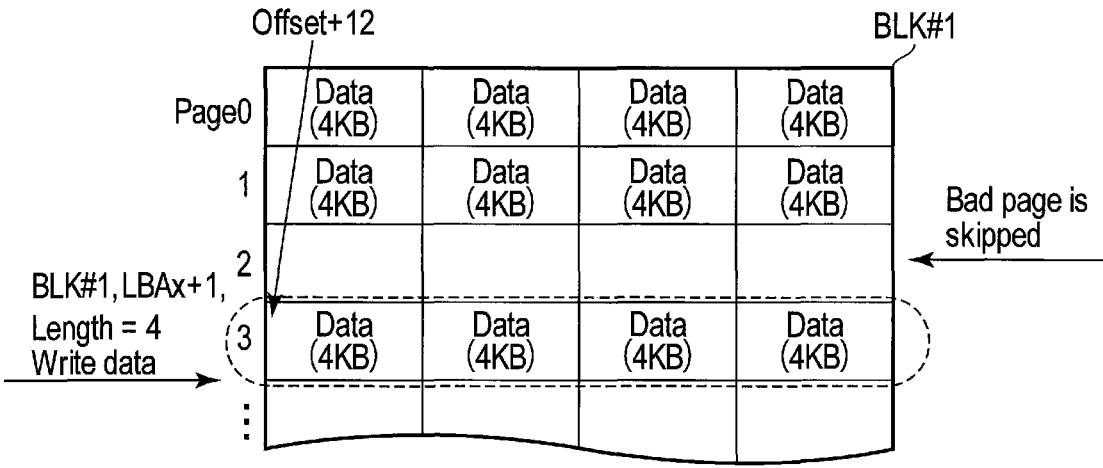
F I G. 13
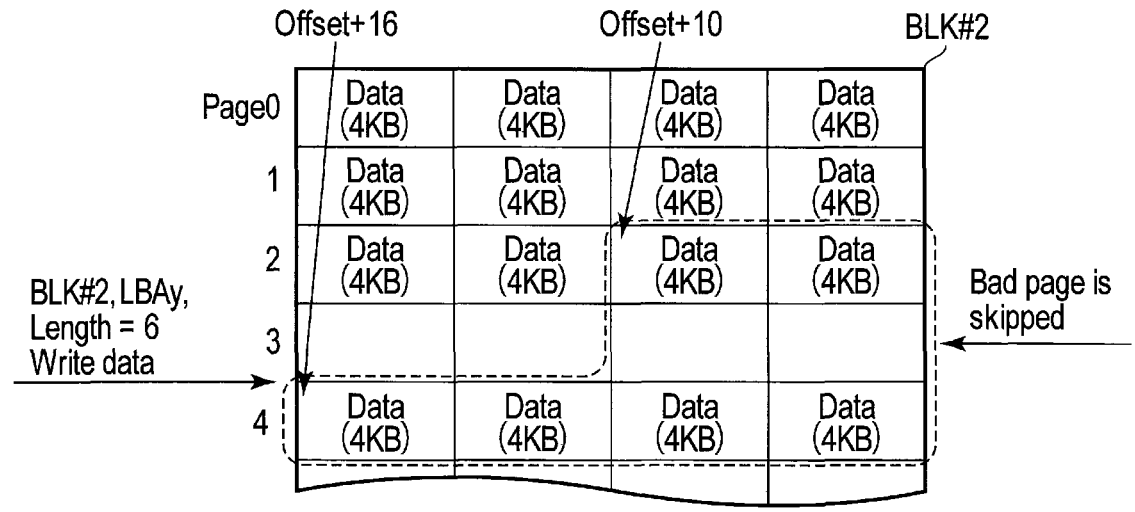
F I G. 14

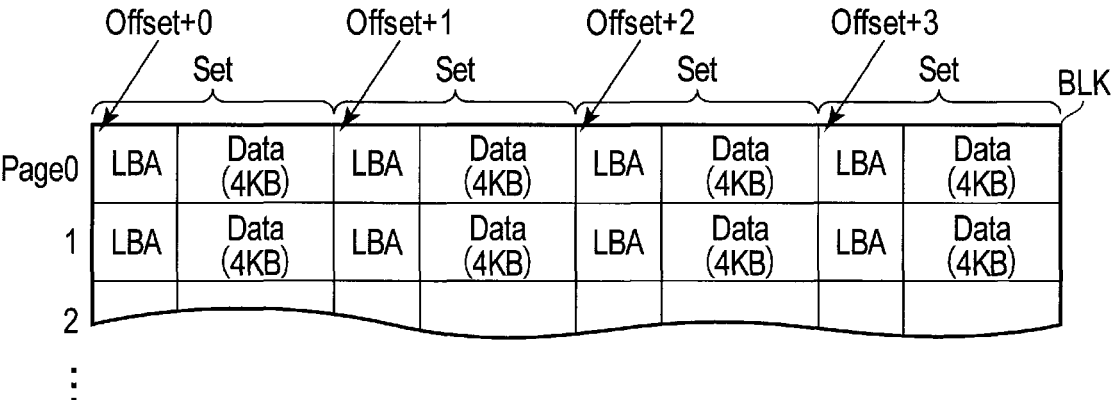
F I G. 15
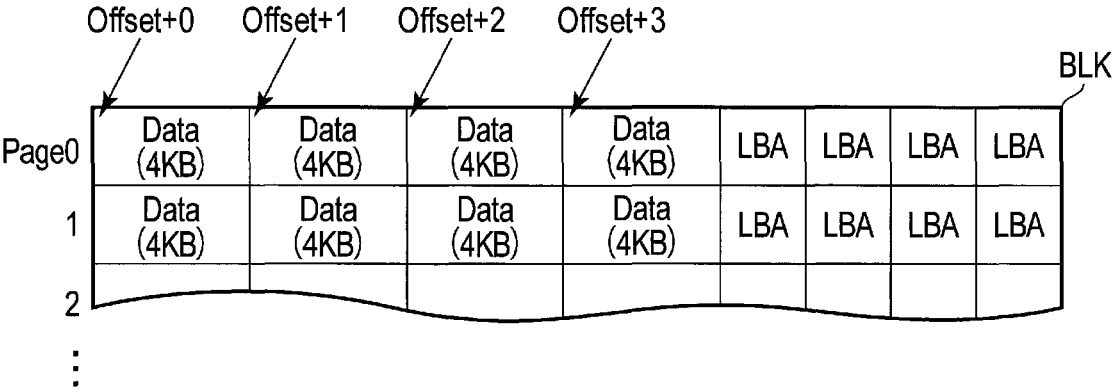
F I G. 16

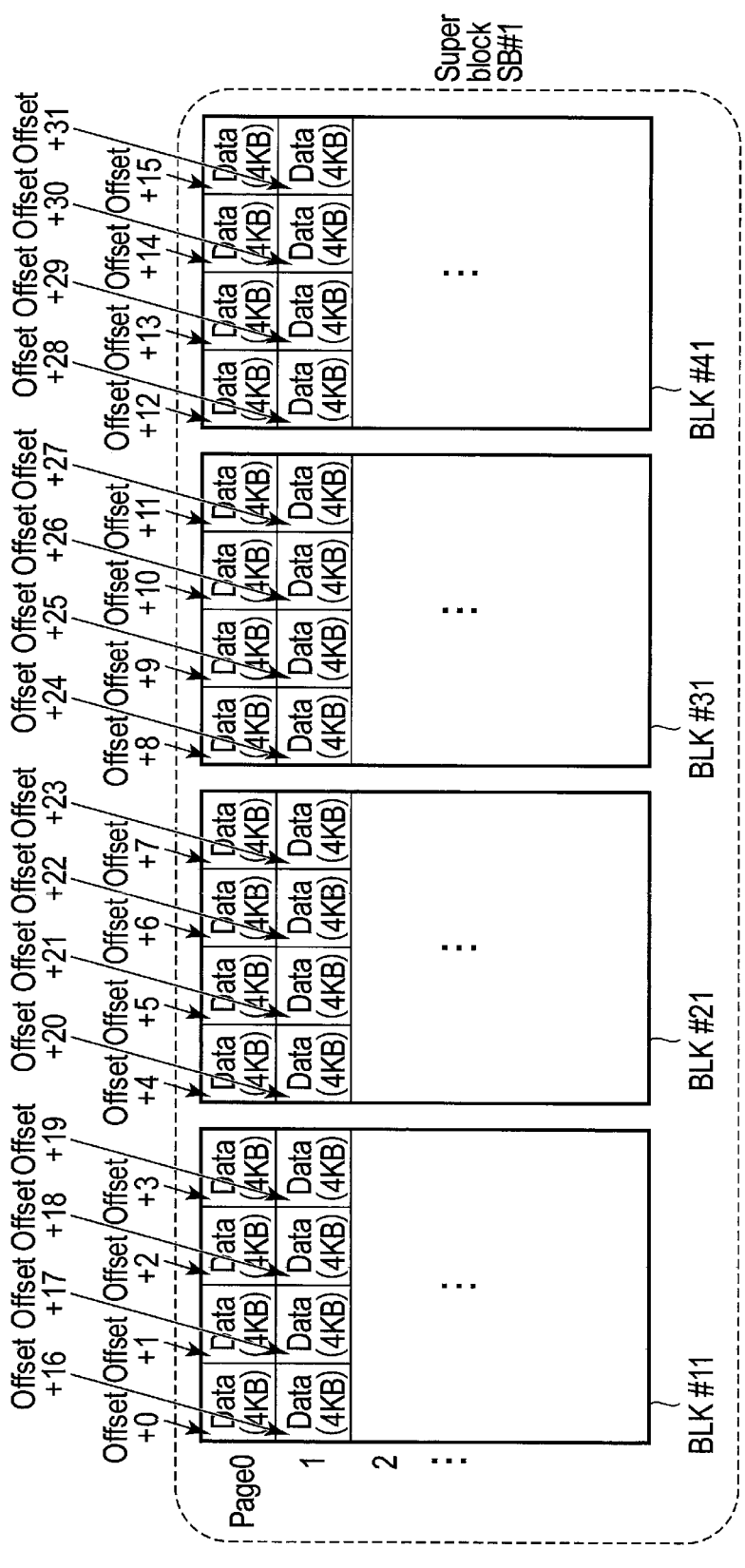
F I G. 17

Maximum block number get command

| | Description |
|---|---|
| Command ID | Command ID for maximum block number get |
| No parameter | |

F I G. 18

Response to maximum block number get command

| | Description |
|---|---|
| Maximum block number | Maximum block number indicates maximum value of in-device block umber (that is, number of available blocks that exist in device) |

F I G. 19

Block size get command

| | Description |
|---|---|
| Command ID | Command ID for block size get |
| (Optional) block number | |

F I G. 20

Response to block size get command

| | Description |
|---|---|
| Block size | When block number is designated, device returns size of block corresponding to designated block number to host |

F I G. 21

Block allocate command

| | Description |
|---|---|
| Command ID | Command ID for block allocate |
| | Host requests device to allocate free block, and, in this manner, can acquire block number from device |

F I G. 22

Response to block allocate command

| | Description |
|---|---|
| Block number | Device selects block to be allocated to host from free block list, and returns block number of selected block to host |

F I G. 23

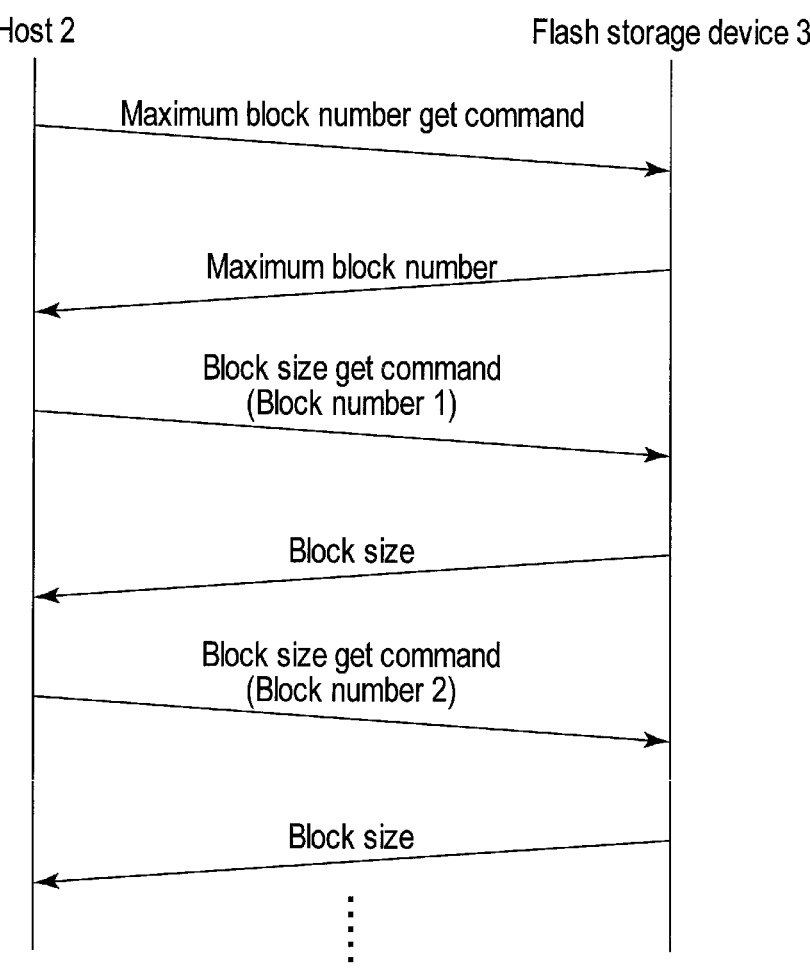
F I G. 24

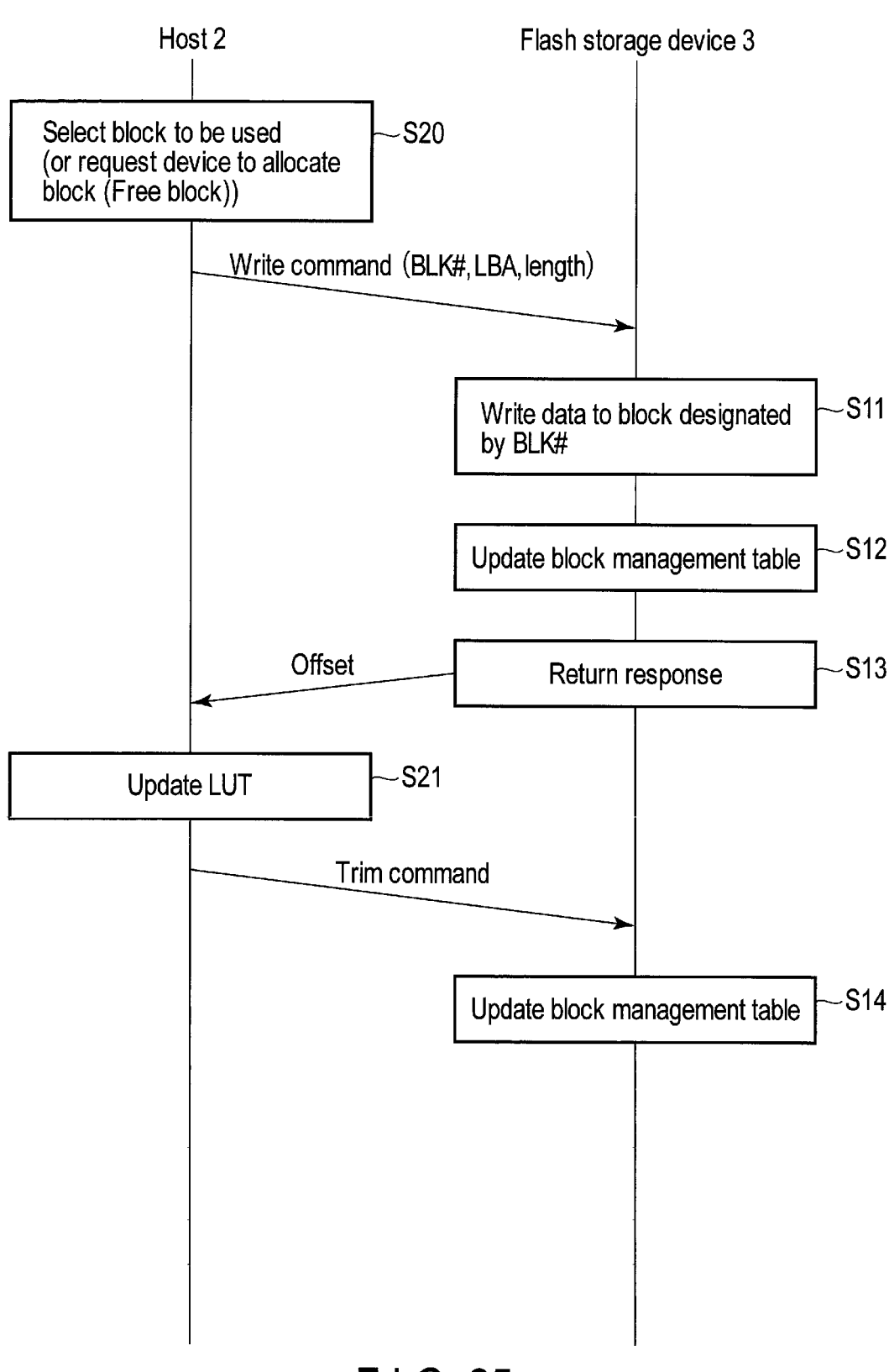
F I G. 25

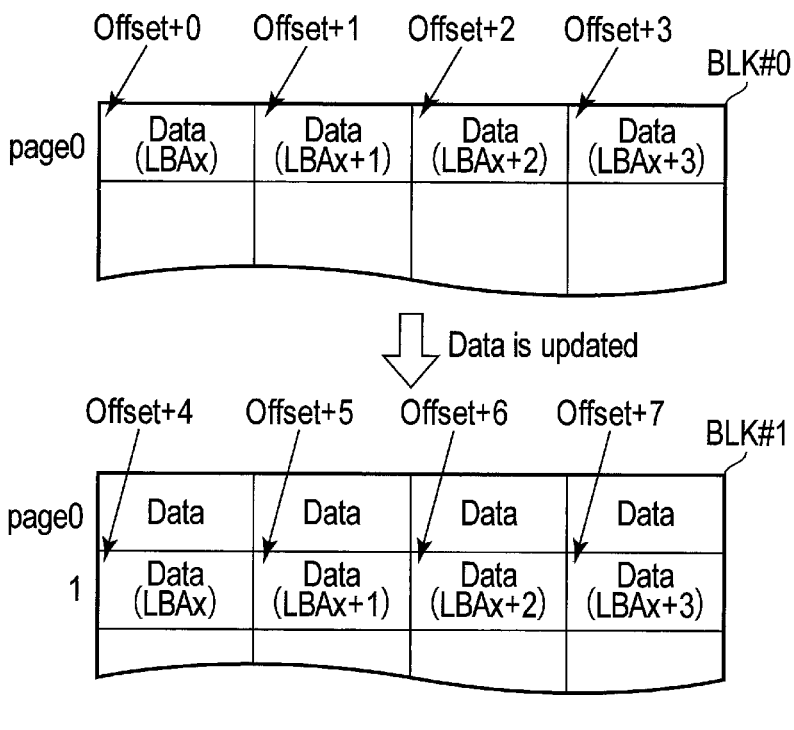
F I G. 26
Block management table for BLK#1
| | |
|---|---|
| Offset+0 | 1 |
| +1 | 1 |
| +2 | 1 |
| +3 | 1 |
| +4 | 0→1 |
| +5 | 0→1 |
| +6 | 0→1 |
| +7 | 0→1 |
| +8 | 0 |
| +9 | 0 |
| ⋮ | ⋮ |
0:Invalid
1:Valid
F I G. 27

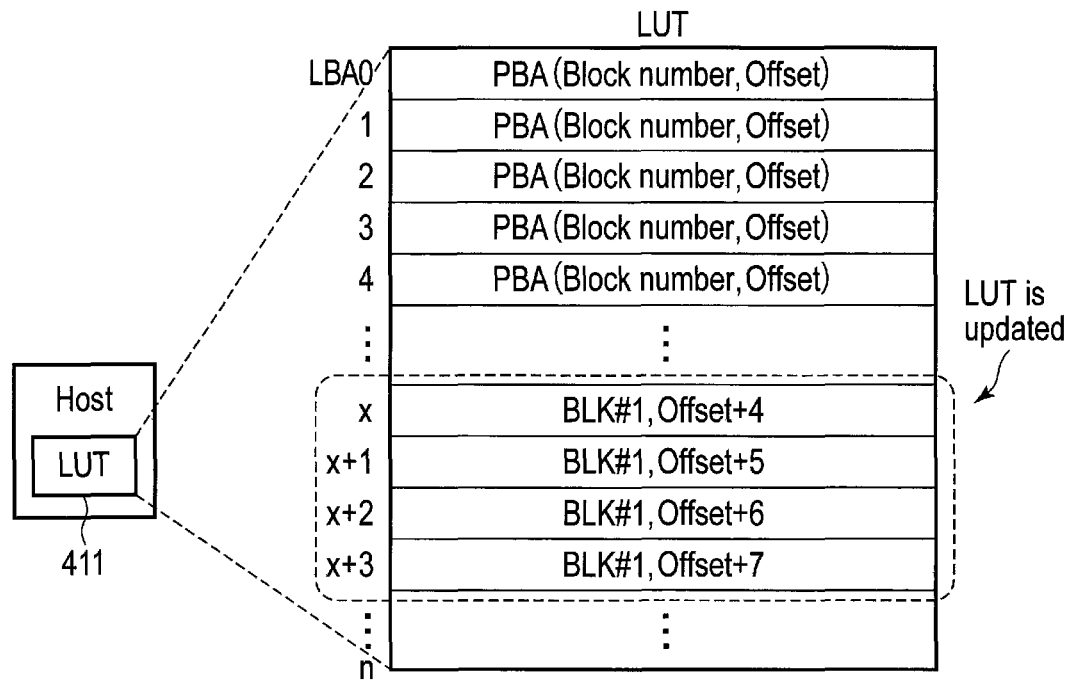
F I G. 28
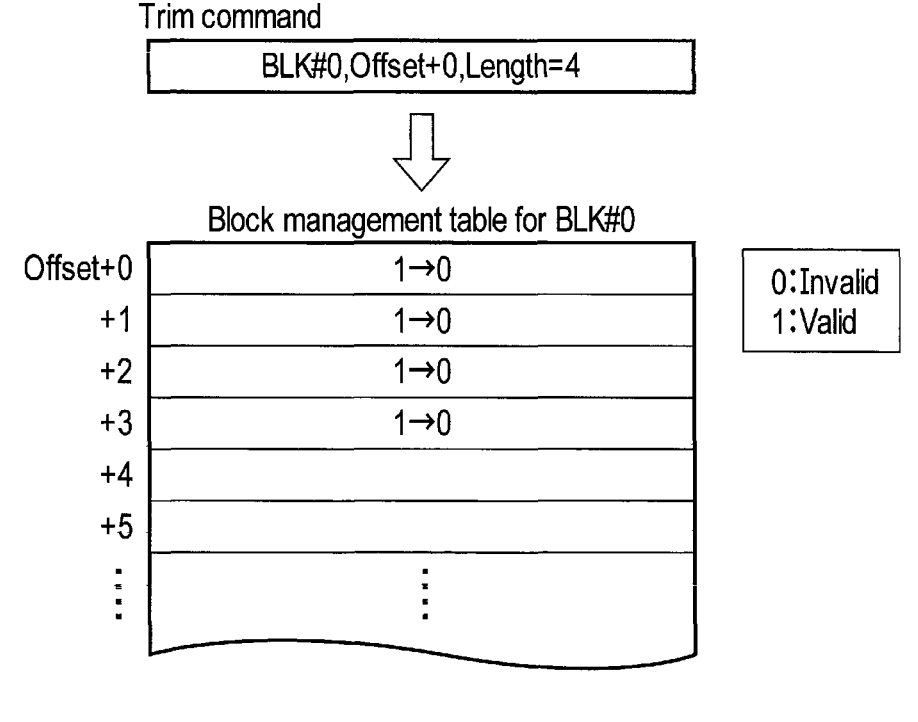
F I G. 29

Read command

| | Description |
|---|---|
| Command ID | Command ID for read command |
| Physical address (PBA)#1 | Physical address indicates first physical storage position from which data is to be read<br>Physical address can be designated by block number and offset. |
| Length#1 | Length of data to be read<br>(data length can be designated by number of Grains) |
| Physical address (PBA)#2 | Physical address indicates first physical storage position from which data is to be read out.<br>Physical address can be designated by block number and offset. |
| Length#2 | Length of data to be read<br>(data length can be designated by number of Grains) |
| Transfer destination pointer | Position in host memory to which read data is to be transferred |

F I G. 30

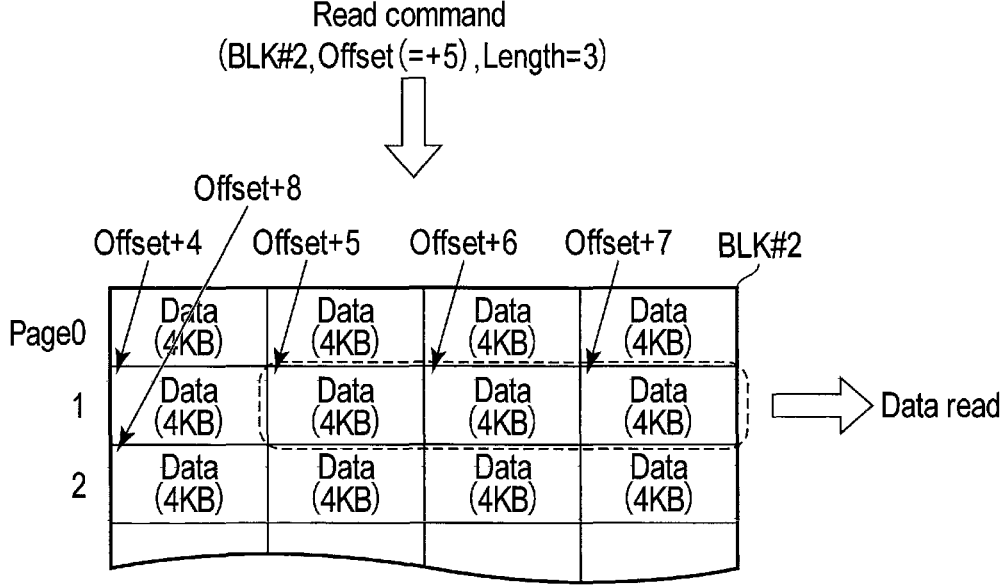

Read command
(BLK#2, Offset (=+5), Length=3)

F I G. 31

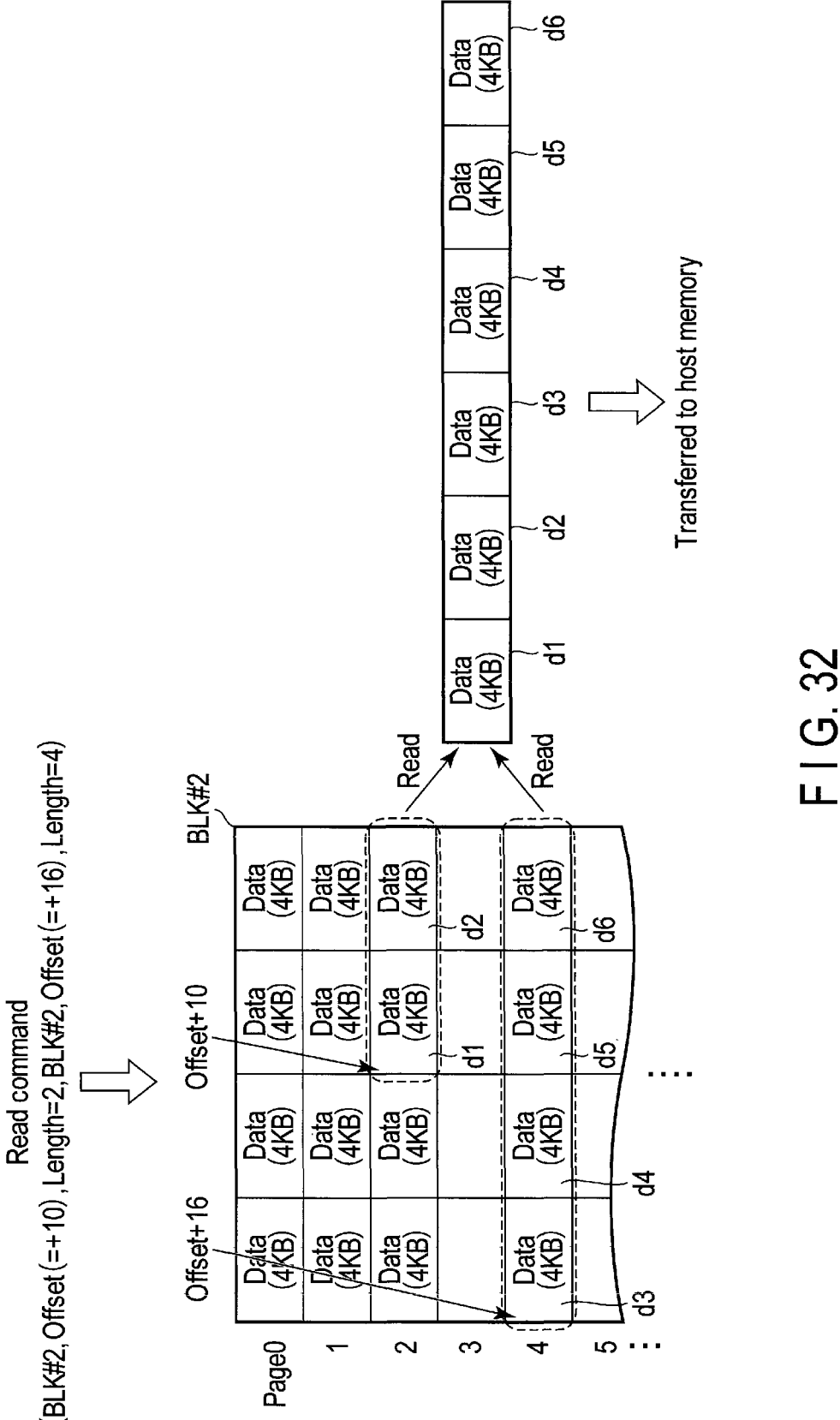
F I G. 32

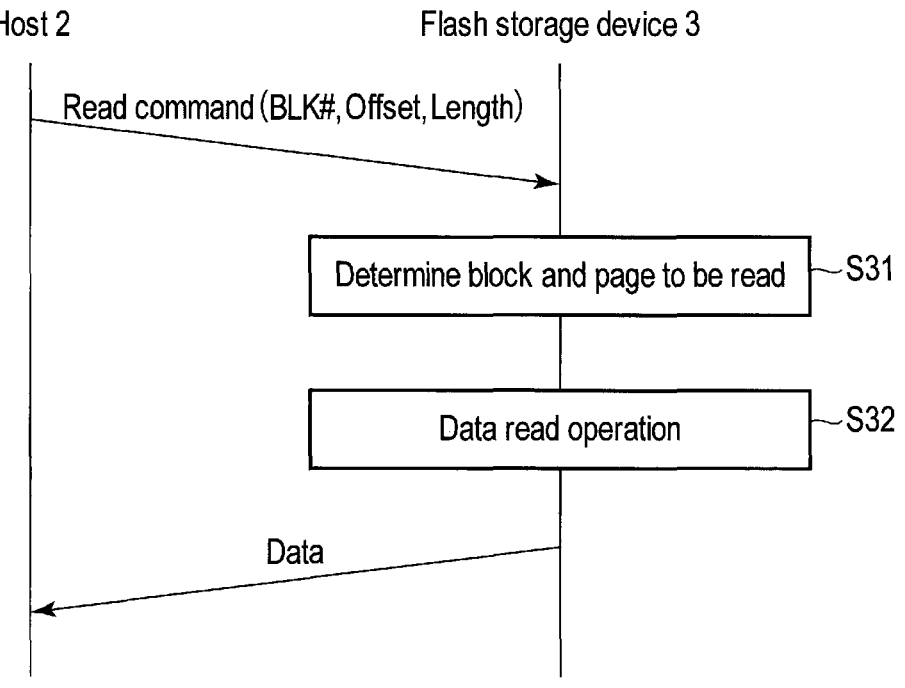

Host 2　　　　　　　　　　Flash storage device 3

Read command (BLK#, Offset, Length)

| Determine block and page to be read | ~S31 |

| Data read operation | ~S32 |

Data

F I G. 33

GC control command

|  | Description |
|---|---|
| Command ID | Command ID for GC control |
| GC source block number (BLK#) | Host can designate which block is to be set as GC source block. Host can designate plurality of GC source block numbers. |
| GC destination block number (BLK#) | Host can designate which block is to be set as GC destination block. Host can designate plurality of GC destination block numbers. |

F I G. 34

GC callback command

| | Description |
|---|---|
| Command ID | Command ID for GC callback |
| Logical address | Logical address of copied valid data |
| Length | Length of copied valid data |
| Destination physical address | Destination physical address indicates position in GC destination block to which valid data is copied. Destination physical address can be designated by block number and offset. |

F I G. 35

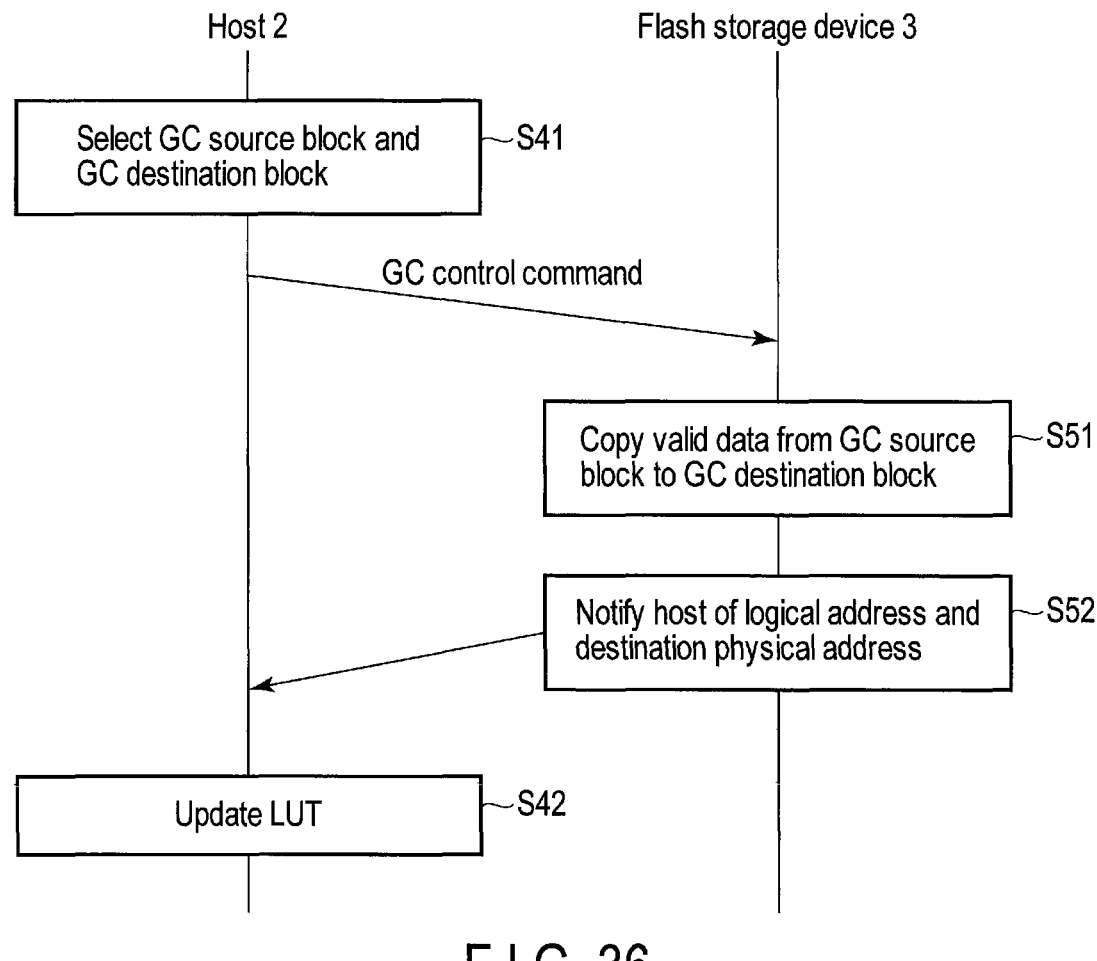

F I G. 36

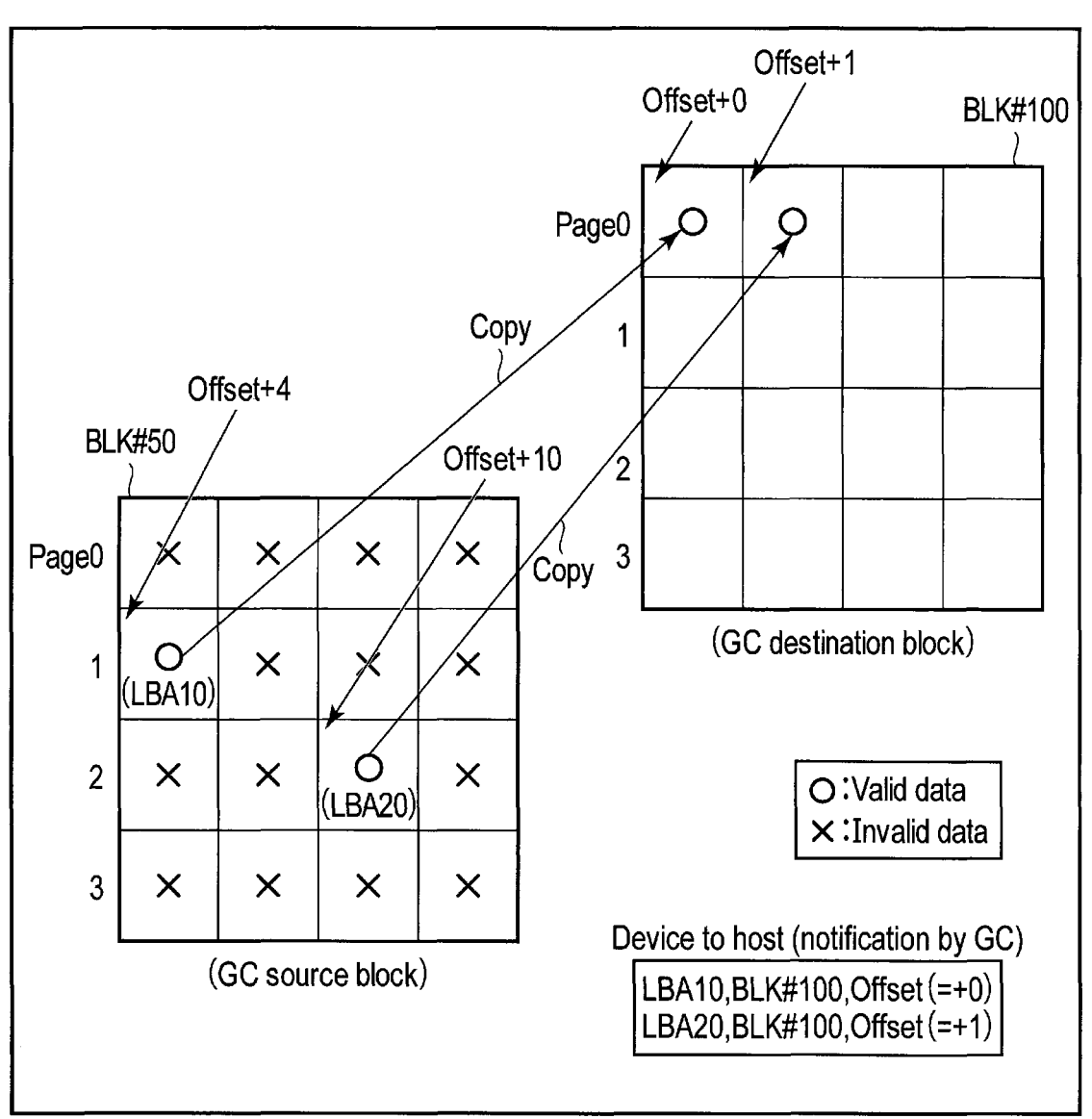
F I G. 37

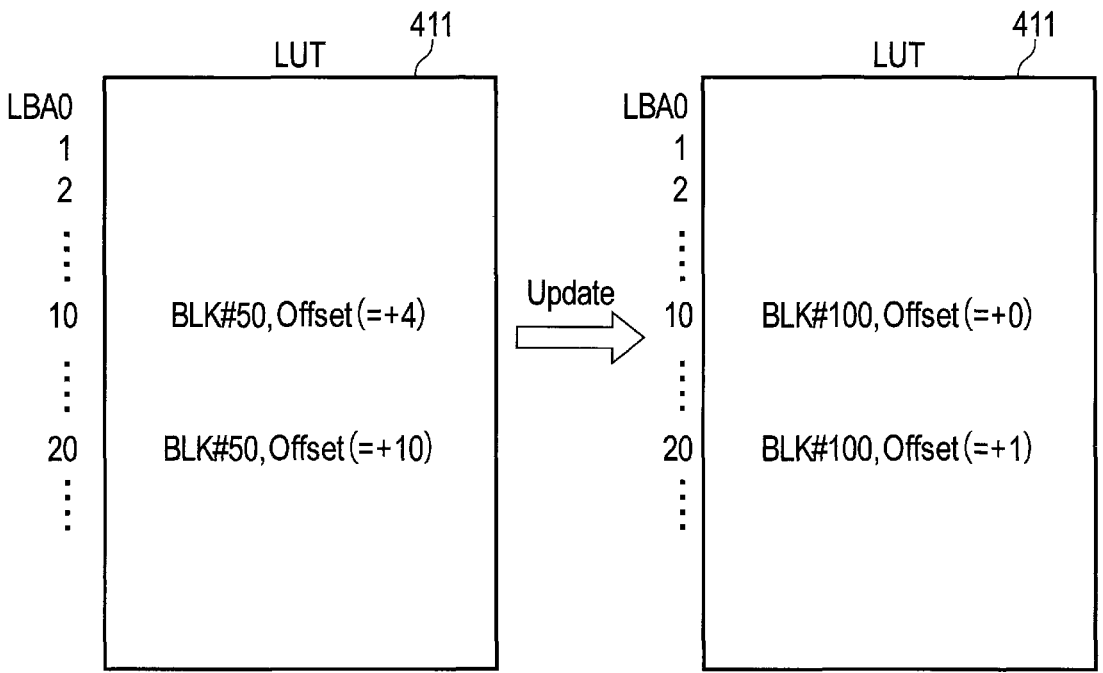
F I G. 38

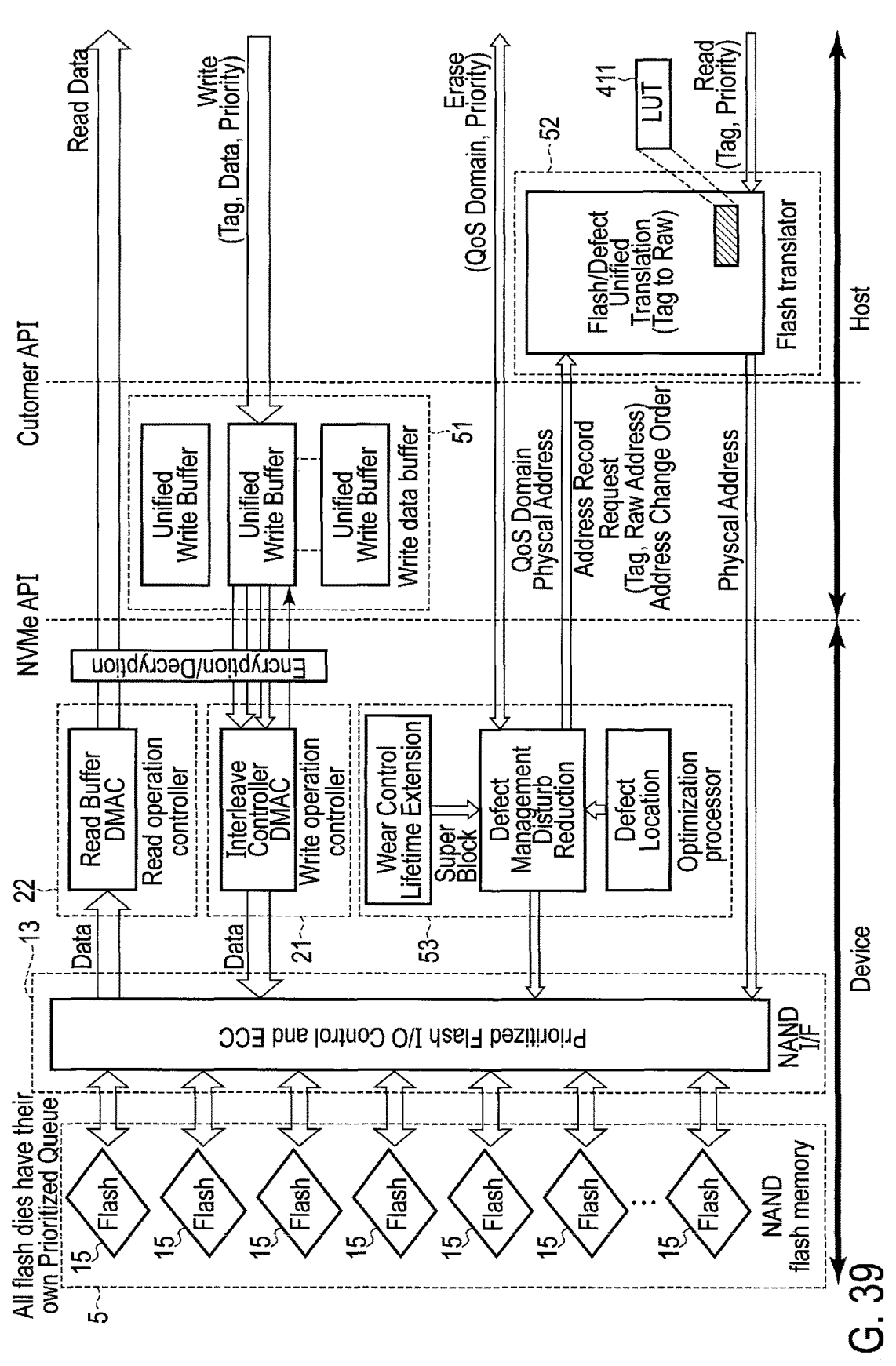
F I G. 39

4 VDs share Channels
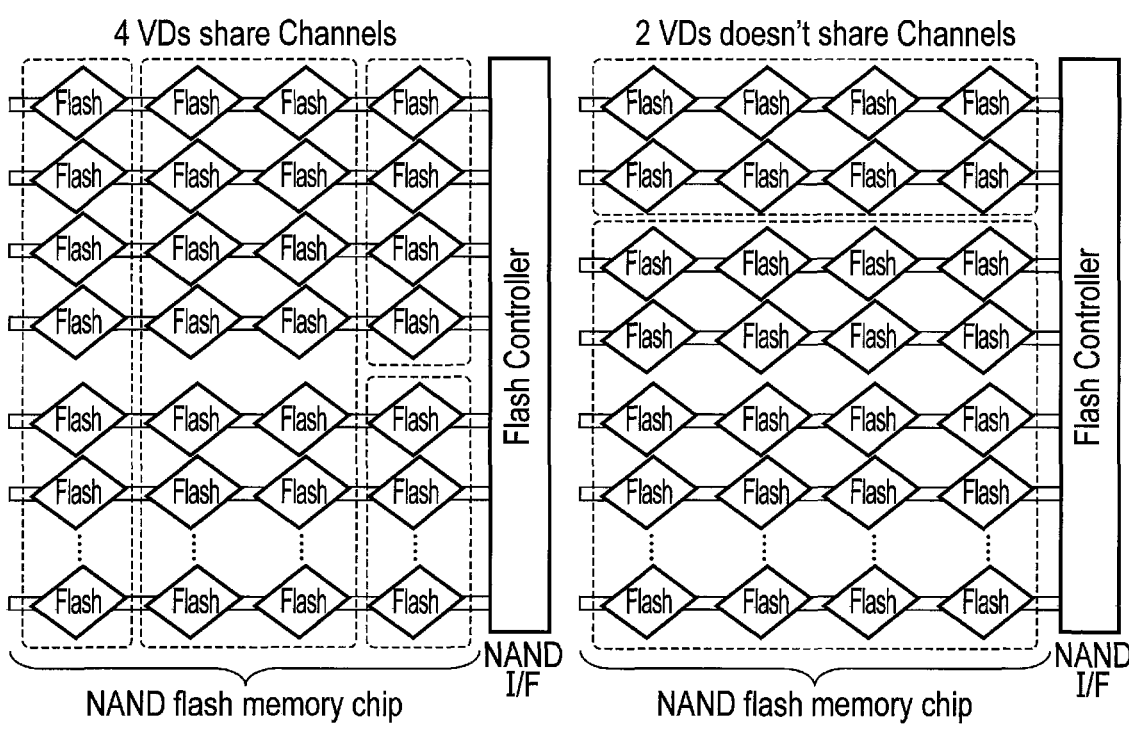
F I G. 40A
2 VDs doesn't share Channels
F I G. 40B
1 VD in the Device
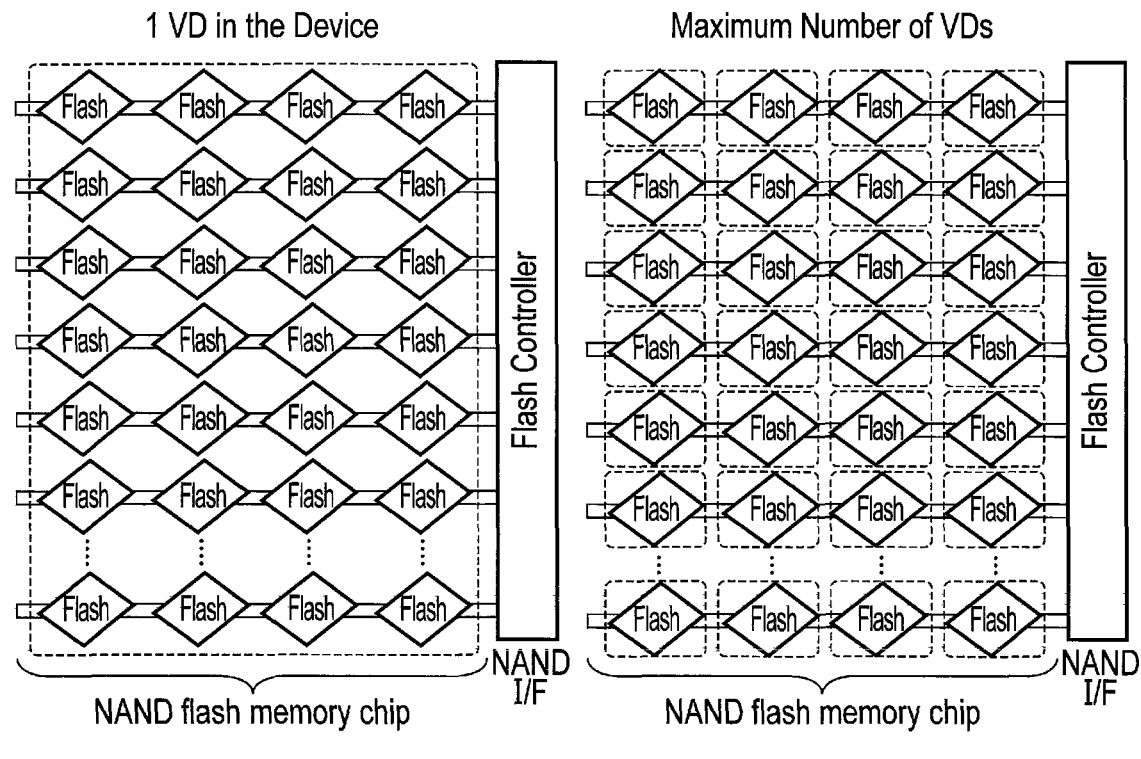
F I G. 40C
Maximum Number of VDs
F I G. 40D

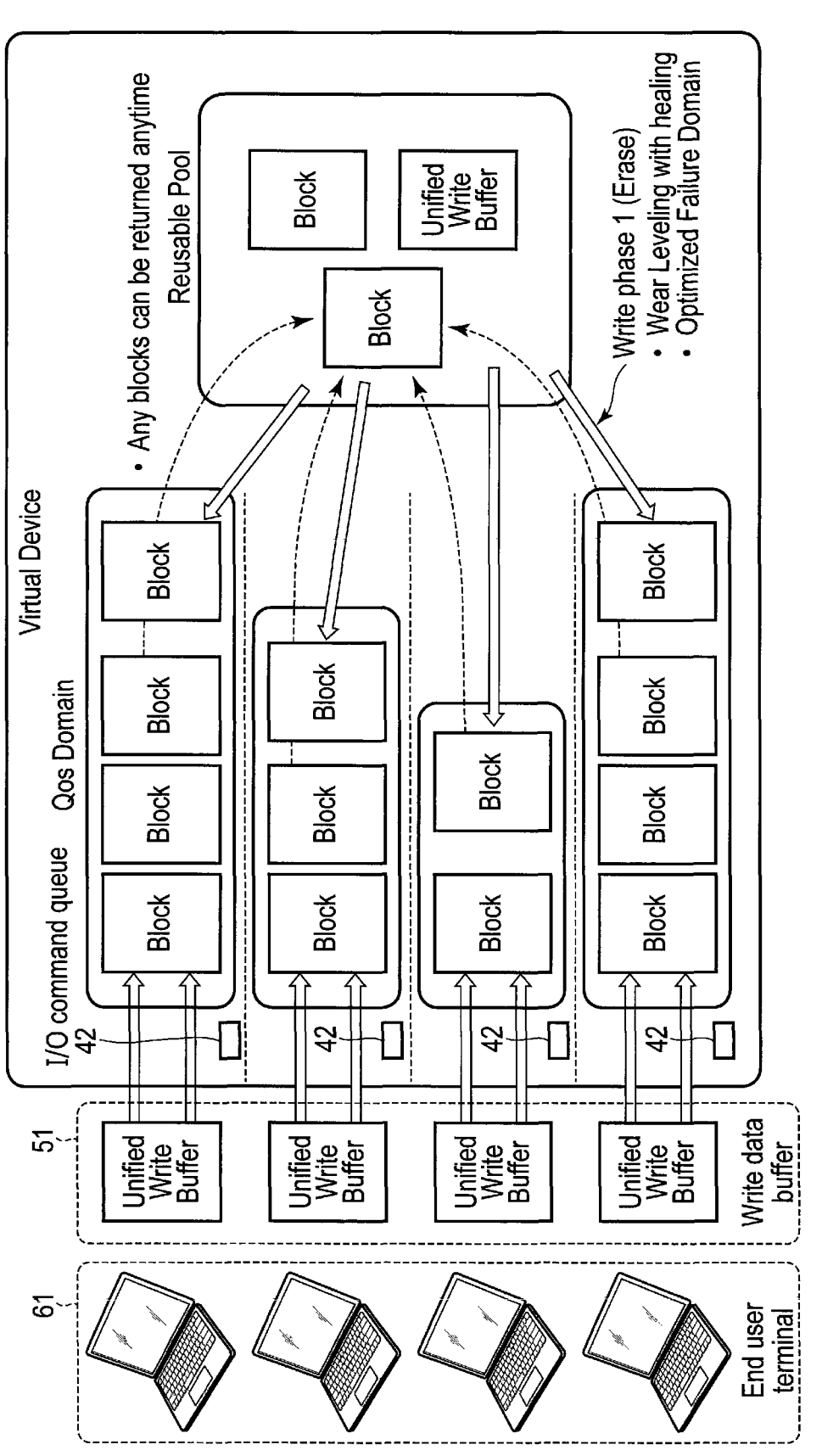
F I G. 41

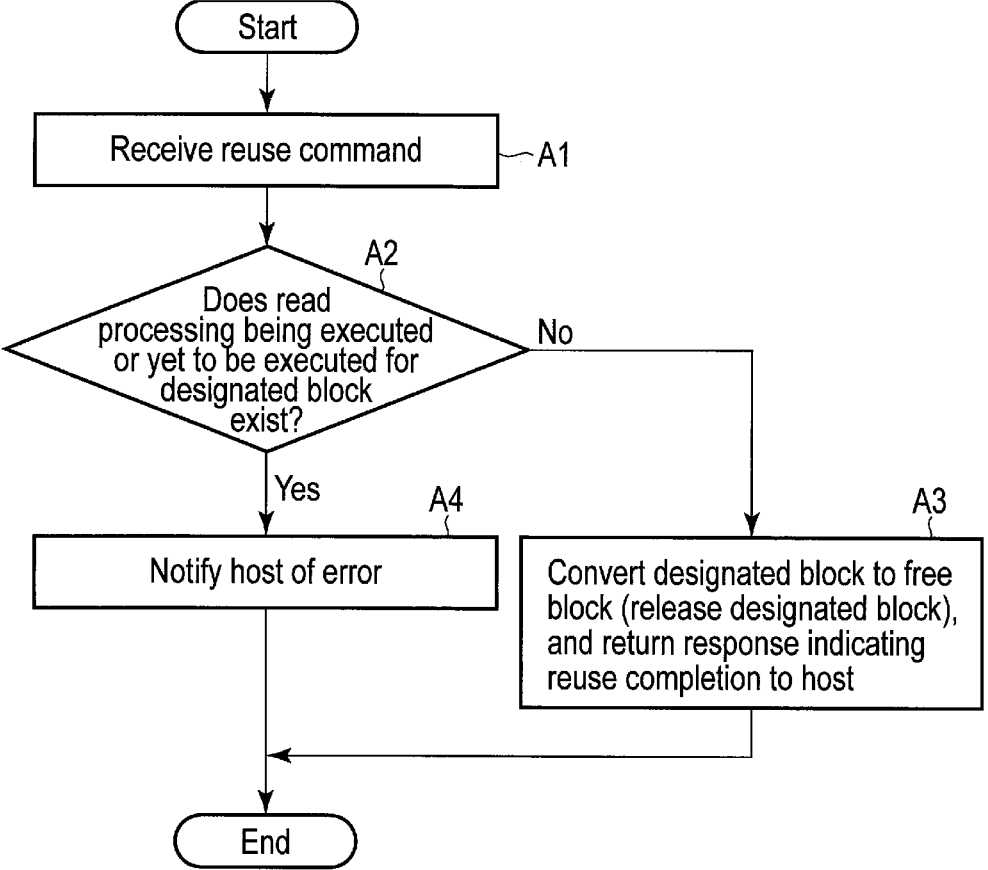
F I G. 42

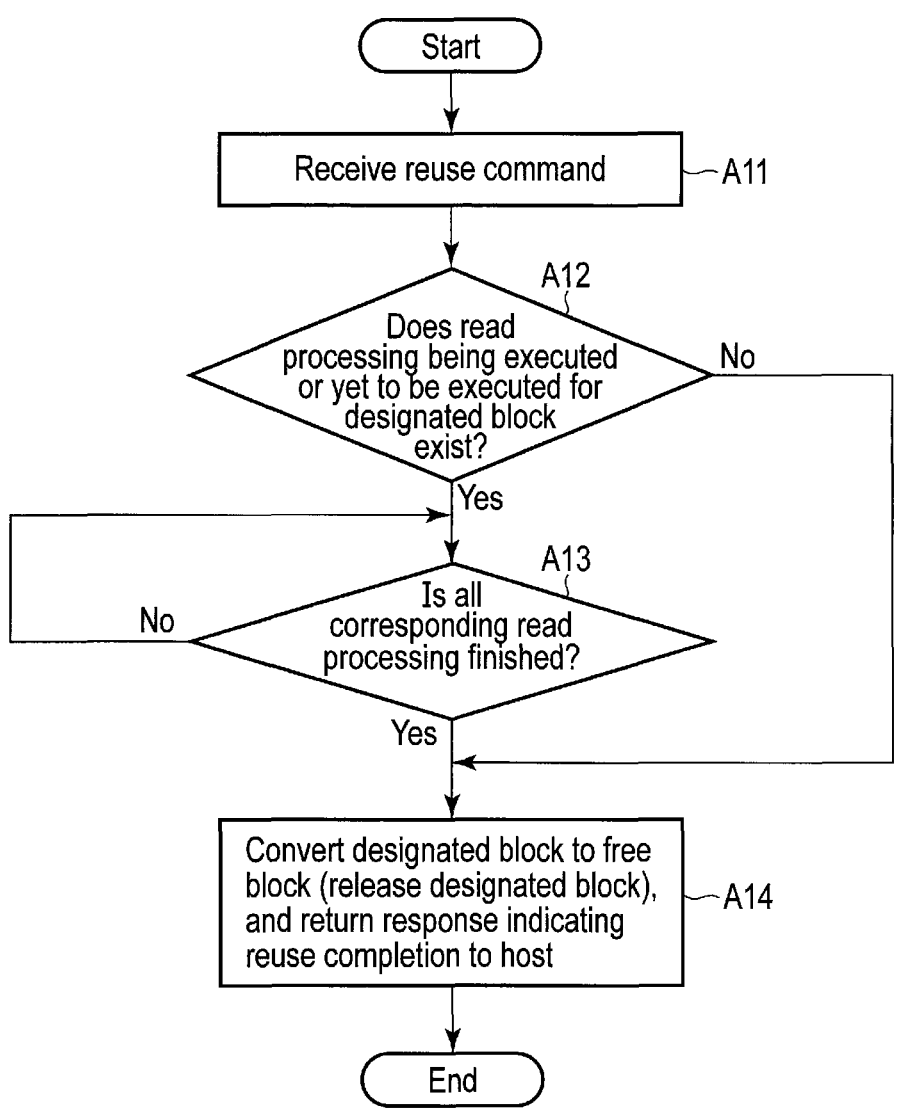
F I G. 43

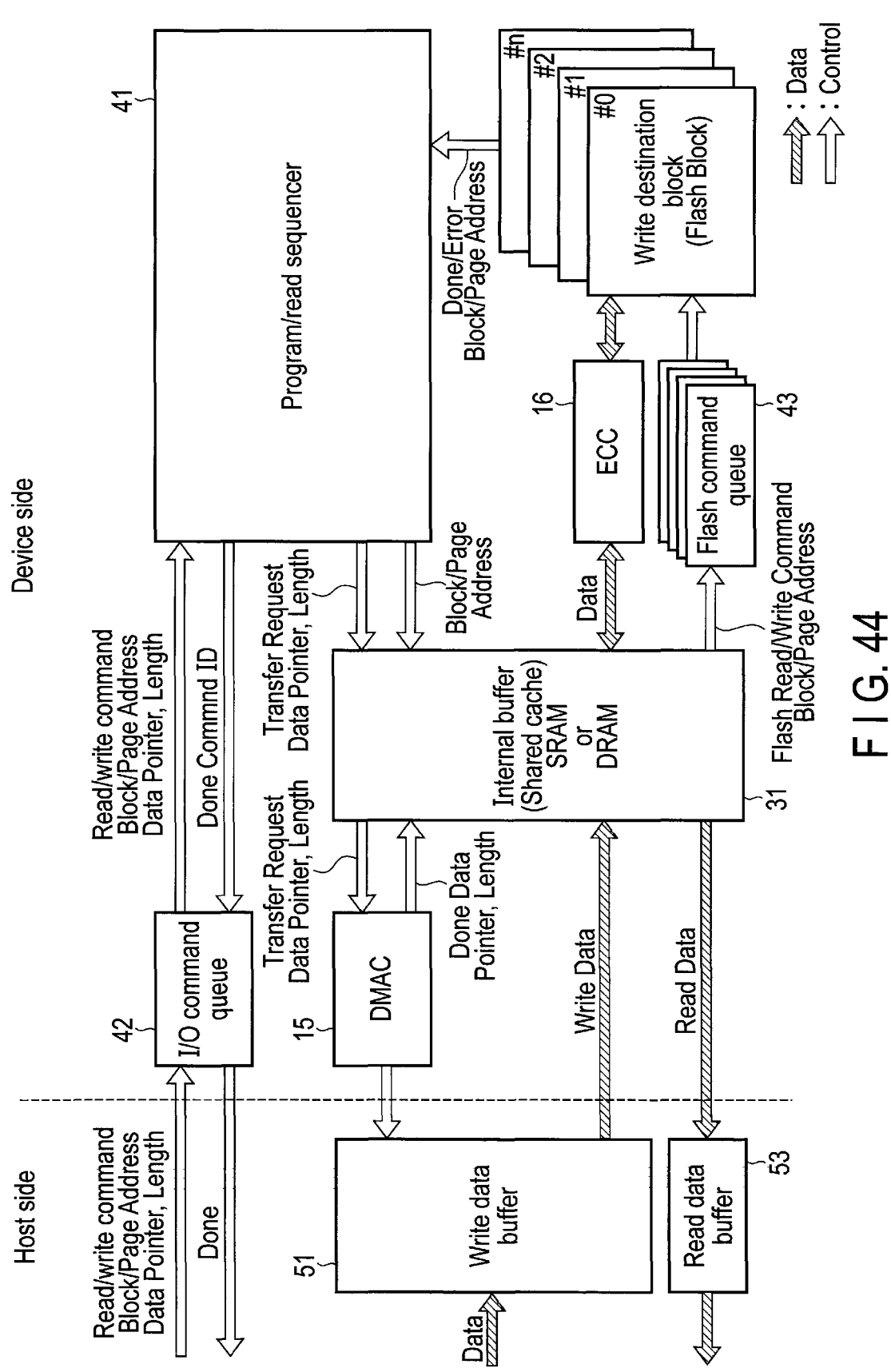
F I G. 44

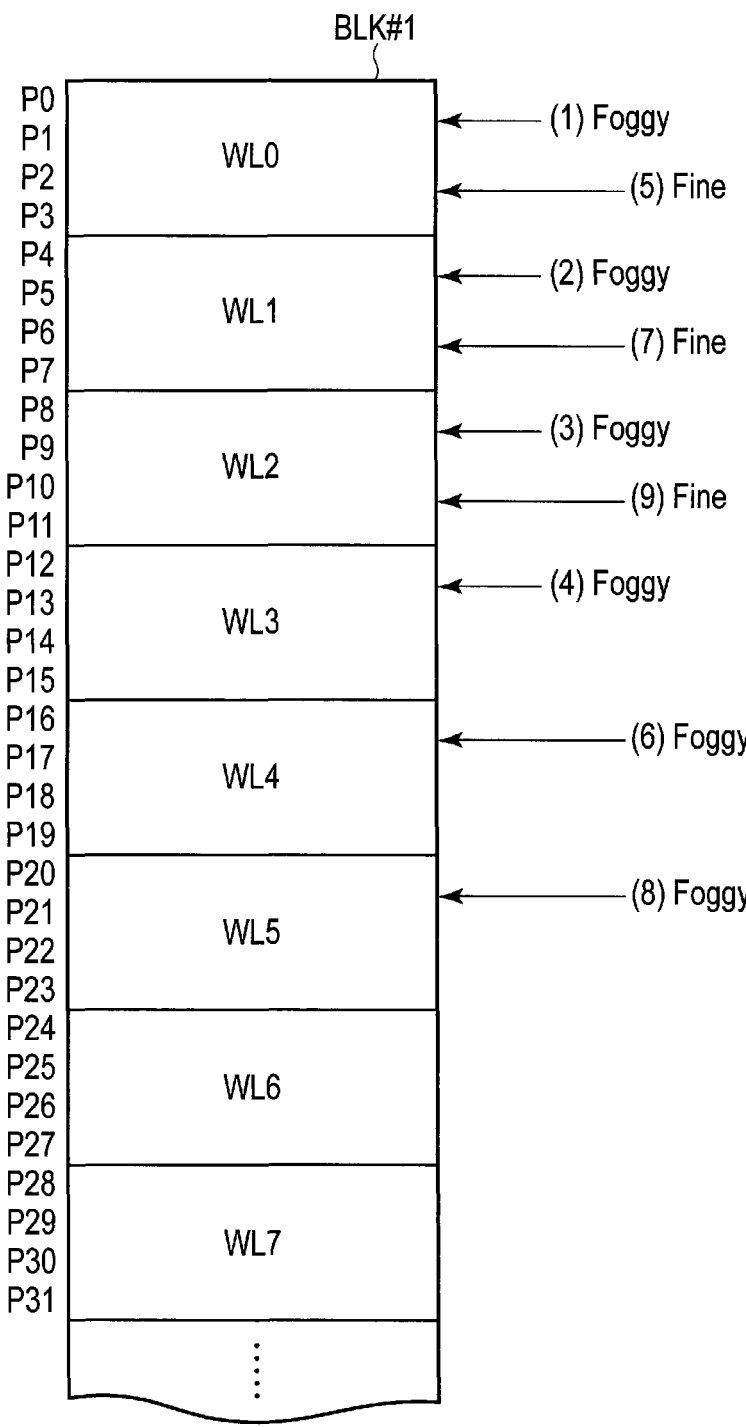
F I G. 45

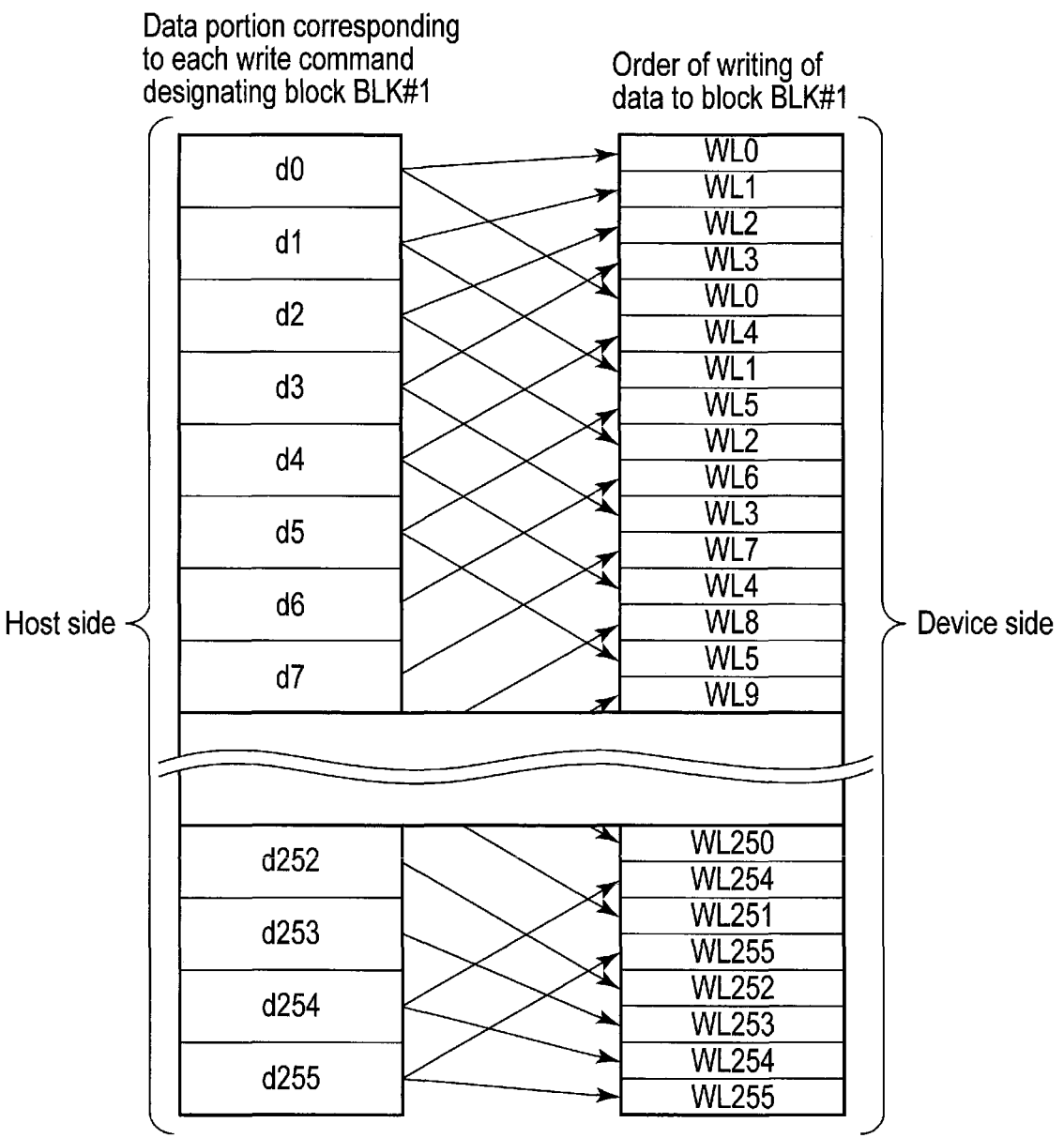
F I G. 46

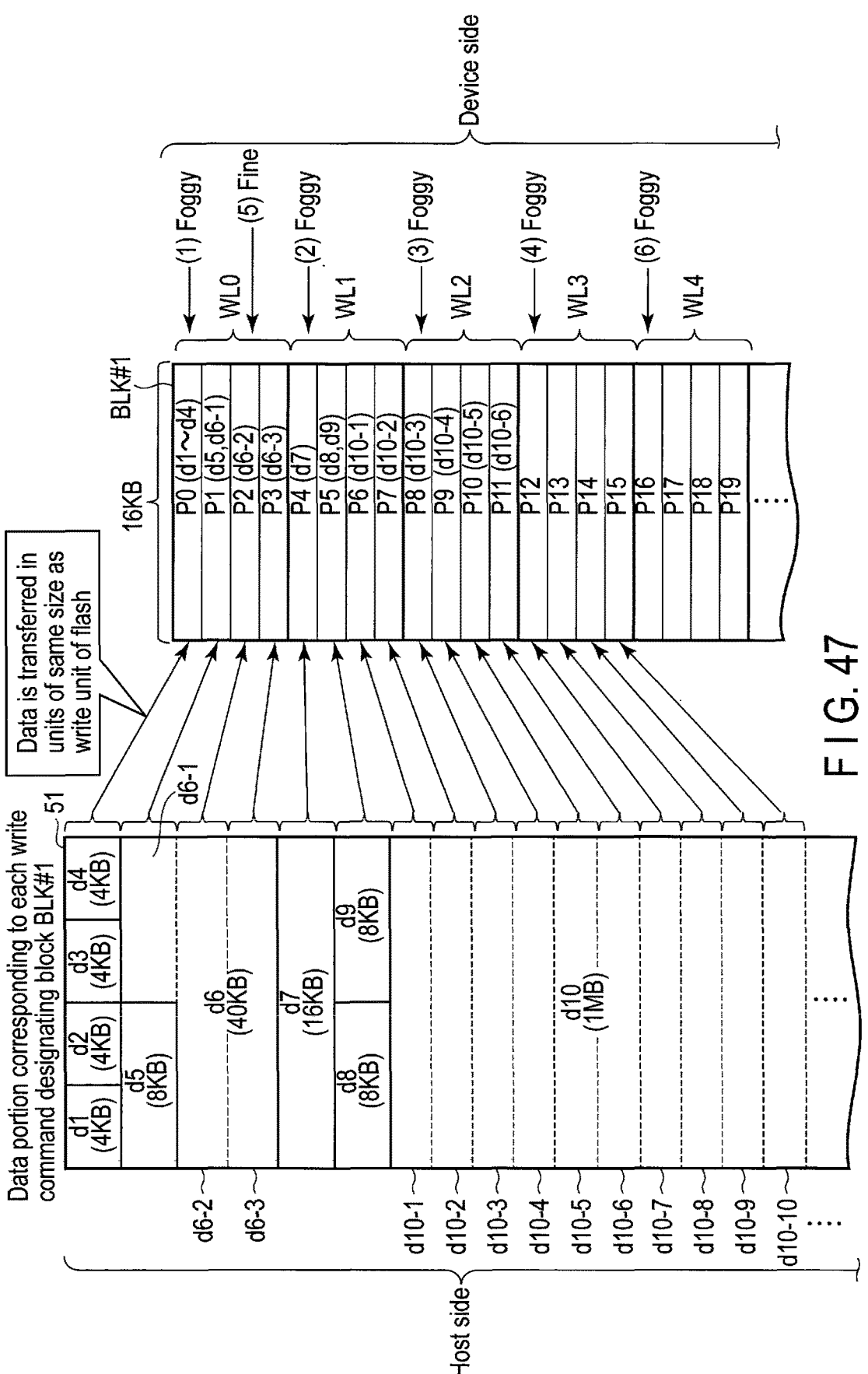
F I G. 47

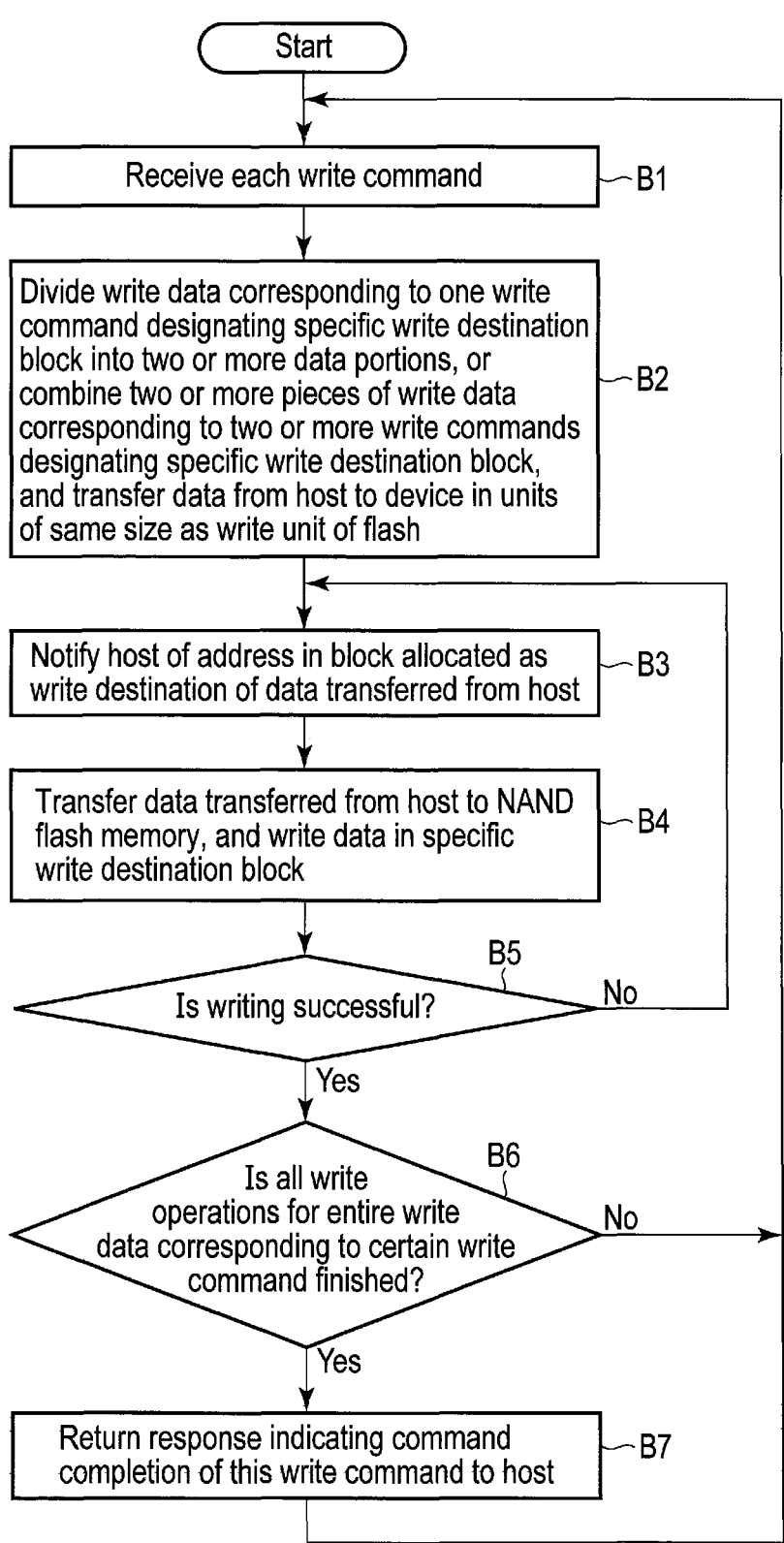
F I G. 48

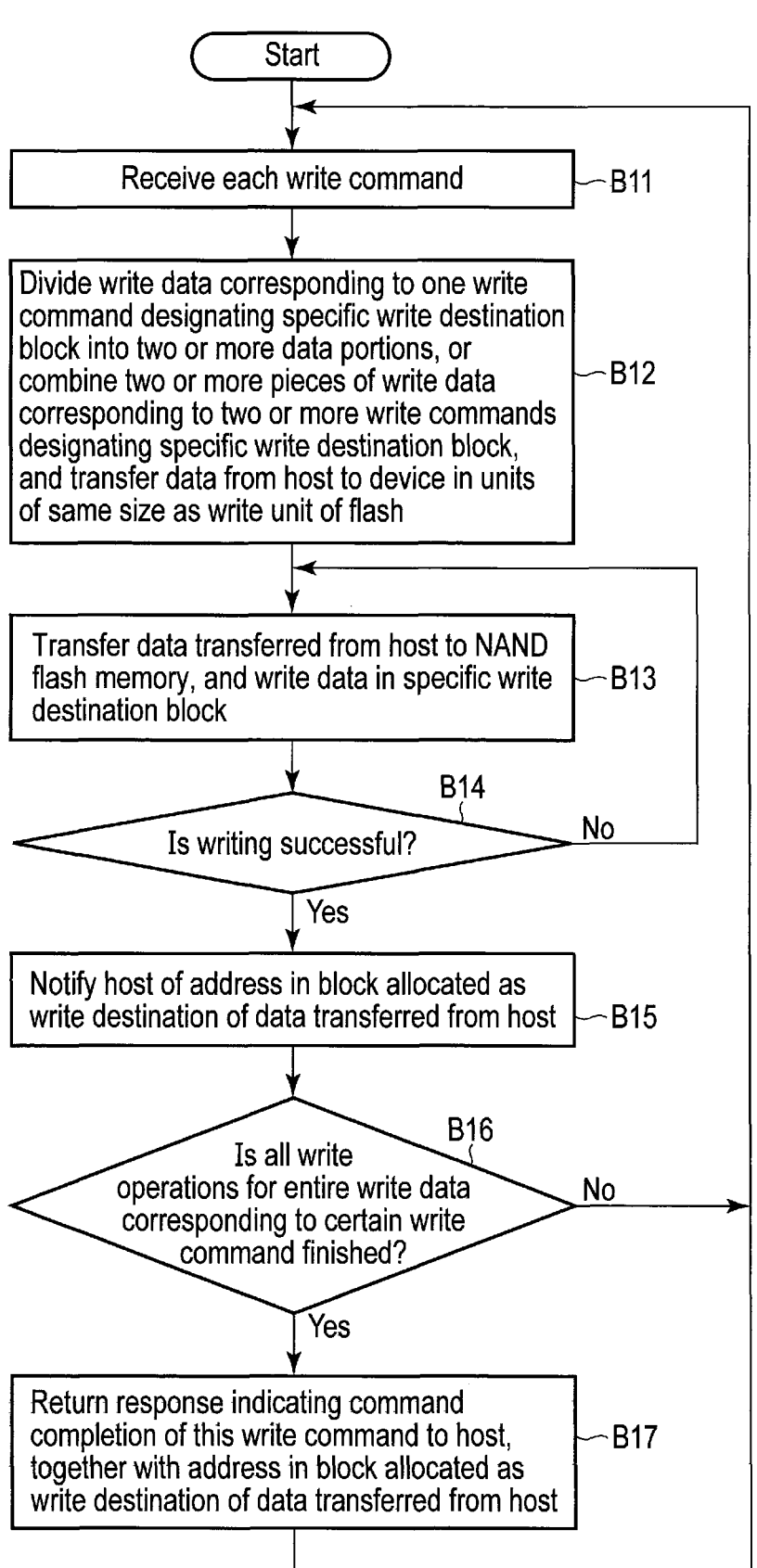
F I G. 49

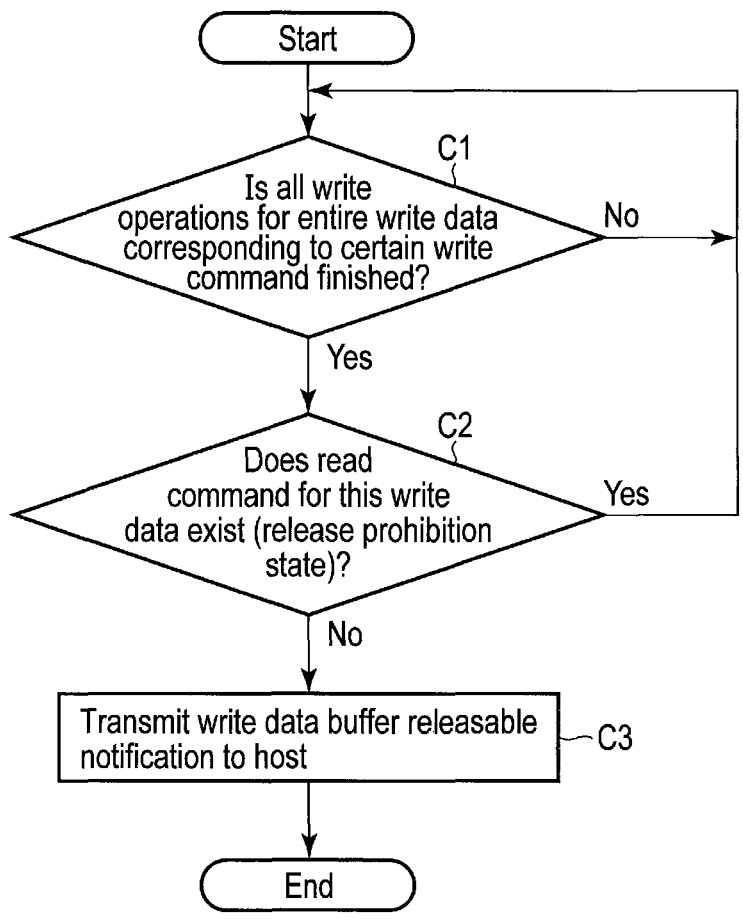
F I G. 50

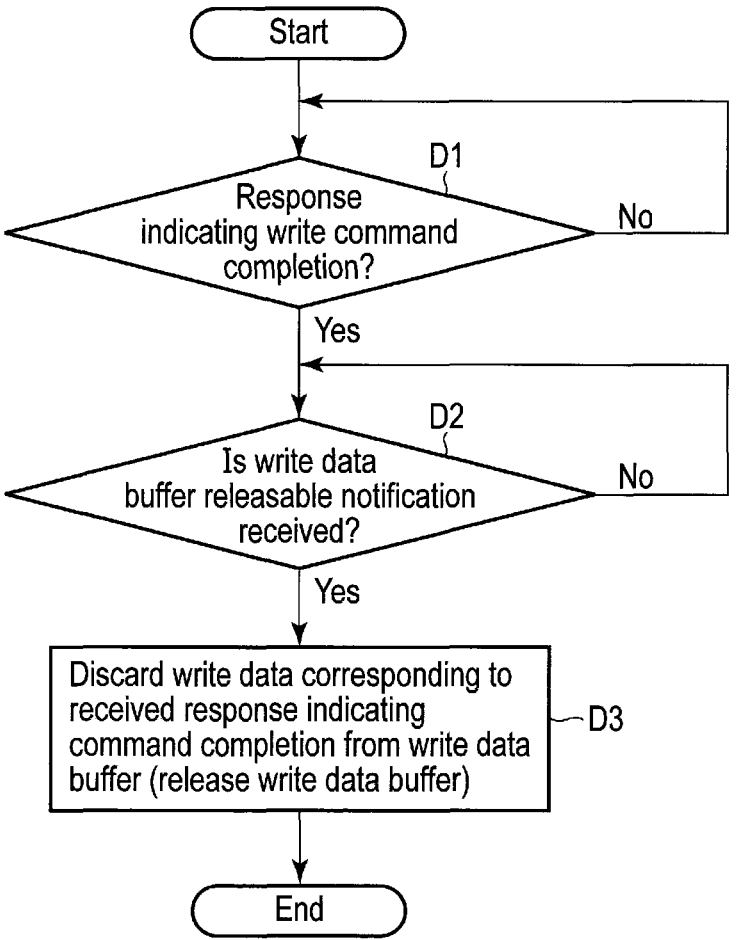
F I G. 51

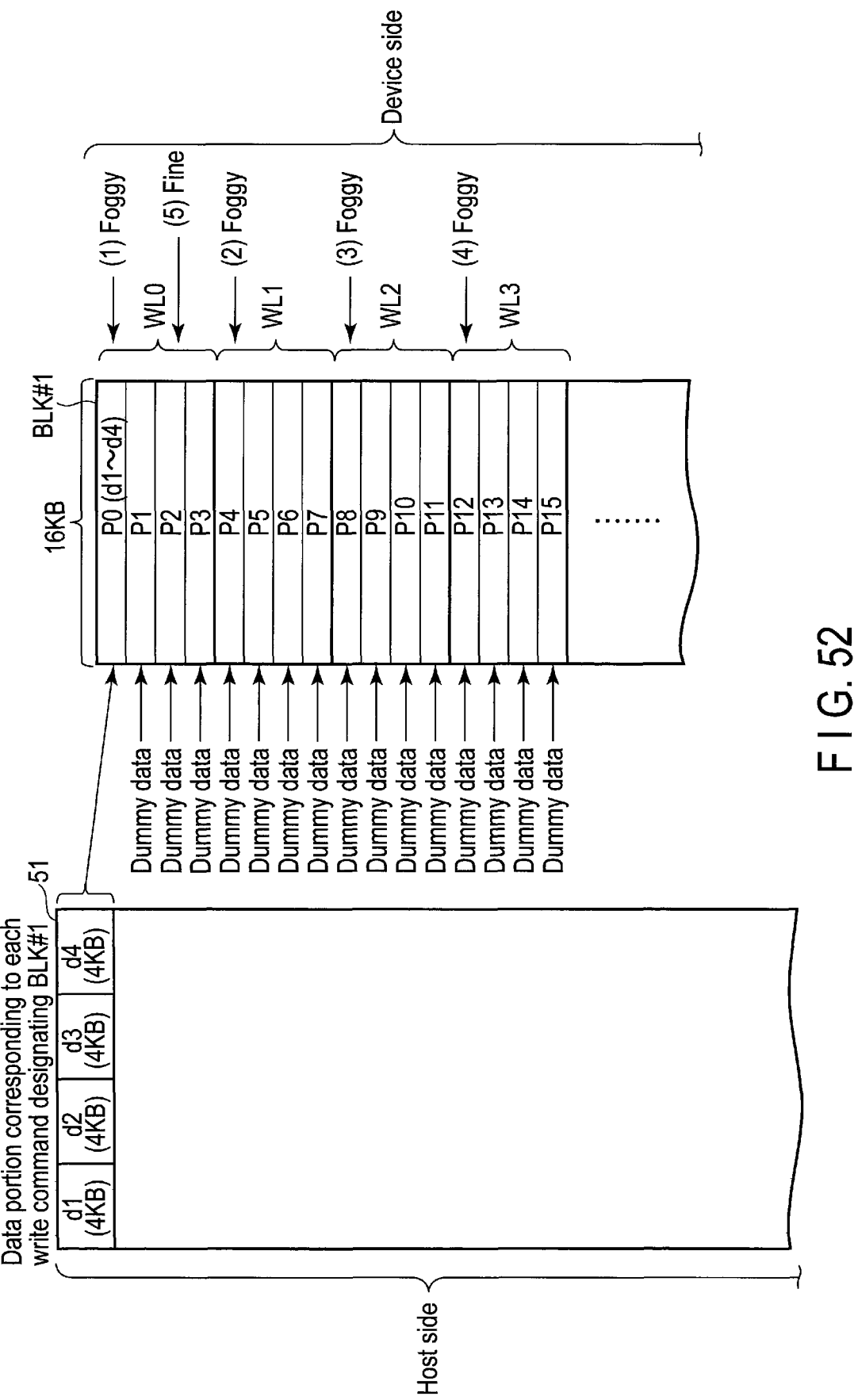
F I G. 52

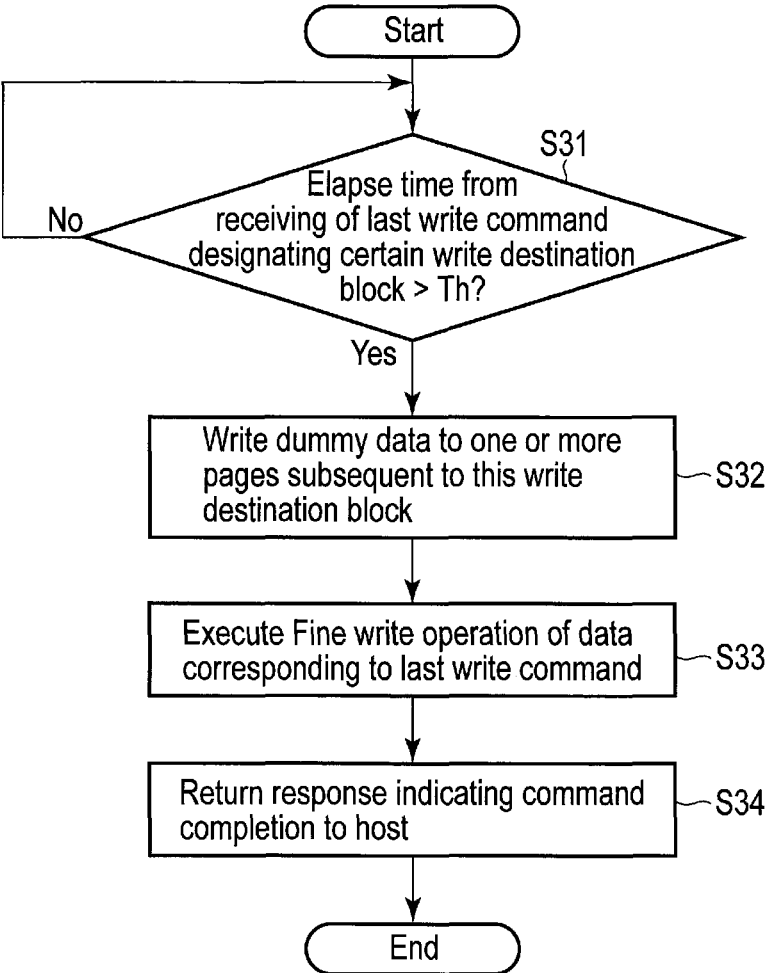
F I G. 53

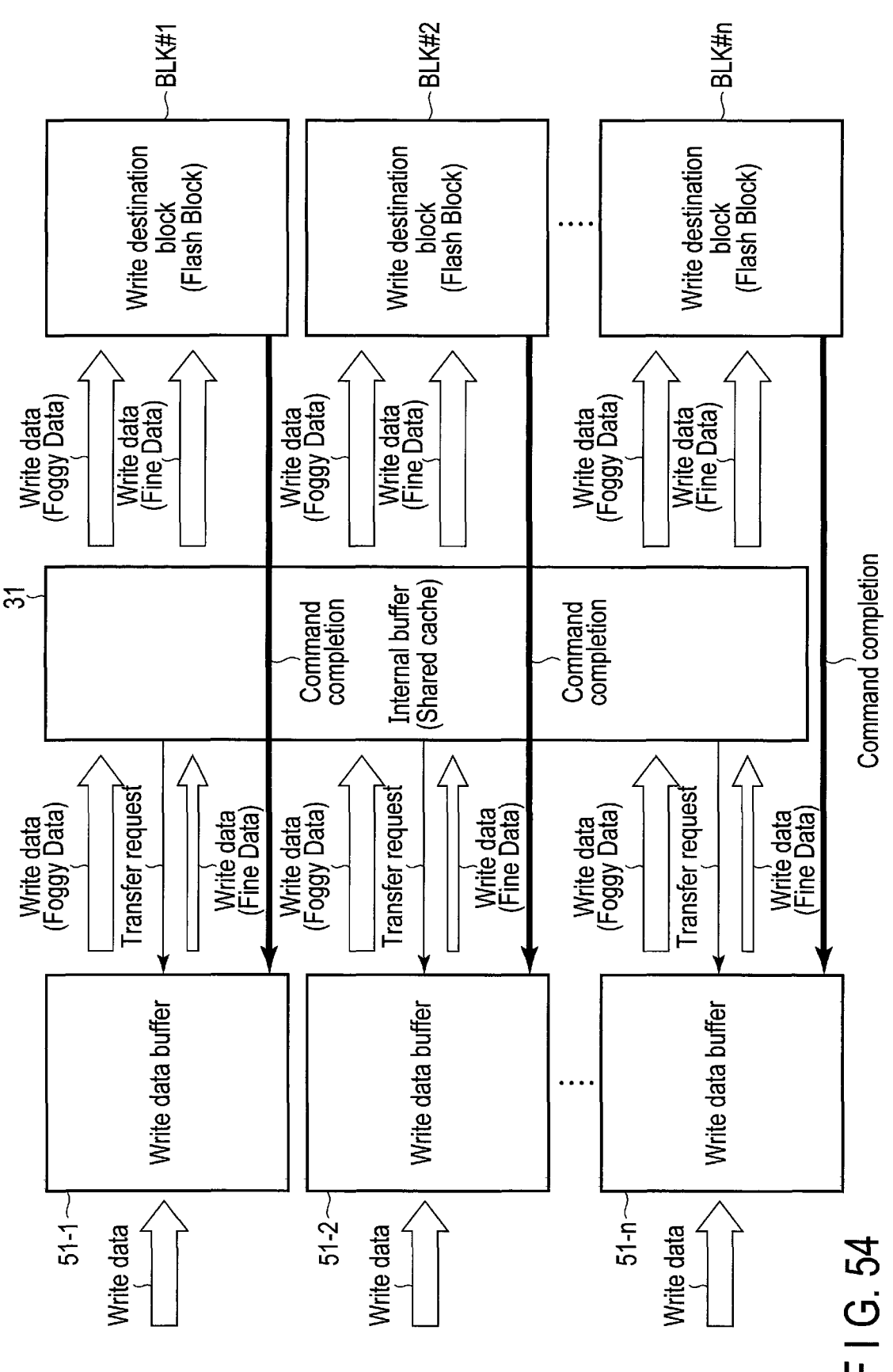
F I G. 54

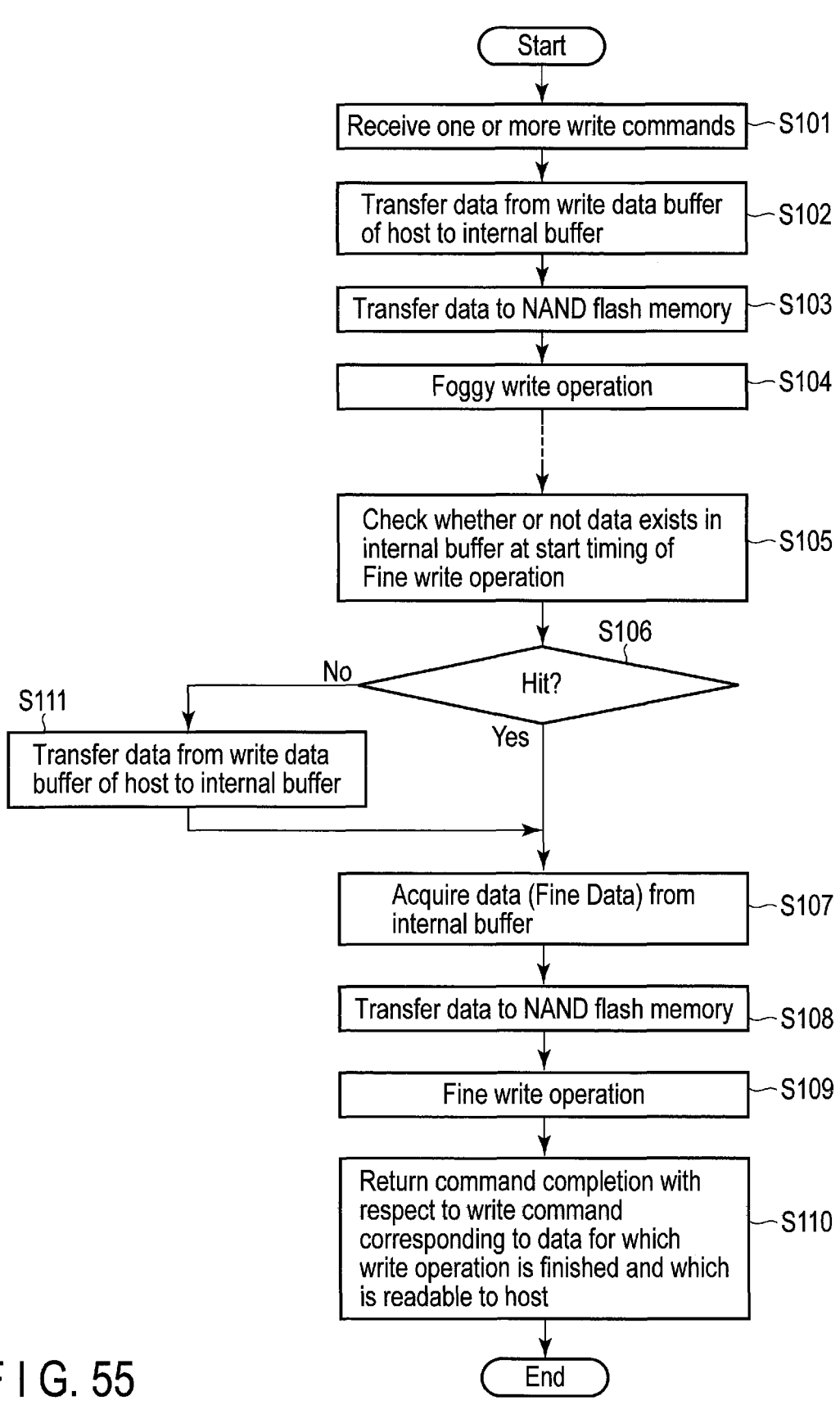
F I G. 55

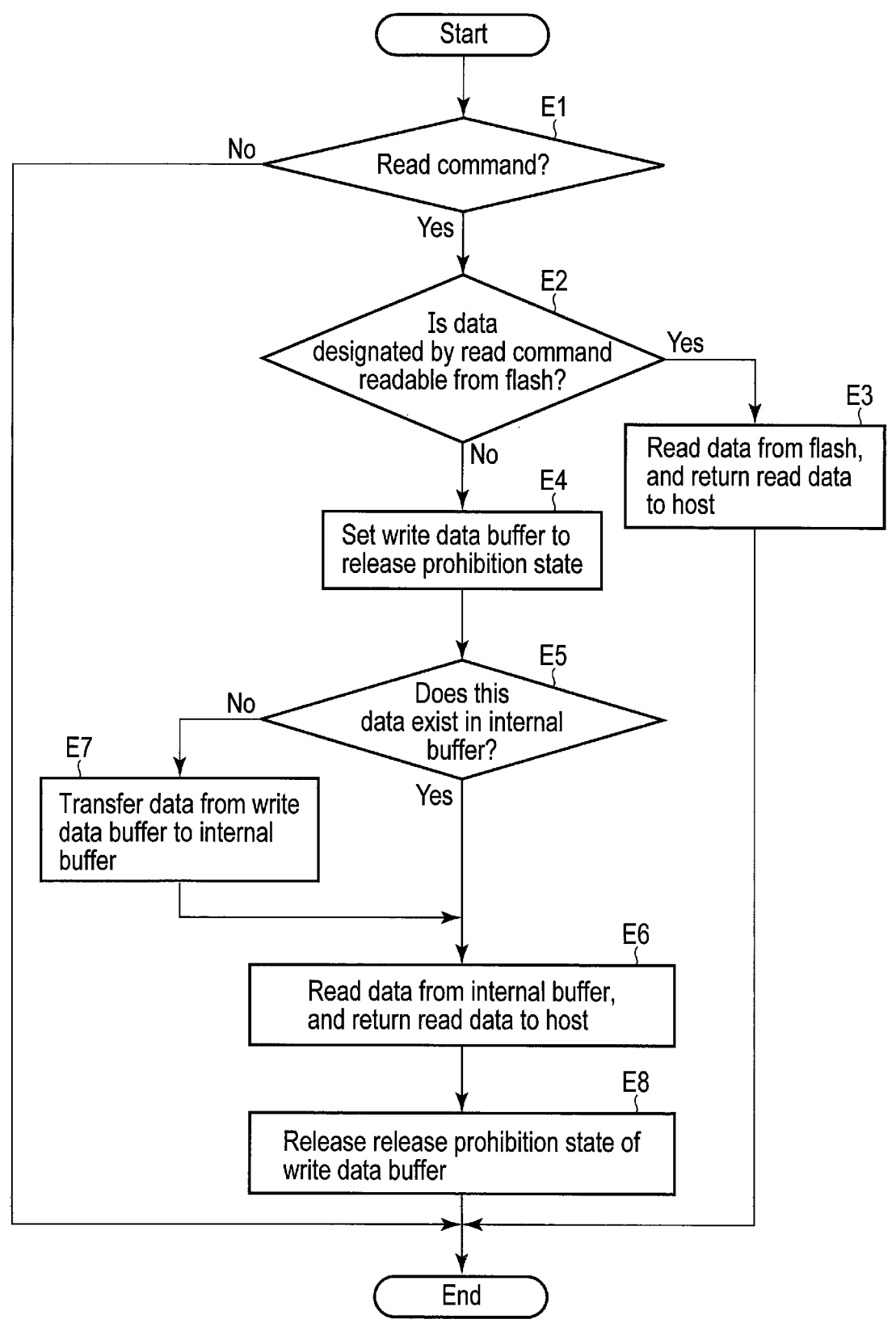
F I G. 56

Block reuse command

| | Description |
|---|---|
| Command ID | Command ID for block reuse |
| QoS domain ID | Identifier designating QoS domain |
| Block address | Physical address designating block converted to free block (to be released) |

F I G. 57

Write command

| | Description |
|---|---|
| Command ID | Command ID for write command |
| QoS domain ID | Identifier for uniquely identifying QoS domain to which data is to be written |
| Logical address | Logical address indicates logical position to which data is to be written |
| Length | Length of data to be written (data length can be designated by number of Grains) |

F I G. 58

Response to write command

| | Description |
|---|---|
| Logical address | Logical address included in write command |
| Physical address | Physical address indicates physical storage position to which data is written. Physical address is designated by block number and offset |
| Length | Length of written data (data length can be designated by number of Grains) |

F I G. 59

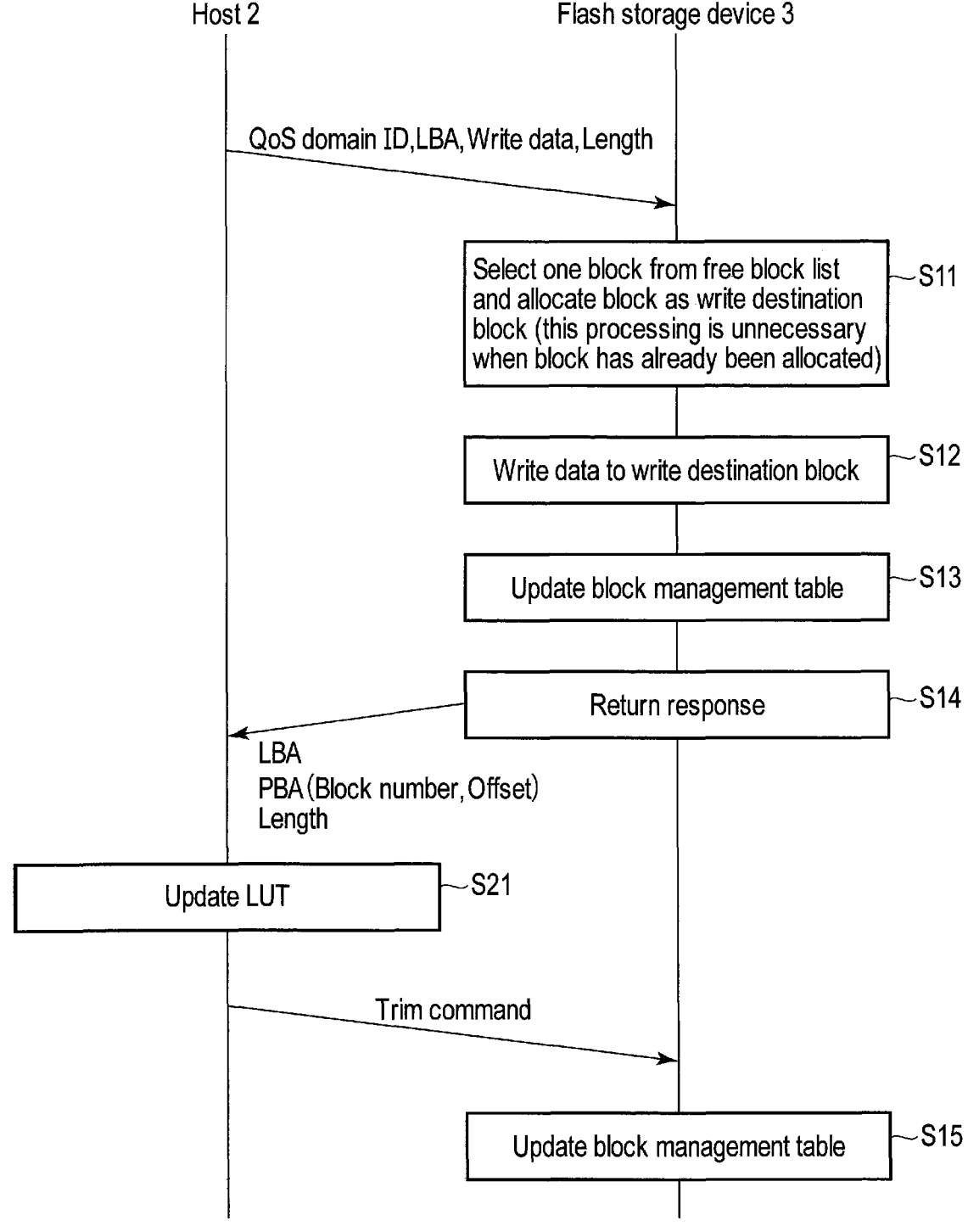
F I G. 60

GC control command
| | Description |
|---|---|
| Command ID | Command ID for GC control |
| Policy | Host can designate policy for selecting GC candidate block. Device supports plurality of policies and selects GC candidate block using policy designated by host |
| QoS domain ID | Identifier for uniquely identifying QoS domain for which domain GC is to be executed |
F I G. 61
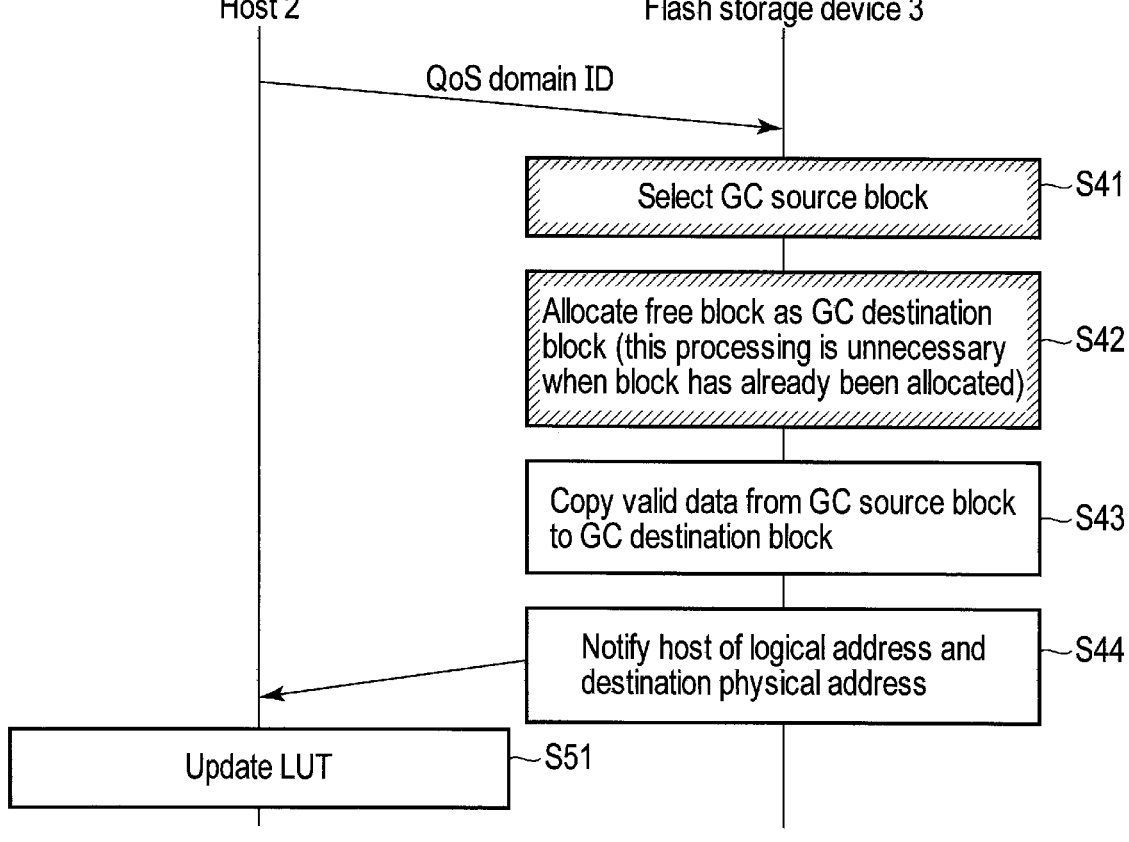
F I G. 62

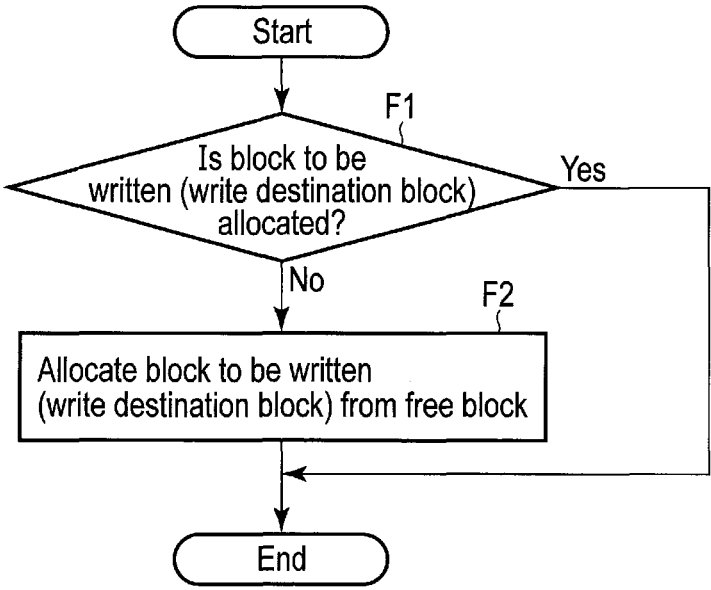
F I G. 63
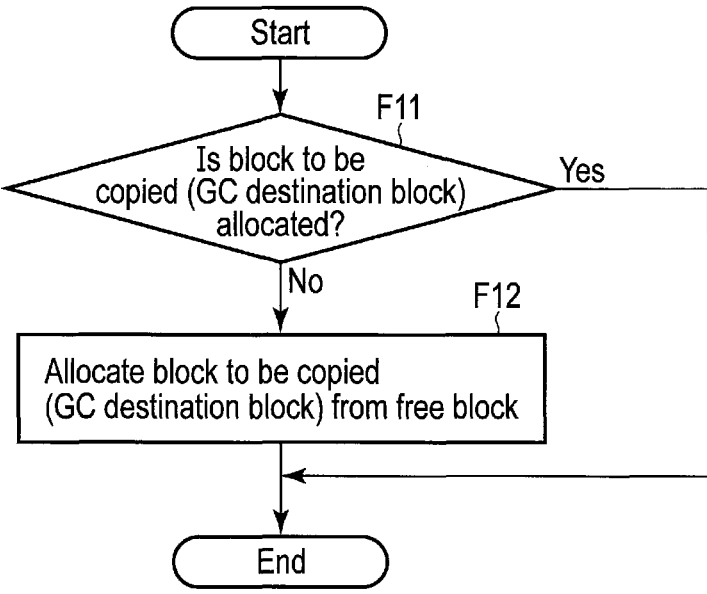
F I G. 64

MEMORY SYSTEM AND CONTROL METHOD

CROSS-REFERENCE TO RELATED APPLICATIONS

This application is a continuation of and claims benefit under 35 U.S.C. § 120 to U.S. application Ser. No. 18/312, 978, filed May 5, 2023, which is a continuation of and claims benefit under 35 U.S.C. § 120 to U.S. application Ser. No. 17/554,092, filed Dec. 17, 2021, now U.S. Pat. No. 11,681, 473, issued Jun. 20, 2023, which is a continuation of and claims benefit under 35 U.S.C. § 120 to U.S. application Ser. No. 16/353,293, filed Mar. 14, 2019, now U.S. Pat. No. 11,237,759, issued Feb. 1, 2022, which is based upon and claims the benefit of priority under 35 U.S.C. § 119 from Japanese Patent Application No. 2018-175148, filed Sep. 19, 2018, the entire contents of each of which are incorporated herein by reference.

FIELD

Embodiments described herein relate generally to a technique for controlling a nonvolatile memory.

BACKGROUND

In recent years, a memory system including a nonvolatile memory has been widely spread.

As one such memory system, a solid state drive (SSD) based on NAND flash technology is known.

Recently, a new interface between a host and a storage is beginning to be proposed.

However, since control of the NAND flash memory is generally complicated, consideration needs to be given to appropriate sharing of roles between a host and a storage (memory system) to obtain a new interface for improving I/O performance.

BRIEF DESCRIPTION OF THE DRAWINGS

FIG. 1 is a block diagram showing a relationship between a host and a memory system (flash storage device) of an embodiment.

FIG. 2 is a diagram for explaining role sharing between a conventional SSD and a host and role sharing between a flash storage device of the embodiment and a host.

FIG. 3 is a block diagram showing a configuration example of a computer system in which data transfer between a plurality of hosts and a plurality of flash storage devices is executed via network equipment.

FIG. 4 is a block diagram showing a configuration example of the memory system of the embodiment.

FIG. 5 is a block diagram showing a relationship between a NAND interface provided in the memory system of the embodiment and a plurality of NAND flash memory dies.

FIG. 6 is a diagram showing a configuration example of a super block built with a set of a plurality of blocks.

FIG. 7 is a diagram for explaining a data write operation in which a host designates a logical address and a block number and the memory system of the embodiment determines an in-block physical address (in-block offset), and a data read operation in which the host designates a block number and an in-block physical address (in-block offset).

FIG. 8 is a diagram for explaining a write command applied to the memory system of the embodiment.

FIG. 9 is a diagram for explaining a response to the write command of FIG. 8.

FIG. 10 is a diagram for explaining a Trim command applied to the memory system of the embodiment.

FIG. 11 is a diagram for explaining a block number and an offset showing a physical address.

FIG. 12 is a diagram for explaining a write operation executed according to a write command.

FIG. 13 is a diagram for explaining a write operation for skipping a defective page.

FIG. 14 is a diagram for explaining another example of the write operation for skipping a defective page.

FIG. 15 is a diagram for explaining an operation of writing a pair of a logical address and data in a page in a block.

FIG. 16 is a diagram for explaining an operation of writing data in a user data region of a page in a block and writing a logical address of the data in a redundant region of this page.

FIG. 17 is a diagram for explaining a relationship between a block number and an offset in a case where a super block is used.

FIG. 18 is a diagram for explaining a maximum block number get command applied to the memory system of the embodiment.

FIG. 19 is a diagram for explaining a response to a maximum block number get command.

FIG. 20 is a diagram for explaining a block size get command applied to the memory system of the embodiment.

FIG. 21 is a diagram for explaining a response to a block size get command.

FIG. 22 is a diagram for explaining a block allocate command (block allocation request) applied to the memory system of the embodiment.

FIG. 23 is a diagram for explaining a response to a block allocate command.

FIG. 24 is a sequence chart showing block information acquisition processing executed by a host and the memory system of the embodiment.

FIG. 25 is a sequence chart showing a sequence of writing processing executed by a host and the memory system of the embodiment.

FIG. 26 is a diagram showing a data updating operation for writing update data for data that has already been written.

FIG. 27 is a diagram for explaining an operation of updating a block management table managed by the memory system of the embodiment.

FIG. 28 is a diagram for explaining an operation of updating a lookup table (logical and physical address translation table) managed by a host.

FIG. 29 is a diagram for explaining an operation of updating a block management table in response to a notification from a host indicating a block number and a physical address corresponding to data to be invalidated.

FIG. 30 is a diagram for explaining a read command applied to the memory system of the embodiment.

FIG. 31 is a diagram for explaining a read operation executed by the memory system of the embodiment.

FIG. 32 is a diagram for explaining an operation of reading a data section stored in different physical storage positions in accordance with a read command from a host.

FIG. 33 is a sequence chart showing a sequence of read processing executed by a host and the memory system of the embodiment.

FIG. 34 is a diagram for explaining a garbage collection (GC) control command applied to the memory system of the embodiment.

FIG. 35 is a diagram for explaining a GC callback command applied to the memory system of the embodiment.

FIG. 36 is a sequence chart showing a process of a garbage collection (GC) operation executed by a host and the memory system of the embodiment.

FIG. 37 is a diagram for explaining an example of a data copy operation executed for garbage collection (GC).

FIG. 38 is a diagram for explaining the content of a lookup table of a host updated based on a result of the data copy operation in FIG. 37.

FIG. 39 is a diagram showing a system architecture of a host and the memory system of the embodiment.

FIGS. 40A to 40D are diagrams showing definition example of a virtual storage device on the memory system of the embodiment.

FIG. 41 is a diagram showing an example in which a QoS domain is managed for each virtual storage device on the memory system of the embodiment.

FIG. 42 is a flowchart showing an operation process (first case) of a flash storage device at the time of receiving a block reuse command of the memory system of the embodiment.

FIG. 43 is a flowchart showing an operation process (second case) of the flash storage device at the time of receiving a block reuse command of the memory system of the embodiment.

FIG. 44 is a block diagram for explaining I/O command processing executed by the memory system of the embodiment.

FIG. 45 is a diagram for explaining write operation in a plurality of stages executed by the memory system of the embodiment.

FIG. 46 is a diagram for explaining the order of writing data to a certain write destination block in the memory system of the embodiment.

FIG. 47 is a diagram for explaining an operation of transferring write data from a host to the memory system of the embodiment in units of the same size as data write units of a nonvolatile memory.

FIG. 48 is a flowchart showing a process of data writing processing executed by the memory system of the embodiment.

FIG. 49 is a flowchart showing another process of data writing processing executed by the memory system of the embodiment.

FIG. 50 is a flowchart showing a process of transmitting processing of releasable notification to a host executed by the memory system of the embodiment.

FIG. 51 is a flowchart showing a process of write data discarding processing executed by a host.

FIG. 52 is a diagram for explaining dummy data write processing executed by the memory system of the embodiment when a next write command is not received for a threshold period after a last write command is received.

FIG. 53 is a flowchart showing a process of dummy data write processing executed by the memory system of the embodiment.

FIG. 54 is a block diagram showing a data transfer operation executed by the memory system of the embodiment using an internal buffer.

FIG. 55 is a flowchart showing a process of data writing processing executed by the memory system of the embodiment using an internal buffer.

FIG. 56 is a flowchart showing a process of data read processing executed by the memory system of the embodiment.

FIG. 57 is a diagram for explaining a block reuse command applied to the memory system of the embodiment.

FIG. 58 is a diagram for explaining another example of a write command applied to the memory system of the embodiment.

FIG. 59 is a diagram for explaining a response to the write command in FIG. 58.

FIG. 60 is a sequence chart showing another example of a sequence of the write operation processing executed by a host and the memory system of the embodiment.

FIG. 61 is a diagram for explaining another example of a garbage collection (GC) control command applied to the memory system of the embodiment.

FIG. 62 is a sequence chart showing another example of a process of the garbage collection (GC) operation executed by the memory system of the embodiment.

FIG. 63 is a flowchart showing a process of allocation of a write destination block in the memory system of the embodiment.

FIG. 64 is a flowchart showing a process of allocation of a GC destination block in the memory system of the embodiment.

DETAILED DESCRIPTION

Various embodiments will be described hereinafter with reference to the accompanying drawings.

In general, according to one embodiment, a memory system is connectable to a host. The memory system includes a nonvolatile memory and a controller. The nonvolatile memory includes a plurality of blocks. The controller is electrically coupled to the nonvolatile memory. The controller controls the nonvolatile memory. When receiving, from the host, a first command for changing a state of an allocated block to a reallocatable state in a case where a second command that is yet to be executed or being executed involving read of data from the allocated block has been received from the host, the controller changes the state of the allocated block to the reallocatable state after the second command is finished.

First, referring to FIG. 1, a configuration of a computer system including a memory system according to an embodiment will be described.

The memory system is a semiconductor storage device configured to write data to a nonvolatile memory and to read data from a nonvolatile memory. This memory system is realized as a flash storage device 3 based on NAND flash technology.

This computer system may include a host (host device) 2 and a plurality of the flash storage devices 3. The host 2 may be a server configured to use a flash array configured with a plurality of the flash storage devices 3 as storage. The host (server) 2 and a plurality of the flash storage devices 3 are interconnected via an interface 50 (internal interconnection). As the interface 50 for this internal interconnection, there may be used, without limitation to, PCI Express (PCIe) (registered trademark), NVM Express (NVMe) (registered trademark), Ethernet (registered trademark), and NVMe over Fabrics (NVMeOF).

As a typical example of a server functioning as the host 2, a server in a data center can be used.

In a case where the host 2 is realized as a server in a data center, the host (server) 2 may be connected to a plurality of end user terminals (clients) 61 via a network 51. The host 2 can provide various services to the end user terminals 61.

Examples of services that can be provided by the host (server) 2 include (1) platform as a service (PaaS) that provides a system operating platform to each client (each of the end user terminals 61), and (2) infrastructure as a service (IaaS) that provides an infrastructure like a virtual server to each client (each of the end user terminals 61).

A plurality of virtual machines may be executed on a physical server functioning as the host (server) 2. Each of these virtual machines running on the host (server) 2 can function as a virtual server configured to provide various services to several corresponding clients (the end user terminals 61).

The host (server) 2 includes a storage management function for managing a plurality of the flash storage devices 3 constituting the flash array, and a front-end function for providing various services including a storage access to each of the end user terminals 61.

In a conventional SSD, the block/page hierarchical structure of a NAND flash memory is hidden by a flash translation layer (FTL) in the SSD. That is, an FTL of a conventional SSD has (1) a function of managing mapping between each logical address and each physical address of a NAND flash memory by using a lookup table functioning as a logical and physical address translation table, (2) a function of hiding read/write on a page basis and an erase operation on a block basis, (3) a function of executing garbage collection (GC) of a NAND flash memory, and the like. The mapping between each logical address and a physical address of a NAND flash memory is invisible to a host. A block/page structure of a NAND flash memory is also invisible to a host.

Meanwhile, in a host, a kind of address translation (application level address translation) may be executed in some cases. This address translation uses an application level address translation table to manage mapping between each application level logical address and each SSD logical address. Further, in a host, a kind of GC (application level GC) that changes data arrangement in an SSD logical address space is executed in order to eliminate fragments generated in the logical address space.

However, in a redundant configuration where each of a host and an SSD has an address translation table (the SSD has a lookup table functioning as a logical and physical address translation table and the host has an application level address translation table), enormous memory resources are consumed to maintain these address translation tables. Moreover, double address translation including address translation on a host side and address translation on an SSD side also becomes a factor of lowering I/O performance.

Furthermore, application level GC on a host side increases a data write amount to an SSD to about several times (for example, twice) an actual user data amount. Such an increase in a data write amount together with write amplification of an SSD lowers storage performance of an entire system, and also shortens the lifetime of the SSD.

In order to solve such a problem, a countermeasure may be taken to transfer all functions of an FTL of a conventional SSD to a host.

However, in order to implement this countermeasure, it is necessary for the host to directly handle blocks and pages of a NAND flash memory. In a NAND flash memory, it is difficult for a host to directly handle a page because there is page write order restriction. Further, in a NAND flash memory, there is a case where a block includes a defective page (bad page). Handling a bad page is even more difficult for a host.

Therefore, in the present embodiment, a role of an FTL is shared between the host 2 and the flash storage device 3. Generally speaking, the host 2 manages a lookup table functioning as a logical and physical address translation table, where the host 2 designates only a block number of a block to be written with data and a logical address corresponding to the data, and a position (write destination position) in this block to be written with the data is determined by the flash storage device 3. An in-block physical address indicating the determined position (writing destination position) in this block is notified from the flash storage device 3 to the host 2.

In this manner, the host 2 handles only a block, and a position (for example, a page, a position in a page) in a block is handled by the flash storage device 3.

When it is necessary to write data to the flash storage device 3, the host 2 selects a block number (or requests the flash storage device 3 to allocate a free block), and transmits a write request (write command) designating a logical address and a block number of the selected block (or a block number of an allocated block notified by the flash storage device 3) to the flash storage device 3. The flash storage device 3 writes data from the host 2 to a block having the designated block number. In this case, the flash storage device 3 determines a position (write destination position) in this block, and writes data from the host 2 to the position (write destination position) in this block. Then, the flash storage device 3 notifies an in-block physical address indicating the position (write destination position) in this block to the host 2 as a response (return value) to the write request. Hereinafter, an FTL function transferred to the host 2 will be referred to as a global FTL.

A global FTL of the host 2 includes a function of executing a storage service, a wear control function, a function of realizing high availability, a de-duplication function that prevents multiple duplicate data portions having the same content from being stored in a storage, a garbage collection (GC) block selection function, a QoS control function, and the like. The QoS control function includes a function of determining an access unit for each QoS domain (or for each block). The access unit indicates a minimum data size (Grain) that the host 2 can write and read. The flash storage device 3 supports a single or a plurality of access units (Grain), and, when the flash storage device 3 supports a plurality of access units, the host 2 can instruct an access unit to be used to the flash storage device 3 for each QoS domain (or for each block).

Further, the QoS control function includes a function to prevent performance interference between QoS domains as much as possible. This function is basically a function for maintaining stable latency.

On the other hand, the flash storage device 3 can execute low level abstraction (LLA). LLA is a function for abstraction of a NAND flash memory. LLA includes a function to hide a defective page (bad page) and a function to maintain page write order restriction. LLA also includes a GC execution function. The GC execution function copies valid data in a copy source block (GC source block) designated by the host 2 to a copy destination block (GC destination block) designated by the host 2. The GC execution function of the flash storage device 3 determines a position (copy destination position) in a GC destination block to which valid data should be written, and copies valid data in a GC source block to a copy destination position in a GC destination block.

FIG. 2 shows role sharing between a conventional SSD and a host, and role sharing between the flash storage device 3 and the host 2 of the present embodiment.

The left part of FIG. 2 shows a hierarchical structure of an entire computer system including a conventional SSD and a host executing a virtual disk service.

In a host (server), a virtual machine service 101 for providing a plurality of virtual machines to a plurality of end users is executed. In each virtual machine on the virtual machine service 101, an operating system and a user application 102 used by a corresponding end user are executed.

Further, in the host (server), a plurality of virtual disk services 103 corresponding to a plurality of the user applications 102 are executed. Each of the virtual disk services 103 allocates part of capacity of storage resources in a conventional SSD as storage resources (a virtual disk) for the corresponding user application 102. In each of the virtual disk services 103, application level address translation that converts an application level logical address to an SSD logical address is executed by using an application level address translation table. Further, in the host, application level GC 104 is also executed.

Transmission of a command from the host (server) to the conventional SSD and return of a command completion response from the conventional SSD to the host (server) are performed via an I/O queue 200 existing in each of the host (server) and the conventional SSD.

The conventional SSD includes a write buffer (WB) 301, a lookup table (LUT) 302, a garbage collection function 303, and a NAND flash memory (NAND flash array) 304. The conventional SSD manages only one lookup table (LUT) 302, and resources of the NAND flash memory (NAND flash array) 304 are shared by a plurality of the virtual disk services 103.

In this configuration, duplicated GC including the application level GC 104 under the virtual disk service 103 and the garbage collection function 303 (LUT level GC) in the conventional SSD increases write amplification. Further, in the conventional SSD, a frequency of GC increases due to an increase in a data write amount from a certain end user or a certain virtual disk service 103. This may generate a noisy neighbor problem that causes degradation of I/O performance for other end users or the other virtual disk services 103.

Also, due to the presence of duplicated resources including an application level address translation table in each virtual disk service and the LUT 302 in the conventional SSD, a lot of memory resources are consumed.

The right part of FIG. 2 shows a hierarchical structure of an entire computer system including the flash storage device 3 and the host 2 of the present embodiment.

In the host (server) 2, a virtual machine service 401 for providing a plurality of virtual machines to a plurality of end users is executed. In each virtual machine on the virtual machine service 401, an operating system and a user application 402 used by a corresponding end user are executed.

In the host (server) 2, a plurality of I/O services 403 corresponding to a plurality of the user applications 402 are executed. The I/O services 403 may include an LBA-based block I/O service, a key value store service, and the like. Each of the I/O services 403 includes a look-up table (LUT) 411 that manages mapping between each logical address and each physical address of the flash storage device 3. Here, the logical address means an identifier by which data to be accessed is identifiable. This logical address may be a logical block address (LBA) that designates a position on a logical address space, a key (a tag) of a key value store, or a hash value of a key.

In an LBA-based block I/O service, an LUT 411 that manages mapping between each logical address (LBA) and each physical address of the flash storage device 3 may be used.

In a key value store service, the LUT 411 that manages mapping between each logical address (that is, a tag like a key) and each physical address indicating a physical storage location in the flash storage device 3 that stores data corresponding to the logical addresses (that is, tags like keys) may be used. In the LUT 411, a correspondence relationship between a tag, a physical address at which data identified by this tag is stored, and a data length of this data may be managed.

Each end user can select an addressing method to be used (LBA, a key value store key, or the like).

Each of the LUTs 411 converts each logical address from the user application 402 into each physical address of the flash storage device 3 instead of converting each logical address from the user application 402 into each logical address for the flash storage device 3. That is, each of the LUTs 411 is a table in which a table for converting a logical address for the flash storage device 3 into a physical address and an application level address translation table are integrated (merged).

Further, each of the I/O services 403 includes a GC block selection function. The GC block selection function can manage a valid data amount of each block using a corresponding LUT. In this manner, it is possible to select a GC source block.

In the host (server) 2, the I/O service 403 may exist for each of the aforementioned QoS domains. The I/O service 403 belonging to a certain QoS domain may manage mapping between each logical address used by the user application 402 in a corresponding QoS domain and each block number of a block group belonging to a resource group allocated to a corresponding QoS domain.

Transmission of a command from the host (server) 2 to the flash storage device 3 and return of a response of command completion, and the like, from the flash storage device 3 to the host (server) 2 are executed via an I/O queue 500 existing in each of the host (server) 2 and the flash storage device 3. The I/O queues 500 may also be classified into a plurality of queue groups corresponding to a plurality of QoS domains.

The flash storage device 3 includes a plurality of write buffers (WB) 601 corresponding to a plurality of QoS domains, a plurality of garbage collection (GC) functions 602 corresponding to a plurality of QoS domains, and a NAND flash memory (NAND flash array) 603.

In the configuration shown in the right part of FIG. 2, since an upper layer (host 2) can recognize a block boundary, it is possible to write user data into each block in consideration of a block boundary and block size. That is, the host 2 can recognize individual blocks of the NAND flash memory (NAND flash array) 603. In this manner, for example, it is possible to perform control, such as writing data into one entire block simultaneously, and invalidating entire data in one block by deleting and updating. As a result, a situation where valid data and invalid data coexist in one block can be made to hardly occur. Therefore, it is possible to reduce a frequency with which GC needs to be executed. By reducing a frequency of GC, write amplification is reduced, performance of the flash storage device 3 can be improved, and the lifetime of the flash storage device 3 can be maximized. As described above, a configuration in which the upper layer (host 2) can recognize a block number is useful.

On the other hand, a position in a block where data is to be written is determined not by the upper layer (host 2) but by the flash storage device 3. Therefore, a defective page (bad page) can be hidden, and page write order restriction can be maintained.

FIG. 3 shows a variation of the system configuration of FIG. 1.

In FIG. 3, data transfer between a plurality of hosts 2A and a plurality of the flash storage devices 3 is executed via network equipment (here, a network switch 1).

That is, in a computer system of FIG. 3, a storage management function of the host (server) 2 in FIG. 1 is transferred to a manager 2B, and a front-end function of the host (server) 2 is transferred to the plurality of hosts (end user service hosts) 2A.

The manager 2B manages a plurality of the flash storage devices 3, and, in response to a request from each of the hosts (end user service hosts) 2A, allocates storage resources of the flash storage devices 3 to each of the hosts (end user service hosts) 2A.

Each of the hosts (end user service hosts) 2A is connected to one or more end user terminals 61 via a network. Each of the hosts (end user service hosts) 2A manages a lookup table (LUT) which is the integrated (merged) logical and physical address translation table described above. Each of the hosts (end user service hosts) 2A uses its own LUT to manage only mapping between each logical address used by a corresponding end user and each physical address of resources allocated to itself. Thus, this configuration allows the system to be easily scaled out.

A global FTL of each of the hosts 2A has a function of managing a lookup table (LUT), a function of realizing high availability, a QoS control function, a GC block selection function, and the like. The manager 2B is a dedicated device (computer) for managing a plurality of the flash storage devices 3. The manager 2B has a global resource reservation function for reserving storage resources for the capacity requested by each of the hosts 2A. Moreover, the manager 2B has a wear monitoring function for monitoring the degree of wear of each of the flash storage devices 3, a NAND resource allocation function for allocating reserved storage resources (NAND resources) to each of the hosts 2A, a QoS control function, a global clock management function, and the like.

A low-level abstraction (LLA) of each of the flash storage devices 3 has a function of hiding a defective page (bad page), a function of maintaining page write order restriction, a function of managing a write buffer, a function of executing GC, and the like.

According to the system configuration of FIG. 3, management of each of the flash storage devices 3 is executed by the manager 2B. Accordingly, each of the hosts 2A only needs to execute operation of transmitting an I/O request to one or more flash storage devices 3 allocated to itself and operation of receiving a response from the flash storage device 3. That is, data transfer between a plurality of the hosts 2A and a plurality of the flash storage devices 3 is executed via only the network switch 1, and the manager 2B is not involved in this data transfer. Further, as described above, contents of the LUT managed by each of the hosts 2A are independent of each other. Therefore, the number of the hosts 2A can be easily increased, and a scale-out type system configuration can be realized.

FIG. 4 shows a configuration example of the flash storage device 3.

The flash storage device 3 includes a controller 4 and a nonvolatile memory (NAND flash memory) 5. The flash storage device 3 may also include a random access memory, for example a DRAM 6.

The NAND flash memory 5 includes a memory cell array including a plurality of memory cells arranged in a matrix. The NAND flash memory 5 may be a NAND flash memory of a two-dimensional structure or a NAND flash memory of a three-dimensional structure.

The memory cell array of the NAND flash memory 5 includes a plurality of blocks BLK0 to BLKm−1. Each of the blocks BLK0 to BLKm−1 is organized with a number of pages (in this case, pages P0 to Pn−1). The blocks BLK0 to BLKm−1 function as an erase unit. A block may also be referred to as an "erase block", a "physical block", or a "physical erase block". Each of the pages P0 to Pn−1 includes a plurality of memory cells connected to the same word line. The pages P0 to Pn−1 are units of a data write operation and a data read operation.

The controller 4 is electrically connected to the NAND flash memory 5 which is a nonvolatile memory via a NAND interface 13, such as Toggle and an open NAND flash interface (ONFI). The controller 4 is a memory controller (control circuit) configured to control the NAND flash memory 5.

As shown in FIG. 5, the NAND flash memory 5 includes a plurality of NAND flash memory dies. Each NAND flash memory die is a nonvolatile memory die including a memory cell array including a plurality of blocks BLK and a peripheral circuit for controlling the memory cell array. Individual NAND flash memory dies can operate independently. Therefore, the NAND flash memory die functions as a parallel operation unit. The NAND flash memory die is also referred to as a "NAND flash memory chip" or a "nonvolatile memory chip". FIG. 5 exemplifies a case where 16 channels Ch1, Ch2, . . . , Ch16 are connected to the NAND interface 13, and the same number (for example, two dies per channel) of NAND flash memory dies is connected to each of the channels Ch1, Ch2, . . . , Ch16. Each channel includes a communication line (memory bus) for communicating with a corresponding NAND flash memory die.

The controller 4 controls the NAND flash memory dies #1 to #32 via the channels Ch1, Ch2, . . . , Ch16. The controller 4 can simultaneously drive the channels Ch1, Ch2, . . . , Ch16.

The 16 NAND flash memory dies #1 to #16 connected to the channels Ch1 to Ch16 may be organized as a first bank, and the remaining 16 NAND flash memory dies #17 to #32 connected to the channels Ch1 to Ch16 may be organized as a second bank. A bank functions as a unit for parallel operation of a plurality of memory modules by bank interleaving. In the configuration example of FIG. 5, up to 32 NAND flash memory dies can be operated in parallel by 16 channels and bank interleaving using two banks.

In the present embodiment, the controller 4 may manage a plurality of blocks (hereinafter referred to as "super blocks") each of which is configured with a plurality of blocks BLK, or may execute an erasing operation in units of super blocks.

A super block may include, without limitation, a total of 32 blocks BLK selected one by one from the NAND flash memory dies #1 to #32. Note that each of the NAND flash memory dies #1 to #32 may have a multi-plane configuration. For example, in a case where each of the NAND flash memory dies #1 to #32 has a multi-plane configuration including two planes, one super block may include a total of 64 blocks BLK selected one by one from 64 planes corresponding to the NAND flash memory dies #1 to #32. FIG. 6 exemplifies a case where one super block SB is configured with a total of 32 blocks BLK (blocks BLK enclosed by a thick frame in FIG. 5) selected one by one from the NAND flash memory dies #1 to #32.

As shown in FIG. 4, the controller 4 includes a host interface 11, a CPU 12, a NAND interface 13, a DRAM interface 14, and the like. The CPU 12, the NAND interface 13, and the DRAM interface 14 are interconnected via a bus 10.

The host interface 11 is a host interface circuit configured to execute communication with the host 2. The host interface 11 may be, for example, a PCIe controller (NVMe controller). The host interface 11 receives various requests (commands) from the host 2. These requests (commands) include a write request (write command), a read request (read command), and various other requests (commands).

The CPU 12 is a processor configured to control the host interface 11, the NAND interface 13, and the DRAM interface 14. In response to power-on of the flash storage device 3, the CPU 12 loads a control program (firmware) from the NAND flash memory 5 or a ROM (not shown) into the DRAM 6 and executes this firmware to perform various processing. It should be noted that the firmware may be loaded on an SRAM (not shown) in the controller 4. The CPU 12 can execute command processing and the like for processing various commands from the host 2. An operation of the CPU 12 is controlled by the above-mentioned firmware executed by the CPU 12. Part or whole of command processing may be executed by dedicated hardware in the controller 4.

The CPU 12 can function as a write operation controller 21, a read operation controller 22, and a GC operation controller 23. On the write operation controller 21, the read operation controller 22, and the GC operation controller 23, an application program interface (API) for implementing the system configuration shown on the right side of FIG. 2 is mounted.

The write operation controller 21 receives a write request (write command) designating a block number and a logical address from the host 2. The logical address is an identifier by which data (user data) to be written can be identified, and may be, for example, an LBA, a tag such as a key value store key, or a hash value of a key. The block number is an identifier that designates a block to which the data is to be written. As the block number, various values by which any one of a plurality of blocks is uniquely identifiable may be used. A block designated by the block number may be a physical block or the super block described above. When receiving a write command, the write operation controller 21 first determines a position (write destination position) in a block (write destination block) having this designated block number to which data from the host 2 is to be written. Next, the write operation controller 21 writes data (write data) from the host 2 to the write destination position of the write destination block. In this case, the write operation controller 21 can write not only data from the host 2, but also both this data and a logical address of this data in the write destination block.

Then, the write operation controller 21 notifies the host 2 of an in-block physical address indicating the above-mentioned write destination position of the write destination block. The in-block physical address is expressed by an in-block offset indicating the write destination position in the write destination block.

In this case, the in-block offset indicates an offset from the head of the write destination block to the write destination position, that is, an offset of the write destination position relative to the head of the write destination block. The size of an offset from the head of the write destination block to the write destination position is indicated by a multiple of a granularity (Grain) having a size different from a page size. The granularity (Grain) is the access unit described above. A maximum value of the size of the granularity (Grain) is limited to a block size. In other words, an in-block offset indicates an offset from the head of the write destination block to the write destination position by a multiple of the granularity having a size different from a page size.

The granularity (Grain) may have a size smaller than a page size. For example, when a page size is 16K bytes, the size of the granularity (Grain) may be 4K bytes. In this case, in one block, a plurality of offset positions each having a size of 4K bytes are specified. An in-block offset corresponding to a first offset position in a block is, for example, zero, an in-block offset corresponding to a next offset position in the block is, for example, one, and an in-block offset corresponding to a further next offset position in the block is, for example, two.

Alternatively, the granularity (Grain) may have a size larger than a page size. For example, the size of the granularity (Grain) may be several times as large as a page size. When a page size is 16K bytes, the size of the granularity may be 32K bytes.

As described above, the write operation controller 21 itself determines a write destination position in a block having a block number from the host 2, and writes write data from the host 2 to this write destination position in this block. Then, the write operation controller 21 notifies the host 2 of an in-block physical address (in-block offset) indicating the write destination position as a response (return value) corresponding to the write request. Alternatively, the write operation controller 21 may notify the host 2 of a set of a logical address, a block number, and an in-block physical address (in-block offset), instead of notifying the host 2 of only the in-block physical address (in-block offset).

Therefore, the flash storage device 3 can hide page write order restriction, a bad page, a page size, and the like, while causing the host 2 to handle a block number.

As a result, the host 2 can manage which user data exists in which block number without being aware of page write order restriction, a bad page, and a page size, while being able to recognize a block boundary.

When receiving a read request (read command) designating a physical address (that is, a block number and an in-block offset) from the host 2, the read operation controller 22 reads data from a physical storage position to be read in a block to be read based on the block number and the in-block offset. The block to be read is identified by the block number. The physical storage position to be read in this block is identified by an in-block offset. By using the in-block offset, the host 2 does not need to handle different page sizes for each generation of NAND flash memories.

In order to obtain a physical storage position to be read, the read operation controller 22 may first divide the in-block offset by the number of granularity representing a page size (the number of granularity representing a page size is four in a case where the page size is 16K bytes and the granularity (Grain) is 4K bytes) and determine the quotient and remainder obtained by this division as a page number to be read and an in-page offset to be read, respectively.

When receiving, from the host 2, a GC control command that designates a copy source block number (GC source block number) and a copy destination block number (GC destination block number) for garbage collection of the NAND flash memory 5, the GC operation controller 23 selects, from a plurality of blocks of the NAND flash memory 5, a block having the designated copy source block number and a block having the designated copy destination block number as a copy source block (GC source block) and a copy destination block (GC destination block). The GC operation controller 23 determines a copy destination position in a GC destination block in which valid data stored in the selected GC source block is to be written, and copies the valid data to the copy destination position in the GC destination block.

Then, the GC operation controller 23 notifies the host 2 of a logical address of the valid data, a copy destination block number, and an in-block physical address (in-block offset) indicating the copy destination position in the GC destination block.

Management of valid data and invalid data may be executed using a block management table 32. The block management table 32 may exist, for example, for each block. In the block management table 32 corresponding to a certain block, a bitmap flag indicating validity or invalidity of each piece of data in this block is stored. Here, the valid data means data linked as latest data from a logical address, and may be read by the host 2 later. The invalid data means data that is no longer read by the host 2. For example, data associated with a certain logical address is valid data, and data not associated with any logical address is invalid data.

As described above, the GC operation controller 23 determines a position (copy destination position) in a copy destination block (GC destination block) to which valid data stored in a copy source block (GC source block) is to be written, and copies the valid data to the determined position (copy destination position) of the copy destination block (GC destination block). In this case, the GC operation controller 23 may copy both valid data and a logical address of the valid data to a copy destination block (GC destination block).

In the present embodiment, as described above, the write operation controller 21 can write both data (write data) from the host 2 and logical address from the host 2 to a write destination block. Therefore, the GC operation controller 23 can easily acquire a logical address of each piece of data in a copy source block (GC source block) from this copy source block (GC source block). Accordingly, copied valid data can be easily notified to the host 2.

The NAND interface 13 is a memory control circuit configured to control the NAND flash memory 5 under the control of the CPU 12. The DRAM interface 14 is a DRAM control circuit configured to control the DRAM 6 under the control of the CPU 12. Part of a storage region of the DRAM 6 is used for storing an internal buffer (shared cache) 31. Further, another part of the storage region of the DRAM 6 is used for storing the block management table 32. The internal buffer (shared cache) 31 and the block management table 32 may be stored in an SRAM (not shown) in the controller 4.

FIG. 7 shows a data write operation in which the host 2 designates a logical address and a block number and the flash storage device 3 determines an in-block physical address (in-block offset), and a data read operation in which the host 2 designates a block number and an in-block physical address (in-block offset).

The data write operation is executed in a process described below.

(1) When a write processor 412 of the host 2 needs to write data (write data) to the flash storage device 3, the write processor 412 may request the flash storage device 3 to allocate a free block. The controller 4 of the flash storage device 3 includes a block allocator 701 that manages a free block group of the NAND flash memory 5. When the block allocator 701 receives this request (block allocation request) from the write processor 412, the block allocator 701 allocates one free block of a free block group to the host 2, and notifies a block number (BLK #) of the allocated block to the host 2.

Alternatively, in a configuration in which the write processor 412 manages a free block group, the write processor 412 itself may select a write destination block.

(2) The write processor 412 transmits, to the flash storage device 3, a write request designating a logical address (for example, LBA) corresponding to write data and a block number (BLK #) of a write destination block.

(3) The controller 4 of the flash storage device 3 includes a page allocator 702 that allocates a page for writing data. When the page allocator 702 receives a write request, the page allocator 702 determines an in-block physical address (in-block PBA) indicating a write destination position in a block (write destination block) having a block number designated by the write request. An in-block physical address (in-block PBA) can be expressed by the in-block offset (also referred to simply as an offset) described above. The controller 4 writes write data from the host 2 to a write destination position in a write destination block based on a block number designated by the write request and the in-block physical address (in-block PBA).

(4) The controller 4 notifies the host 2 of the in-block physical address (in-block PBA) indicating the write destination position as a response to the write request. Alternatively, the controller 4 may notify the host 2 of a set of a logical address (LBA) corresponding to the write data, a block number (BLK #) of the write destination block, and an in-block PBA (offset) indicating the write destination position as a response to the write request. In other words, the controller notifies the host 2 of either an in-block physical address, or a set of a logical address, a block number, and an in-block physical address. In the host 2, the LUT 411 is updated so that a physical address (block number, in-block physical address (in-block offset)) indicating a physical storage position where the write data is written is mapped to a logical address of the write data.

The data read operation is executed in a process described below.

(1)' When the host 2 needs to read data from the flash storage device 3, the host 2 refers to the LUT 411 and acquires a physical address (block number, in-block physical address (in-block offset)) corresponding to a logical address of the data to be read from the LUT 411.

(2)' The host 2 sends, to the flash storage device 3, a read request designating the acquired block number and in-block physical address (in-block offset). When the controller 4 of the flash storage device 3 receives this read request from the host 2, the controller 4 identifies a block to be read and a physical storage position to be read based on the block number and the in-block physical address, and reads data from the physical storage position to be read in the block to be read.

FIG. 8 shows a write command applied to the flash storage device 3.

The write command is a command for requesting the flash storage device 3 to write data. The write command may include a command ID, a block number BLK #, a logical address, a length, and the like.

The command ID is an ID (command code) indicating that this command is a write command, and the write command includes a command ID for a write command.

The block number BLK # is an identifier (block address) by which a block where data is to be written is identifiable.

The logical address is an identifier for identifying write data to be written. As described above, this logical address may be an LBA, a key of a key value store, or a hash value of a key. When the logical address is an LBA, a logical address (start LBA) included in this write command indicates a logical position (first logical position) at which the write data is to be written.

The length indicates a length of write data to be written. This length (data length) may be designated by the number of granularity (Grain), may be designated by the number of LBAs, or may have its size designated by byte.

When receiving the write command from the host 2, the controller 4 determines a write destination position in a block having a block number designated by the write command. The write destination position is determined in consideration of restriction on the page write order, a bad page, and the like. Then, the controller 4 writes data from the host 2 to this write destination position in this block having the block number designated by the write command.

FIG. 9 shows a response to the write command of FIG. 8.

This response includes an in-block physical address and a length. The in-block physical address indicates a position (physical storage position) in a block in which data is written. As described above, the in-block physical address can be designated by an in-block offset. The length indicates a length of written data. This length (data length) may be designated by the number of granularity (Grain), may be designated by the number of LBAs, or may have its size designated by byte.

Alternatively, this response may further include not only the in-block physical address and the length, but also a logical address and a block number. The logical address is a logical address included in the write command of FIG. 8. The block number is a logical address included in the write command of FIG. 8.

FIG. 10 shows a Trim command applied to the flash storage device 3. This Trim command is a command including a block number and an in-block physical address (in-block offset) indicating a physical storage position at which data to be invalidated is stored. That is, this Trim command can designate a physical address, not a logical address like an LBA. This Trim command includes a command ID, a physical address, and a length.

The command ID is an ID (command code) indicating that this command is a Trim command, and the Trim command includes a command ID for the Trim command.

The physical address indicates a first physical storage position at which data to be invalidated is stored. In the present embodiment, this physical address is designated by a combination of a block number and an offset (in-block offset).

The length indicates a length of data to be invalidated. This length (data length) may be designated by the number of granularity (Grain) or may be designated by byte.

The controller 4 manages a flag (bitmap flag) indicating validity or invalidity of each piece of data included in each of a plurality of blocks by using the block management table 32. When receiving a Trim command including a block number and an offset (in-block offset) indicating a physical storage position at which data to be invalidated is stored from the host 2, the controller 4 updates the block management table 32 and changes a flag (bit map flag) corresponding to data of a physical storage position corresponding to the block number and the in-block offset included in the Trim command to a value indicating invalid.

FIG. 11 shows an in-block offset that defines an in-block physical address.

A block number designates one block BLK. As shown in FIG. 11, each block BLK includes a plurality of pages (in this case, page 0 to page n).

In a case where a page size (user data storage region of each page) is 16K bytes and the size of the granularity (Grain) is 4 KB, this block BLK is logically divided into 4×(n+1) regions.

Offset +0 indicates a first 4 KB region of page 0, offset +1 indicates a second 4 KB region of page 0, offset +2 indicates a third 4 KB region of page 0, and offset +3 indicates a fourth 4 KB region of page 0.

Offset +4 indicates a first 4 KB region of page 1, offset +5 indicates a second 4 KB region of page 1, offset +6 indicates a third 4 KB region of page 1, and offset +7 indicates a fourth 4 KB region of page 1.

FIG. 12 shows a write operation executed in response to a write command.

Now assume that a block BLK #1 is allocated as a write destination block. The controller 4 writes data into the block BLK #1 on a page basis in the order of page 0, page 1, page 2, . . . , page n.

FIG. 12 assumes a case where a write command designating a block number (=BLK #1), a logical address (LBAx), and a length (=4) is received from the host 2 in a state where 16K bytes of data has already been written in page 0 of the block BLK #1. The controller 4 determines page 1 of the block BLK #1 as a write destination position, and writes the write data of 16K bytes received from the host 2 to page 1 of the block BLK #1. Then, the controller 4 returns an offset (in-block offset) and a length to the host 2 as a response to the write command. In this case, the offset (in-block offset) is +5 and the length is 4. Alternatively, the controller 4 may return a logical address, a block number, an offset (in-block offset), and a length to the host 2 as a response to the write command. In this case, the logical address is LBAx, the block number is BLK #1, the offset (in-block offset) is +5, and the length is 4.

FIG. 13 shows a write operation for skipping a defective page (bad page).

FIG. 13 assumes a case where a write command designating a block number (=BLK #1), a logical address (LBAx+1), and a length (=4) is received from the host 2 in a state where data has already been written in page 0 and page 1 of the block BLK #1. If page 2 of the block BLK #1 is a defective page, the controller 4 determines page 3 of the block BLK #1 as a write destination position, and writes 16K bytes of the write data received from the host 2 to page 3 of the block BLK #1. Then, the controller 4 returns an offset (in-block offset) and a length to the host 2 as a response to the write command. In this case, the offset (in-block offset) is +12 and the length is 4. Alternatively, the controller 4 may return a logical address, a block number, an offset (in-block offset), and a length to the host 2 as a response to the write command. In this case, the logical address is LBAx+1, the block number is BLK #1, the offset (in-block offset) is +12, and the length is 4.

FIG. 14 shows another example of the write operation for skipping a defective page.

FIG. 14 assumes a case where data is written across two pages sandwiching a defective page. Now, assume that data has already been written in page 0 and page 1 of a block BLK #2, and unwritten 8K bytes of write data remains in an internal buffer (shared cache) 31. In this state, if a write command designating a block number (=BLK #2), a logical address (LBAy), and a length (=6) is received, the controller 4 uses the unwritten 8K-byte write data and first 8K-byte write data in 24K-byte write data newly received from the host 2 to prepare 16K-byte write data corresponding to a page size. Then, the controller 4 writes the prepared 16K-byte write data to page 2 of the block BLK #2.

If next page 3 of the block BLK #2 is a defective page, the controller 4 determines page 4 of the block BLK #2 as a write destination position, and writes the remaining 16K-byte write data in the 24K-byte write data received from the host 2 to page 4 of the block BLK #2.

Then, the controller 4 returns two offsets (in-block offsets) and two lengths to the host 2 as a response to the write command. In this case, this response may include an offset (=+10), a length (=2), an offset (=+16), and a length (=4). Alternatively, as a response to this write command, the controller 4 may return LBAy, a block number (=BLK #2), an offset (=+10), a length (=2), a block number (=BLK #2), an offset (=+16), and a length (=4) to the host 2.

FIGS. 15 and 16 show an operation of writing a pair of a logical address and data to a page in a block.

In each block, each page may include a user data region for storing user data and a redundant region for storing management data. A page size is 16 KB and a little extra.

The controller 4 writes both 4-KB user data and a logical address (for example, LBA) corresponding to the 4-KB user data to a write destination block BLK. In this case, as shown in FIG. 15, four data sets each including an LBA and 4-KB user data may be written to the same page. An in-block offset may indicate a set boundary.

Alternatively, the configuration may be such that, as shown in FIG. 16, four pieces of 4-KB user data are written to a user data region in a page, and four LBAs corresponding to these four pieces of 4-KB user data are written to a redundant region in this page.

FIG. 17 shows a relationship between a block number and an offset (in-block offset) in a case where a super block is used. Hereinafter, an in-block offset is also referred to simply as an offset.

Here, in order to simplify illustration, a case where one super block SB #1 is configured with four blocks BLK #11, BLK #21, BLK #31, and BLK #41 is assumed. The controller 4 writes data in the order of page 0 of the block BLK #11, page 0 of the block BLK #21, page 0 of the block BLK #31, page 0 of the block BLK #41, page 1 of the block BLK #11, page 1 of the block BLK #21, page 1 of the block BLK #31, page 1 of the block BLK #41, and so on.

Offset +0 indicates a first 4-KB region of page 0 of the block BLK #11, offset +1 indicates a second 4-KB region of page 0 of the block BLK #11, offset +2 indicates a third 4-KB region of page 0 of the block BLK #11, and offset +3 indicates a fourth 4-KB region of page 0 of the block BLK #11.

Offset +4 indicates a first 4-KB region of page 0 of the block BLK #21, offset +5 indicates a second 4-KB region of page 0 of the block BLK #21, offset +6 indicates a third 4-KB region of page 0 of the block BLK #21, and offset +7 indicates a fourth 4-KB region of page 0 of the block BLK #21.

Similarly, offset +12 indicates a first 4-KB region of page 0 of the block BLK #41, offset +13 indicates a second 4-KB region of page 0 of the block BLK #41, offset +14 indicates a third 4-KB region of page 0 of the block BLK #41, and offset +15 indicates a fourth 4-KB region of page 0 of the block BLK #41.

Offset +16 indicates a first 4-KB region of page 1 of the block BLK #11, offset +17 indicates a second 4-KB region of page 1 of the block BLK #11, offset +18 indicates a third 4-KB region of page 1 of the block BLK #11, and offset +19 indicates a fourth 4-KB region of page 1 of the block BLK #11.

Offset +20 indicates a first 4-KB region of page 1 of the block BLK #21, offset +21 indicates a second 4-KB region of page 1 of the block BLK #21, offset +22 indicates a third 4-KB region of page 1 of the block BLK #21, and offset +23 indicates a fourth 4-KB region of page 1 of the block BLK #21.

Similarly, offset +28 indicates a first 4-KB region of page 1 of the block BLK #41, offset +29 indicates a second 4-KB region of page 1 of the block BLK #41, offset +30 indicates a third 4-KB region of page 1 of the block BLK #41, and offset +31 indicates a fourth 4-KB region of page 1 of the block BLK #41.

FIG. 18 shows a maximum block number get command applied to the flash storage device 3.

The maximum block number get command is a command for acquiring a maximum block number from the flash storage device 3. By transmitting the maximum block number get command to the flash storage device 3, the host 2 can recognize a maximum block number indicating the number of blocks included in the flash storage device 3. The maximum block number get command includes a command ID for the maximum block number get command and does not include a parameter.

FIG. 19 shows a response to the maximum block number get command.

When receiving the maximum block number get command from the host 2, the flash storage device 3 returns the response shown in FIG. 19 to the host 2. This response includes a parameter indicating a maximum block number (that is, a total number of available blocks included in the flash storage device 3).

FIG. 20 shows a block size get command applied to the flash storage device 3.

The block size get command is a command for acquiring a block size from the flash storage device 3. By transmitting the block size get command to the flash storage device 3, the host 2 can recognize a block size of the NAND flash memory 5 included in the flash storage device 3.

Note that, in another embodiment, the block size get command may include a parameter designating a block number. When receiving a block size get command designating a certain block number from the host 2, the flash storage device 3 returns a block size of a block having this block number to the host 2. As a result, even in a case where block sizes of blocks included in the NAND flash memory 5 are not uniform, the host 2 can recognize a block size of each of the individual blocks.

FIG. 21 shows a response to the block size get command.

When receiving a block size get command from the host 2, the flash storage device 3 returns a block size (a common block size of each of blocks included in the NAND flash memory 5) to the host 2. In this case, if a block number is designated by the block size get command, the flash storage device 3 returns a block size of a block having this block number to the host 2 as described above.

FIG. 22 shows a block allocate command applied to the flash storage device 3.

The block allocate command is a command (block allocation request) that requests the flash storage device 3 to allocate a block (free block). The host 2 requests the flash storage device 3 to allocate a free block by transmitting a block allocate command to the flash storage device 3, and, in this manner, can acquire a block number (block number of the allocated free block).

In a case where the flash storage device 3 manages a free block group by a free block list and the host 2 does not manage a free block group, the host 2 requests the flash storage device 3 to allocate a free block, and, in this manner, acquires a block number. On the other hand, in a case where the host 2 manages a free block group, the host 2 itself can select one of free block groups. Accordingly, a block allocate command does not need to be transmitted to the flash storage device 3.

FIG. 23 shows a response to the block allocate command.

Upon receiving the block allocate command from the host 2, the flash storage device 3 selects a free block to be allocated to the host 2 from the free block list, and returns a response including a block number of the selected free block to the host 2.

FIG. 24 shows block information acquisition processing executed by the host 2 and the flash storage device 3.

When the host 2 starts using the flash storage device 3, the host 2 first transmits a maximum block number get command to the flash storage device 3. A controller 4 of the flash storage device 3 returns a maximum block number to the host 2. The maximum block number indicates a total number of available blocks. In a case where the above super block is used, the maximum block number may indicate a total number of available super blocks.

Next, the host 2 transmits a block size get command to the flash storage device 3 to acquire a block size. In this case, the host 2 may transmit a block size get command designating a block number 1, a block size get command designating a block number 2, a block size get command designating a block number 3, and so on to the flash storage device 3, and individually acquire block size of all the blocks.

By this block information acquisition processing, the host 2 can recognize the number of available blocks and a block size of each block.

FIG. 25 shows a sequence of write processing executed by the host 2 and the flash storage device 3.

The host 2 first requests the flash storage device 3 to allocate a free block by selecting a block (free block) to be used for writing by itself, or sending a block allocate command to the flash storage device 3. Then, the host 2 transmits a write command including the block number BLK # of the block selected by itself (or the block number BLK # of the free block allocated by the flash storage device 3), a logical address (LBA), and a length to the flash storage device 3 (Step S20).

When the controller 4 of the flash storage device 3 receives this write command, the controller 4 determines a write destination position in a block having this block number BLK #(write destination block BLK #) to which write data from the host 2 is to be written, and writes the write data to the write destination position of the write destination block BLK # (Step S11). In Step S11, the controller 4 may write both a logical address (an LBA in this case) and the write data to the write destination block.

The controller 4 updates the block management table 32 corresponding to the write destination block BLK #, and changes a bitmap flag corresponding to the written data (that is, a bitmap flag corresponding to an offset (in-block offset) to which the data is written) from 0 to 1 (Step S12).

For example, as shown in FIG. 26, assume that 16K-byte update data whose start LBA is LBAx is written at a physical storage position corresponding to offsets +4 to +7 of the block BLK #1. In this case, as shown in FIG. 27, in a block management table for the block BLK #1, each of the bit map flags corresponding to the offsets +4 to +7 is changed from 0 to 1.

Then, as shown in FIG. 25, the controller 4 returns a response to the write command to the host 2 (Step S13). This response includes at least an offset (in-block offset) to which this data is written.

When the host 2 receives this response, the host 2 updates the LUT 411 managed by the host 2, and maps a physical address to each logical address corresponding to the written write data. As shown in FIG. 28, the LUT 411 includes a plurality of entries corresponding to a plurality of logical addresses (for example, LBAs). In an entry corresponding to a certain logical address (for example, a certain LBA), a physical address PBA indicating a position (physical storage position) in the NAND flash memory 5 in which data corresponding to this LBA is stored, that is, a block number and an offset (in-block offset), is stored. As shown in FIG. 26, if 16K-byte update data whose start LBA is LBAx is written to a physical storage position corresponding to offsets +4 to +7 of the block BLK #1, the LUT 411 is updated as shown in FIG. 28, and BLK #1 and the offset +4 are stored in an entry corresponding to LBAx, BLK #1 and the offset +5 are stored in an entry corresponding to LBAx+1, BLK #1 and the offset +6 are stored in an entry corresponding to LBAx+2, and BLK #1 and the offset +7 are stored in an entry corresponding to LBAx+3.

Thereafter, as shown in FIG. 25, the host 2 transmits, to the flash storage device 3, a Trim command for invalidating previous data which has become unnecessary by writing the above-mentioned update data. In a case where previous data is stored at positions corresponding to the offset +0, the offset +1, the offset +2, and the offset +3 of a block BLK #0 as shown in FIG. 26, a Trim command designating a block number (=BLK #0), an offset (=+0), and a length (=4) is transmitted from the host 2 to the flash storage device 3 as shown in FIG. 29. In response to this Trim command, the controller 4 of the flash storage device 3 updates the block management table 32 (FIG. 25, Step S14). In Step S15, as shown in FIG. 29, in a block management table for the block BLK #0, each of bit map flags corresponding to offsets +0 to +3 is changed from 1 to 0.

FIG. 30 shows a read command applied to the flash storage device 3.

The read command is a command for requesting the flash storage device 3 to read data. This read command includes a command ID, a physical address PBA, a length, and a transfer destination pointer.

The command ID is an ID (command code) indicating that this command is a read command, and the read command includes a command ID for the read command.

The physical address PBA indicates a first physical storage position from which data is to be read. The physical address PBA is designated by a block number and an offset (in-block offset).

The length indicates a length of the data to be read. This data length can be designated by the number of Grains.

The transfer destination pointer indicates a position on a memory in the host 2 to which read data is to be transferred.

One read command can designate multiple pairs of a physical address PBA (block number, offset) and a length.

FIG. 31 shows a read operation.

Here, a case where a read command designating a block number (=BLK #2), an offset (=+5), and a length (=3) is received from the host 2 is assumed. The controller 4 of the flash storage device 3 reads data d1 to d3 from BLK #2 based on the block number (=BLK #2), the offset (=+5), and the length (=3). In this case, the controller 4 reads data for one page size from page 1 of BLK #2, and extracts the data d1 to d3 from this read data. Next, the controller 4 transfers the data d1 to d3 onto a host memory designated by the transfer destination pointer.

FIG. 32 shows an operation of reading a data portion stored in each of different physical storage positions in response to a read command from the host 2.

Here, a case where a read command that designates a block number (=BLK #2), an offset (=+10), a length (=2), a block number (=BLK #2), an offset (+16), and a length (=4) is received from the host 2 is assumed. Based on the block number (=BLK #2), the offset (=+10), and the length (=2), the controller 4 of the flash storage device 3 reads data for one page size from page 2 of BLK #2 and extracts the data d1 to data d2 from this read data. Next, the controller 4 reads data (data d3 to data d6) of one page size from page 4 of BLK #2 based on the block number (=BLK #2), the offset (=+16), and the length (=4). Then, the controller 4 transfers read data having a length (=6) obtained by combining the data d1 to d2 and the data d3 to d6 onto a host memory designated by the transfer destination pointer in the read command.

Thus, even in a case where a defective page exists in a block, a data portion can be read from a separate physical storage position without causing a read error. Further, even in a case where data is written across two blocks, this data can be read by issuing one read command.

FIG. 33 shows a sequence of read processing executed by the host 2 and the flash storage device 3.

The host 2 refers to the LUT 411 managed by the host 2 and converts a logical address included in a read request from a user application into a block number and an offset. Then, the host 2 transmits, to the flash storage device 3, a read command designating the block number, the offset, and a length.

When the controller 4 of the flash storage device 3 receives the read command from the host 2, the controller 4 determines a block corresponding to the block number designated by the read command as a block to be read, and determines a page to be read based on the offset designated by the read command (Step S31). In Step S31, the controller 4 may first divide the offset designated by the read command by the number of granularity (four in this case) expressing a page size. Then, the controller 4 may determine the quotient and remainder obtained by the division as a page number to be read and an in-page offset position to be read, respectively.

The controller 4 reads data specified by a block number, an offset, and a length from the NAND flash memory 5 (Step S32), and transmits the read data to the host 2.

FIG. 34 shows a GC control command applied to the flash storage device 3.

The GC control command is used to notify the flash storage device 3 of a GC source block number and a GC destination block number. The host 2 manages a valid data amount and an invalid data amount of each block, and can select several blocks having a smaller valid data amount as a GC source block. Further, the host 2 manages a free block list, and can select several free blocks as a GC destination block. This GC control command may include a command ID, a GC source block number, a GC destination block number, and the like.

The command ID is an ID (command code) indicating that this command is a GC control command, and the GC control command includes a command ID for the GC control command.

The GC source block number is a block number indicating a GC source block. The host 2 can designate which block should be a GC source block. The host 2 may set a plurality of GC source block numbers as one GC control command.

The GC destination block number is a block number indicating a GC destination block. The host 2 can designate which block should be a GC destination block. The host 2 may set a plurality of GC destination block numbers as one GC control command.

FIG. 35 shows a GC callback command.

The GC callback command is used to notify the host 2 of a logical address of valid data copied by GC and a block number and an offset indicating a copy destination position of the valid data.

The GC callback command may include a command ID, a logical address, a length, and a destination physical address.

The command ID is an ID (command code) indicating that this command is a GC callback command, and a GC callback command includes a command ID for the GC callback command.

The logical address indicates a logical address of valid data copied from a GC source block to a GC destination block by GC.

The length indicates a length of the copied data. This data length may be designated by the number of granularity (Grain).

The destination physical address indicates a position in a GC destination block to which valid data is copied. The destination physical address is designated by a block number and an offset (in-block offset).

FIG. 36 shows a process of a garbage collection (GC) operation.

For example, when the number of remaining free blocks included in a free block list managed by the host 2 becomes smaller than or equal to a threshold value, the host 2 selects a GC source block and a GC destination block, and transmits a GC control command designating the selected GC source block and the selected GC destination block to the flash storage device 3 (Step S41). Alternatively, in a configuration in which the write processor 412 manages a free block group, when the number of remaining free blocks becomes smaller than or equal to the threshold value, the write processor 412 may notify the host 2 of this fact, and the host 2 receiving the notification may perform block selection and transmission of a GC control command.

Upon receiving this GC control command, the controller 4 of the flash storage device 3 executes a data copy operation including an operation of determining a position (copy destination position) in a GC destination block in which valid data in a GC source block is to be written, and an operation of copying valid data in a GC source block to a copy destination position in the GC destination block (Step S51). In Step S51, the controller 4 copies not only valid data in the GC source block (copy source block), but also both the valid data and a logical address corresponding to the valid data from the GC source block (copy source block) to the GC destination block (copy destination block). As a result, a pair of data and a logical address is held in the GC destination block (copy destination block).

Further, in Step S51, a data copy operation is repeatedly executed until copying of all the valid data in the GC source block is completed. In a case where a plurality of GC source blocks are designated by a GC control command, the data copy operation is repeatedly executed until copying of all the valid data in all the GC source blocks is completed.

Then, for each piece of copied valid data, the controller 4 notifies the host 2 of a logical address (LBA) of the valid data, a destination physical address indicating a copy destination position of the valid data, and the like by using a GC callback command (Step S52). A destination physical address corresponding to certain valid data is expressed by a block number of a copy destination block (GC destination block) to which this valid data is copied and an in-block physical address (in-block offset) showing a physical storage position in the copy destination block to which this valid data is copied.

When the host 2 receives this GC callback command, the host 2 updates the LUT 411 managed by the host 2, and maps the destination physical address (block number, in-block offset) to a logical address corresponding to each piece of copied valid data (Step S42).

FIG. 37 shows an example of a data copy operation executed for GC.

FIG. 37 assumes a case where valid data (LBA=10) stored at a position corresponding to an offset +4 of a GC source block (in this case, a block BLK #50) is copied to a position corresponding to an offset +0 of a GC destination block (in this case, a block BLK #100), and valid data (LBA=20) stored at a position corresponding to an offset +10 of the GC source block (in this case, the block BLK #50) is copied to a position corresponding to an offset +1 of the GC destination block (in this case, the block BLK #100). In this case, the controller 4 notifies the host of {LBA10, BLK #100, offset (=+0), LBA20, BLK #100, offset (=+1)} (GC callback processing).

FIG. 38 shows the contents of the LUT 411 of the host 2 which is updated based on a result of the data copy operation of FIG. 37.

In this LUT 411, a block number and an offset corresponding to the LBA10 are updated from BLK #50, offset (=+4) to BLK #100, offset (=+0). Similarly, a block number and an offset corresponding to the LBA20 are updated from BLK #50, offset (=+10) to BLK #100, offset (=+1).

After the LUT 411 is updated, the host 2 may transmit a Trim command designating the BLK #50 and the offset (=+4) to the flash storage device 3 and invalidate data stored at a position corresponding to the offset (=+4) of the BLK #50. Further, the host 2 may transmit a Trim command designating the BLK #50 and the offset (=+10) to the flash storage device 3, and invalidate data stored at a position corresponding to the offset (=+10) of the BLK #50.

Alternatively, instead of transmitting the Trim command from the host 2, the controller 4 may update the block management table 32 as a part of the GC processing to invalidate these pieces of data.

As described above, according to the present embodiment, when receiving a write request designating a first logical address and a first block number from the host 2, the controller 4 of the flash storage device 3 determines a position (write destination position) in a block (write destination block) having the first block number to which data from the host 2 is to be written, writes the data from the host 2 to the write destination position of the write destination block, and notifies the host 2 of either a first in-block physical address indicating a first position, or a set of the first logical address, the first block number, and the first in-block physical address.

Therefore, there can be obtained a configuration, in which the host 2 handles a block number, and the flash storage device 3 determines a write destination position (in-block offset) in a block having a block number designated by the host 2 in consideration of page write order restriction, a bad page, and the like. With the host 2 handling a block number, merging of an application level address translation table of an upper layer (the host 2) and an LUT level address translation table of a conventional SSD can be performed. Further, the flash storage device 3 can control the NAND flash memory 5 in consideration of characteristics and restriction of the NAND flash memory 5. Moreover, since the host 2 can recognize a block boundary, user data can be written to each block in consideration of a block boundary and a block size. As a result, the host 2 can perform control, such as invalidating data in the same block all at once by updating data and the like, and the frequency with which GC is executed can be reduced. As a result, write amplification is reduced, and improvement in performance of the flash storage device 3 and maximization of the lifetime of the flash storage device 3 can be achieved.

Therefore, appropriate role sharing between the host 2 and the flash storage device 3 can be achieved, and improvement in I/O performance of an entire system including the host 2 and the flash storage device 3 can be achieved.

Further, when receiving a control command designating a copy source block number and a copy destination block number for garbage collection from the host 2, the controller 4 of the flash storage device 3 selects a second block having the copy source block number and a third block having the copy destination block number from the plurality of blocks, determines a copy destination position in the third block to which valid data stored in the second block is to be written, and copies the valid data to the copy destination position of the third block. Then, the controller notifies the host 2 of a logical address of the valid data, the copy destination block number, and a second in-block physical address indicating the copy destination position in the third block. As a result, also in GC, there can be obtained a configuration in which the host 2 handles only a block number (copy source block number, copy destination block number) and the flash storage device 3 determines a copy destination position in a copy destination block.

It should be noted that the flash storage device 3 may be used as one of a plurality of the flash storage devices 3 provided in a storage array. The storage array may be connected to an information processing device, such as a server computer, via a cable or a network. The storage array includes a controller that controls a plurality of the flash storage devices 3 in the storage array. When the flash storage device 3 is applied to the storage array, a controller of this storage array may function as the host 2 of the flash storage device 3.

Further, in the present embodiment, a NAND flash memory is exemplified as a nonvolatile memory. However, the function of the present embodiment can be applied to other various nonvolatile memories, such as a magnetoresistive random access memory (MRAM), a phase change random access memory (PRAM), a resistive random access memory (ReRAM), a ferroelectric random access memory (FeRAM), or the like.

FIG. 39 shows a system architecture of the host 2 and the flash storage device 3. Specifically, FIG. 39 shows a relationship between a write data buffer 51 and a flash translator 52 included in the host 2, and the write operation controller 21, the read operation controller 22, and an optimization processor 53 (including the GC operation controller 23) included in the flash storage device 3.

The host 2 stores write data in the write data buffer 51 on a host memory, and issues a write command to the flash storage device 3. The write command may include a data pointer indicating a position on the write data buffer 51 where the write data exists, a tag (for example, an LBA) for identifying the write data, a length of the write data, and an identifier (a block address or a stream ID) indicating a block to which the write data is to be written.

The flash storage device 3 can be implemented as any storage device among a type #1-storage device, a type #2-storage device, and a type #3-storage device described below.

The type #1-storage device is a type of storage device in which the host 2 designates both a block to which data is to be written and a page address to which this data is to be written. A write command applied to the type #1-storage device includes a block address, a page address, a data pointer, and a length. The block address designates a block to which the write data received from the host 2 is to be written. The page address designates a page in this block to which this write data is to be written. The data pointer indicates a position on a memory in the host 2 where this write data exists. The length indicates a length of this write data.

The type #2-storage device is a storage device of a type in which the host 2 designates a block to which data is to be written and the storage device designates a position (page) in this block to which this data is to be written. A write command applied to the type #2-storage device includes a tag (for example, an LBA, a key) for identifying write data to be written, a block address, a data pointer, and a length. Further, the write command may include a QoS domain ID. The QoS domain ID designates one of a plurality of regions obtained by logically dividing a NAND flash memory. Each of the plurality of regions includes a plurality of blocks. The type #2-storage device can determine a page to which data is to be written in consideration of a defective page and restriction on the page write order.

That is, in a case where the flash storage device 3 is implemented as the type #2-storage device, the flash storage device 3 hides page write order restriction, a bad page, a page size, and the like while causing the host 2 to handle a block. As a result, the host 2 can recognize a block boundary, and can manage which user data exists in which block without being aware of page write order restriction, a bad page, and a page size.

The type #3-storage device is a storage device of a type in which the host 2 designates a tag (for example, an LBA) by which the host 2 identifies data and the storage device determines both a block and a page to which this data is to be written. A write command applied to the type #3-storage device includes a tag (for example, an LBA, a key) for identifying write data to be written, a stream ID, a data pointer, and a length. The stream ID is an identifier of a stream associated with this write data. In a case where the flash storage device 3 is implemented as the type #3-storage device, the flash storage device 3 refers to a management table managing mapping between each stream ID and each block address to determine a block to which the data is to be written. Moreover, the flash storage device 3 manages mapping between each tag (LBA) and each physical address of a NAND flash memory by using an address translation table referred to as a logical and physical address translation table.

In a case where the flash storage device 3 is implemented as the type #1-storage device, in the flash storage device 3, data transfer from the write data buffer 51 to the internal buffer (shared cache) 31 is executed by a DMAC in accordance with progress of the write operation for a write destination block designated by an identifier of this block, under control of the write operation controller 21. This data transfer is executed in units of the same data size as units of data writing of the NAND flash memory 5. Under the control of the write operation controller 21, the write data to be written is transferred from the internal buffer (shared cache) 31 to a NAND flash memory chip 15 including this write destination block, and then a NAND command for a write instruction is sent out from the write operation controller 21 to the NAND flash memory chip 15.

In a case where the flash storage device 3 is implemented as the type #2-storage device, the write operation controller 21 also executes processing of allocating one of free blocks to the host 2 as a write destination block in response to a block allocation request received from the host 2. The block allocation request may include a QoS domain ID. The write operation controller 21 determines one of free blocks belonging to this QoS domain ID as a write destination block and notifies the host 2 of a block address of this write destination block. In this manner, the host 2 can issue a write command designating this block address, a data pointer, a tag (for example, an LBA), and a length. After this write data is written to this write destination block, the write operation controller 21 notifies the host 2 of a block address indicating the write destination block to which the write data is written, a page address indicating a page in the write destination block to which the write data is written, and a tag (for example, an LBA) of the write data. The flash translator 52 of the host 2 includes the LUT 411 which is an address translation table for managing mapping between each tag (for example, an LBA) and each physical address (block address, page address, and the like) of the NAND flash memory 5. In a case where a block address, a page address, and a tag (for example, an LBA) are notified from the flash storage device 3, the flash translator 52 updates the LUT 411, and maps the notified physical address (block address, page address) to a notified tag (for example, an LBA). By referring to the LUT 411, the flash translator 52 can convert a tag (for example, an LBA) included in a read request into a physical address (block address, page address), and, in this manner, can issue a read command including a physical address to the flash storage device 3.

When the flash storage device 3 is implemented as the type #1-storage device or the type #2-storage device, the read operation controller 22 sends a NAND command for a read instruction to the NAND flash memory chip 15 based on a physical address included in the read command. When the flash storage device 3 is implemented as the type #3-storage device, the read operation controller 22 refers to an address translation table and acquires a physical address corresponding to a tag (LBA) included in the read command, and sends a NAND command for a read instruction to the NAND flash memory chip 15 based on the acquired physical address.

Under the control of the read operation controller 22, data read from the NAND flash memory chip 15 is transferred to the internal buffer (shared cache) 31. Then, under the control of the read operation controller 22, data transfer from the internal buffer (shared cache) 31 to the host 2 is executed by a DMAC. Further, when read data to be read exists in the write data buffer 51 of the host 2, the read operation controller 22 can acquire the read data from the write data buffer 51. Alternatively, the read operation controller 22 may instruct the host 2 to acquire the read data from the write data buffer 51. Note that a region in which the write data on the write data buffer 51 is stored can be released on the host 2 side by a releasable notification transmitted from the write operation controller 21 to the host 2 when writing to the NAND flash memory 5 performed by the write operation controller 21 is completed. For example, when writing to the NAND flash memory 5 performed by the write operation controller 21 fails and write data is written to another location (a different page or block), data transfer from a region of the write data buffer 51 of the host 2 that has not been released yet to the internal buffer (shared cache) 31 of the flash storage device 3 is executed again for data necessary for the writing. Data rewriting may be executed within a range in which an error is detected or may be executed in all the range of the write command. The releasable notification may be notified to the host 2 in units of a write command or may be notified to the host 2 in units of data usage of the host 2.

The optimization processor 53 (including the GC operation controller 23) executes, for example, processing of returning an allocated block to a free block in response to a block release request received from the host 2. The host 2 transmits a block release request to the flash storage device 3 as a block reuse command. An allocated block that may be designated by a block reuse command is a block allocated from among free blocks in response to a block allocation request received from the host 2 as a block allocate command, when the flash storage device 3 is implemented as the type #1-storage device and the host 2 does not manage a free block group, or when the flash storage device 3 is implemented as the type #2-storage device. Further, for example, the optimization processor 53 executes processing of copying data of a block to another block, and the like, in response to a GC control command received from the host 2.

Further, various commands that the flash storage device 3 receives from the host 2 may include priorities. That is, the flash storage device 3 may execute a command received from the host 2 later before a command received from the host 2 earlier. Control of the execution order of commands can be performed by, for example, comparing priorities between commands when retrieving the commands from an I/O command queue where various commands received from the host 2 are temporarily stored. The I/O command queue may be provided for each QoS domain, may be provided for each virtual storage device (virtual device: VD) described later, or may be provided one by one for each of the flash storage devices 3.

In the flash storage device 3 in which the NAND flash memory 5 includes a plurality of the NAND flash memory chips 15, one or more virtual storage devices can be defined. FIGS. 40A to 40D show definition examples of a virtual storage device on the flash storage device 3.

FIG. 40A shows a definition example of a plurality of virtual storage devices in which a channel connected to the NAND interface 13 is shared between the virtual storage devices. FIG. 40B shows a definition example of a plurality of virtual storage devices in which a channel connected to the NAND interface 13 is not shared between the virtual storage devices. FIG. 40C shows a definition example of one virtual storage device using all of a plurality of the NAND flash memory chips 15 included in the NAND flash memory 5. FIG. 40D shows a definition example of virtual storage devices as many as the NAND flash memory chips 15, that is, a maximum number of virtual storage devices individually using each of a plurality of the NAND flash memory chips 15 included in the NAND flash memory 5.

As described above, one or more virtual storage devices can be defined on the flash storage device 3 in various forms. By defining a virtual storage device, for example, wear monitoring for monitoring the degree of wear of the NAND flash memory chip 15 can be executed for each of the virtual storage devices.

Further, in the flash storage device 3 that may define one or more virtual storage devices, a QoS domain can be managed for each virtual storage device. FIG. 41 shows an example in which a QoS domain is managed for each virtual storage device.

A block of the flash storage device 3 is shared between QoS domains defined on the same virtual storage device. A unit of handling a block may be a unit of a super block constituted by a plurality of blocks. That is, a super block may be shared between QoS domains. For example, in a case where a QoS domain is allocated to each end user, when a block allocate command including a QoS domain ID indicating a QoS domain is received from the host 2, one free block in a free block group shared in a virtual storage device is allocated to the QoS domain indicated by the QoS domain ID.

On the other hand, when a block reuse command including a QoS domain ID and a block address is received from the host 2, a block indicated by the block address among blocks allocated to a QoS domain indicated by the QoS domain ID is returned to a free block group as a free block. Returning a block allocated to a QoS domain as a free block to the free block group is also referred to as releasing a block. The released block may then be allocated to any QoS domain in the virtual storage device, for example, by a block allocate command from the host 2.

When a block reuse command for a certain block in a certain QoS domain is received from the host 2, and a read command for that block is in a state of being executed or yet to be executed in the flash storage device 3, if the block reuse command is executed before the read command, there is a concern that, for example, data whose value is undefined is returned to the host 2. As described above, various commands that the flash storage device 3 receives from the host 2 may include priorities. Accordingly, in the flash storage device 3, a block reuse command received from the host 2 later may be executed prior to a read command received from the host 2 earlier. Further, in the case of copying data in the block to another block in response to, for example, a GC control command, in addition to a read command, a similar situation may occur. In other words, in a state where read processing for data for the block is being executed or yet to be executed, unintended data may be read in the read processing for data that is being executed or yet to be executed.

In order to prevent such a situation by control on the host 2 side, it is necessary for the host 2, for example, to manage the presence or absence of read processing for in-process data for each block. Therefore, the flash storage device 3 may include a mechanism for preventing such a situation, so as to reduce burden on the host 2.

In a case where a block reuse command is received from the host 2, the flash storage device 3 notifies an error to the host 2 if read processing for data for a block designated by the block reuse command is being executed or yet to be executed, or suspends execution of the block reuse command until the processing that is being executed or yet to be executed is finished, and executes the block reuse command when the processing that is being executed or yet to be executed is finished.

By providing this mechanism in the flash storage device 3, the host 2 can transmit a block reuse command to the flash storage device 3 without paying attention to the presence and absence of read processing of in-process data for a block to be released. That is, it is possible to reduce burden on the host 2.

This mechanism can be realized by, for example, the optimization processor 53 searching whether a read command or a GC control command for a block designated by a block reuse command is stored in the I/O command queue 42 when receiving the block reuse command or executing the block reuse command. FIG. 41 shows an example in which the I/O command queue 42 is provided for each QoS domain. In this case, the optimization processor 53 checks, for the I/O command queue 42 provided for a QoS domain indicated by a QoS domain ID included in a block reuse command, whether or not there exists a read command or a GC control command for a block indicated by a block address included in the block reuse command. In a case where the I/O command queue 42 is provided one by one for each virtual storage device or each flash storage device, the optimization processor 53 checks, with respect to the I/O command queue 42, whether there exists a read command or a GC control command for a block indicated by a block address included in a block reuse command in a QoS domain indicated by a QoS domain ID included in the block reuse command. If the read command or the GC control command exists, the optimization processor 53 notifies the host 2 of an error, or suspends execution of the block reuse command until the read command or the GC control for the block which is designated by the block reuse command and exists in the I/O command queue 42 is finished, and executes the block reuse command when the read command or the GC control command is finished.

Alternatively, this mechanism can be realized by, for example, providing, for each block selected from a free block group and allocated to a QoS domain, a counter showing the number of read commands being executed for the block and the number of GC control commands being executed by using the block as a copy source, as metadata or the like. For example, when executing processing of reading data for a certain block, the read operation controller 22 and the optimization processor 53 (including and the GC operation controller 23) increments a value of a counter of that block by one. Further, when finishing the data read processing, the read operation controller 22 and the optimization processor 53 decrement the value of the counter of that block by one. In a case where, at the time of receiving a block reuse command or executing a block reuse command, a value of a counter of a block designated by the block reuse command is not zero, the optimization processor 53 notifies the host 2 of an error, or suspends execution of the block reuse command until the value of the counter becomes zero, and executes the block reuse command when the value of the counter becomes zero.

FIG. 42 is a flowchart showing an operation process (first case) of the flash storage device 3 at the time of receiving a block reuse command. Note that, here, an operation performed at the time of receiving a block reuse command is assumed. However, an operation described below may be performed at the time of execution of a block reuse command.

When a block reuse command is received from the host 2 (Step A1), the optimization processing unit 23 determines whether or not there exists read processing being executed or yet to be executed for a block designated by the block reuse command (Step A2). In a case where the read processing does not exist (Step A2: NO), the optimization processing unit 23 converts a designated block to a free block (releases the designated block), and returns a response indicating reuse completion to the host 2 (Step A3).

On the other hand, in a case where the read processing exists (Step A2: YES), the optimization processing unit 23 notifies the host 2 of an error (Step A4).

FIG. 43 is a flowchart showing an operation process (second case) of the flash storage device 3 at the time of receiving a block reuse command. Here as well, an operation performed at the time a block reuse command is received is assumed. However, an operation described below may be performed at the time of execution of a block reuse command.

When a block reuse command is received from the host 2 (Step A11), the optimization processing unit 23 determines whether or not there exists read processing being executed or yet to be executed for a block designated by the block reuse command (Step A12).

In a case where the read processing does not exist (Step A12: NO), the optimization processing unit 23 instantly converts a designated block to a free block (releases the designated block), and returns a response indicating reuse completion to the host 2 (Step A14). On the other hand, in a case where the read processing exists (Step A12: YES), the optimization processing unit 23 next determines whether or not all the corresponding read processing is completed (Step A13). If all the corresponding read processing is completed (Step A13: YES), a designated block is converted into a free block (released), and a response indicating reuse completion is returned to the host 2 (Step A14).

Note that, the above describes handling of a block reuse command in a case where a read command and a GC control command being executed or yet to be executed for a block designated by the block reuse command has already been received when the block reuse command is received from the host 2. Moreover, the flash storage device 3 may be configured to return an error to the host 2 when a read command or a GC control command for a block designated by a block reuse command is received from the host 2 after the block reuse command is received from the host 2.

Further, as described with reference to FIG. 41, a block of the flash storage device 3 is, for example, shared between QoS domains managed for each virtual storage device. That is, for example, a free block group is managed for each virtual storage device, and a free block is allocated to each QoS domain from the free block group.

Cases of writing data to a block are roughly divided into a case where data stored in the write data buffer 51 of the host 2 is written in accordance with a write command received from the host 2 and a case where data stored in another block of the flash storage device 3 is written in accordance with a GC control command received from the host 2. Data stored in the write data buffer 51 of the host 2 is new, and data stored in another block of the flash storage device 3 is old. Therefore, if these pieces of data are caused to coexist in the same block, there is a concern that write amplification is deteriorated. Therefore, in a case where the flash storage device 3 is implemented as the type #3-storage device in which a storage device determines both a block and a page to which data is to be written, there may be included a mechanism of separating blocks into a block to which data from the host 2 is written and a block to which data in the flash storage device 3 is copied for each QoS domain. If blocks are handled in units of super blocks, the super blocks are separated into a super block to which data from the host 2 is to be written and a super block to which data in the flash storage device 3 is to be copied. That is, for each QoS domain, a block to which data from the host 2 is to be written and a block to which data in the flash storage device 3 is to be copied are secured as blocks including an empty page.

This separation of blocks can be performed, for example, by holding, as metadata, attribute information indicating use of a block for each of blocks selected from a free block group and allocated to a QoS domain. When a QoS domain starts to be used, neither a block to which data from the host 2 is to be written nor a block to which data in the flash storage device 3 is to be copied is secured. It should be noted that "block is secured" means that a block including an empty page is allocated.

For example, when writing of data from the host 2 is executed with respect to a certain QoS domain, and a block that is indicated by attribute information as a block to which data from the host 2 is to be written is not secured in the QoS domain, the write operation controller 21 acquires one free block in a free block group for the QoS domain and writes data to the acquired block. At the time of this acquisition, the write operation controller 21 records attribute information indicating that the block is a block to which data from the host 2 is to be written as metadata. On the other hand, if a block to which data from the host 2 is to be written that is indicated by attribute information as a block to which data from the host 2 is to be written is secured, the write operation controller 21 executes writing of data from a page subsequent to a page for which writing is performed at last in the block. When data is written to a last page of the block in a process of writing data, the state returns to a state where no block is secured yet. Accordingly, the write operation controller 21 acquires one free block in a free block group for the QoS domain, and writes a subsequent piece of data to the acquired block. Also at the time of this acquisition, the write operation controller 21 records attribute information indicating that the block is a block to which data from the host 2 is to be written as metadata.

Further, for example, when copying of data is executed with respect to a certain QoS domain, and a block that is indicated by attribute information as a block to which data in the flash storage device 3 is to be copied is not secured in the QoS domain, the optimization processor 53 (including the GC operation controller 23) acquires one free block in a free block group for the QoS domain and writes (copies) data to the acquired block. At the time of this acquisition, the optimization processor 53 records attribute information indicating that the block is a block to which data in the flash storage device 3 is to be copied as metadata. On the other hand, if a block to which data in the flash storage device 3 is to be copied and which is indicated by attribute information as a block to which data in the flash storage device 3 is to be copied is secured, the optimization processor 53 executes data writing from a page subsequent to a page to which writing is performed at last in the block. When data is written to a last page of the block in a process of writing data, the state returns to a state where no block is secured yet. Accordingly, the optimization processor 53 acquires one free block in a free block group for the QoS domain, and writes data to the acquired block. Also at the time of this acquisition, the optimization processor 53 records attribute information indicating that the block is a block to which data in the flash storage device 3 is to be copied as metadata.

As described above, the flash storage device 3 separates a block to which new data from the host 2 is to be written and a block to which old data in the flash storage device 3 is to be copied. In this manner, the flash storage device 3 can prevent write amplification from being deteriorated.

Further, as described with reference to FIG. 39, when read data to be read exists in the write data buffer 51 of the host 2, the read operation controller 22 can acquire the read data from the write data buffer 51. On the other hand, when a releasable notification is transmitted from the write operation controller 21 to the host 2, a region in which write data on the write data buffer 51 is stored is released on the host 2 side. In view of the above, the flash storage device 3 may include a mechanism that, when a read command for data in write data existing in the write data buffer 51 is received from the host 2, does not allow transmission of a releasable notification for a region in which the data is stored to the host 2 until the read command is finished.

This mechanism is realized, for example, by providing, as meta data, a counter indicating the remaining number of write processing and the remaining number of read processing for data in units of a write command received from the host 2 or in units of data usage of the host 2 to write data stored in the write data buffer 51 of the host 2. For example, the counter is provided in a manner matching with units of a releasable notification notified to the host 2. In a case where a releasable notification is notified to the host 2 in units of a write command, the counter may be provided in units of data usage of the host 2.

Assume that the counter is provided in units of data usage of the host 2, the write operation controller 21 sets the number of times of transfer of data necessary for writing data to the NAND flash memory 5 +1 as an initial value of each counter. The addition of +1 is performed for rewriting processing in a case where an error is detected.

Each time data is transferred to the NAND flash memory 5, the write operation controller 21 decrements a value of a corresponding counter by one. When data transfer for a certain data usage unit is assumed to be finished, a value of the counter generally becomes one at that time point. When all transferred data is written to the NAND flash memory 5 and rewrite processing in a case where an error is detected is confirmed to be unnecessary, the write operation controller 21 further decrements the value of the corresponding counter by one. At this point, in general, the value of the counter is zero. If a releasable notification is assumed to be notified to the host 2 in units of data usage of the host 2, the write operation controller 21 notifies the host 2 of a releasable notification for a corresponding region when detecting that the value of the counter has become zero. Note that, when an error is detected, the write operation controller 21 re-adds the number of times of transfer of data necessary for rewrite processing to the counter. Even if an error is detected after transfer of data to the NAND flash memory 5 is finished, the value of the counter has not become zero. Accordingly, a releasable notification is not notified to the host 2 and data necessary for rewrite processing exists in the write data buffer 51 of the host 2. Therefore, data transfer from the write data buffer 51 of the host 2 to the internal buffer (shared cache) 31 of the flash storage device 3 can be executed again.

When a read command for data in write data existing in the write data buffer 51 of the host 2 is received from the host 2, the read operation controller 22 also adds one to a value of a counter corresponding to that data. Then, when the read processing is finished, the read operation controller 22 subtracts one from the value of the corresponding counter.

Regarding data subject to read processing in write data that exists on the write data buffer 51, the value of the corresponding counter does not become zero even if writing to the NAND flash memory 5 is finished, and a releasable notification is not notified to the host 2. That is, by adding one to the value of the counter, the read operation controller 22 sets a target region on the write data buffer 51 to a release prohibition state. Therefore, under a situation where a read command for data in write data existing in the write data buffer 51 of the host 2 is received from the host 2, a region on the write data buffer 51 including the data is never released on the host 2 side.

It should be noted that when a read command for data in write data existing in the write data buffer 51 of the host 2 is received from the host 2, the read operation controller 22 does not need to read the data from the write data buffer 51, and may read from the NAND flash memory 5 if writing of the write data to the NAND flash memory 5 is finished and the data is in a readable state. In this case, write data on the write data buffer 51 may be utilized, for example, as spare data.

In a case where a releasable notification is notified to the host 2 in units of a write command and a counter is provided in units of data usage of the host 2, the write operation controller 21 notifies the host 2 of a releasable notification at a time point at which all values of a plurality of counters corresponding to write data to be written by a write command become zero.

Further, focusing on the fact that the read operation controller 22 can acquire read data from the write data buffer 51, the flash storage device 3, which is implemented as the type #2-storage device, may include a mechanism of notifying the host 2 of a page address to which write data from the host 2 is to be written, without waiting for writing to the NAND flash memory 5 to be finished. In a case where the flash storage device 3 includes this mechanism, the host 2, for example, does not have to wait until data written by a write command becomes in a readable state in the flash storage device 3, and can promptly issue a read command for data in the data written by the write command.

This mechanism can be realized, for example, by the write operation controller 21 registering information on write data on the write data buffer 51 notified from the host 2 at the time of receiving a write command in a write buffer list for each write destination block provided, for example, as meta data, and notifying the host 2 of a page address to which the write data is to be written for each unit of data usage of the host 2. The size of the write data registered in the write buffer list may be larger than the size of a remaining write region of a write destination block. In this case, the write operation controller 21 first notifies the host 2 of a page address to be written for a portion writable to the write destination block, and notifies the host 2 of a page address to be written for a remaining portion after writing to the write destination block is finished and a new write destination block is secured. Since all pieces of write data exist on the write data buffer 51 and a write destination block can be secured in an extremely short period of time, there is no practical problem even when the write data is written across blocks.

When an error is detected at the time of writing to the NAND flash memory 5, the write operation controller 21 again notifies the host 2 of a page address to be written that is newly determined. Note that the notification of the page address to the host 2 may be performed at a time point at which a page address to be written is determined as described above or may be performed each time writing is finished in units of data usage of the host 2. In the former case, when an error is detected, notification to the host 2 may occur multiple times, but notification to the host 2 is fast. In the latter case, although notification to the host 2 is slower than the former case, only one time of notification is required, even when an error is detected at the time of writing to the NAND flash memory 5 regardless of how many times an error is detected.

Next, various I/O command processing executed by the flash storage device 3, including write command processing using the write data buffer 51 of the host 2, will be described in detail.

FIG. 44 shows I/O command processing executed by the flash storage device 3.

As described above, in the present embodiment, the flash storage device 3 may be any of the type #1-storage device, the type #2-storage device, and the type #3-storage device. FIG. 44 exemplifies a case where the flash storage device 3 is the type #1-storage device.

Each write command issued by the host 2 includes a block address, a page address, a data pointer, and a length. Each issued write command is added to the I/O command queue 42. Each read command issued by the host 2 also includes a block address, a page address, a data pointer, and a length. Each issued read command is also added to the I/O command queue 42.

When the host 2 desires to request the flash storage device 3 to write the write data, the host 2 first stores the write data in the write data buffer 51 on a host memory, and issues the write command to the flash storage device 3. The write command includes a block address indicating a write destination block to which the write data is to be written, a page address indicating a page in the write destination block to which the write data is to be written, a data pointer indicating a position in the write data buffer 51 at which the write data exists, and a length of the write data.

The flash storage device 3 includes a program/read sequencer 41. The program/read sequencer 41 is implemented by the write operation controller 21 and the read operation controller 22 described above. The program/read sequencer 41 can execute each command added to the I/O command queue 42 in an optional order.

After the program/read sequencer 41 acquires one or more write commands designating the same write destination block from the I/O command queue 42, the program/read sequencer 41 sends, to the internal buffer 31, a transfer request for acquiring a next piece of write data to be written to the write destination block (for example, write data for one page size) from the internal buffer (shared cache) 31 or the write data buffer 51, in accordance with progress of the write operation for the write destination block. This transfer request may include a data pointer and a length. The data pointer included in this transfer request is calculated by processing of dividing write data associated with one write command or combining two or more pieces of write data associated with two or more write commands designating the same write destination block. That is, the program/read sequencer 41 divides a set of write data associated with one or more write commands having identifiers indicating the same write destination block by a boundary having the same size as a data write unit of the NAND flash memory 5 from a head of the set, and identifies a position in a host memory corresponding to each boundary. As a result, the program/read sequencer 41 can acquire the write data from the host 2 in units of the same size as the write unit.

The data pointer included in this transfer request indicates a position on the write data buffer 51 at which the write data for one page size exists. The write data for one page size may be a set of a plurality of pieces of write data having a small size associated with a plurality of write commands designating this write destination block, or a portion of write data having a large size associated with a write command designating this write destination block.

Moreover, the program/read sequencer 41 sends, to the internal buffer (shared cache) 31, a block address of the write destination block to which the write data for one page size is to be written and a page address of a page to which the write data for one page size is to be written.

The controller 4 of the flash storage device 3 may include a cache controller that controls the internal buffer (shared cache) 31. In this case, the cache controller can operate the internal buffer (shared cache) 31 as if it were a control logic. A plurality of flash command queues 43 exist between the internal buffer (shared cache) 31 and a plurality of write destination blocks #0, #1, #2, . . . , #n. These flash command queues 43 are associated with a plurality of NAND flash memory chips.

The internal buffer (shared cache) 31, that is, a cache controller, determines whether or not write data for one page size designated by a transfer request exists in the internal buffer (shared cache) 31.

If write data for one page size designated by this transfer request exists in the internal buffer (shared cache) 31, the internal buffer (shared cache) 31, that is, a cache controller, transfers the write data for one page size to a NAND flash memory chip including a write destination block to which the write data is to be written. Moreover, the internal buffer (shared cache) 31, that is, a cache controller, sends, to a NAND flash memory chip including the write destination block to which the write data is to be written, a block address of the write destination block, a page address to which the write data is to be written, and a NAND command (flash write command) for a write instruction, via the flash command queue 43. The flash command queue 43 is provided for each NAND flash memory chip. For this reason, the internal buffer (shared cache) 31, that is, a cache controller, adds, to the flash command queue 43 corresponding to a NAND flash memory chip including the write destination block to which the write data is to be written, a block address of the write destination block, a page address to which the write data is to be written, and a NAND command (flash write command) for a write instruction.

Note that if the transfer of the write data for one page size from the internal buffer (shared cache) 31 to a NAND flash memory chip is final data transfer necessary for writing the write data to the NAND flash memory chip, the internal buffer (shared cache) 31, that is, a cache controller, discards the write data from the internal buffer (shared cache) 31 and secures a region in which the write data has been stored as an empty region. In a case where write data is written to a write destination block by a write operation (for example, a full sequence write operation, and the like) involving one time of transfer of data to a NAND flash memory chip, a first data transfer to the NAND flash memory chip is a final data transfer. On the other hand, in a case where write data is written to a write destination block by a write operation (for example, foggy and fine write operations) involving a plurality of times of transfer of data to a NAND flash memory chip, data transfer to the NAND flash memory chip necessary for last fine writing is a final data transfer.

Next, a case where write data for one page size designated by a transfer request does not exist in the internal buffer (shared cache) 31 will be described.

If the write data for one page size designated by this transfer request does not exist in the internal buffer (shared cache) 31, the internal buffer (shared cache) 31, that is, a cache controller, sends this transfer request (data pointer, length) to a DMAC 15. Based on this transfer request (data pointer, length), the DMAC 15 transfers the write data for one page size from the write data buffer 51 on a host memory to the internal buffer (shared cache) 31. When the data transfer is finished, the DMAC 15 notifies the internal buffer (shared cache) 31, that is, the cache controller, of transfer completion (Done), the data pointer, and the length.

If there exists an empty region in the internal buffer (shared cache) 31, the internal buffer (shared cache) 31, that is, a cache controller, stores write data acquired from the write data buffer 51 by DMA transfer in the empty region.

If there exists no empty region in the internal buffer (shared cache) 31, the internal buffer (shared cache) 31, that is, the cache controller, discards oldest write data in the internal buffer (shared cache) 31 from the internal buffer (shared cache) 31, and secures the region in which the oldest write data has been stored as an empty region. Then, the internal buffer (shared cache) 31, that is, the cache controller, stores the write data acquired from the write data buffer 51 by the DMA transfer in this empty region.

In a case where a multi-stage write operation, such as foggy and fine write operations, is used, the cache controller discards oldest write data among write data in the internal buffer (shared cache) 31 for which a first-stage write operation, such as a foggy write operation, is finished.

Progress speed of data write operation to a write destination block having a large data write amount tends to be higher than progress speed of data write operation to a write destination block having a small data write amount. Therefore, the write data to be written to a write destination block having a large data write amount is frequently transferred from the write data buffer 51 to the internal buffer (shared cache) 31. As a result, there is a high possibility that this oldest write data is write data to a write destination block having a comparatively small amount of data written from the host 2. Therefore, by using a method of discarding oldest write data among write data in the internal buffer (shared cache) 31 for which the first-stage write operation, such as the foggy write operation, is finished, data traffic between the host 2 and the flash storage device 3 can be efficiently reduced.

Note that an algorithm for selecting write data to be discarded from among write data in the internal buffer (shared cache) 31 for which the first-stage write operation, such as the foggy write operation, is finished, is not limited to first-in-first-out for selecting oldest data, and other algorithms, such as LRU and random, may be used.

The program/read sequencer 41 receives status, that is, write completion (Done), write failure (Error), block address, and page address, from each NAND flash memory chip. Then, based on these statuses, the program/read sequencer 41 determines, for each write command, whether or not all write operations (write operation for transferring the same data to a NAND flash memory chip once or a plurality of times) for entire write data associated with the write command has been finished. When all the write operations for entire write data associated with a certain write command has been finished, the program/read sequencer 41 transmits a response (Done) indicating command completion of this write command to the host 2. The response (Done) indicating command completion includes a command ID for uniquely identifying this write command.

Next, processing of a read command will be described.

The read command includes a block address indicating a block in which data to be read is stored, a page address indicating a page in which the data is stored, a data pointer indicating a position in a read data buffer 53 on a host memory to which the data is to be transferred, and a length of the data.

The program/read sequencer 41 sends a block address and a page address designated by a read command to the internal buffer (shared cache) 31, and requests the internal buffer (shared cache) 31 to read data designated by the read command.

The internal buffer (shared cache) 31, that is, a cache controller, sends the block address, the page address, and a NAND command (flash read command) for read instruction to a NAND flash memory chip via the flash command queue 43. Data read from a NAND flash memory chip is transferred to the read data buffer 53 by the DMAC 15.

Note that in a case where the data designated by the read command is data for which the write operation is not finished, or data for which all the write operations is finished but yet to be readable from the NAND flash memory 5, the buffer (shared cache) 31, that is, the cache controller, may determine whether or not this data exists in the internal buffer (shared cache) 31. If this data exists in the internal buffer (shared cache) 31, this data is read from the internal buffer (shared cache) 31 and transferred to the read data buffer 53 by the DMAC 15.

On the other hand, if this data does not exist in the internal buffer (shared cache) 31, this data is first transferred from the write data buffer 51 to the internal buffer (shared cache) 31 by the DMAC 15. Then, this data is read from the internal buffer (shared cache) 31 and transferred to the read data buffer 53 by the DMAC 15.

FIG. 45 shows a multi-stage write operation executed by the flash storage device 3.

Here, foggy and fine write operations in a case of reciprocating four word lines are exemplified. Further, here, assume that the NAND flash memory 5 is a QLC-flash storing 4-bit data per memory cell. The foggy and fine write operations for one specific write destination block (here, the write destination block BLK #1) in the NAND flash memory 5 are executed as described below.

(1) First, write data for four pages (P0 to P3) is transferred to the NAND flash memory 5 page by page, and the foggy write operation is executed for writing the write data for these four pages (P0 to P3) to a plurality of memory cells connected to a word line WL0 in the write destination block BLK #1.

(2) Next, write data for next four pages (P4 to P7) is transferred to the NAND flash memory 5 page by page, and the foggy write operation is executed for writing the write data for these four pages (P4 to P7) to a plurality of memory cells connected to a word line WL1 in the write destination block BLK #1.

(3) Next, write data for next four pages (P8 to P11) is transferred to the NAND flash memory 5 page by page, and the foggy write operation is executed for writing the write data for these four pages (P8 to P11) to a plurality of memory cells connected to a word line WL2 in the write destination block BLK #1.

(4) Next, write data for next four pages (P12 to P15) is transferred to the NAND flash memory 5 page by page, and the foggy write operation is executed for writing the write data for these four pages (P12 to P15) to a plurality of memory cells connected to a word line WL3 in the write destination block BLK #1.

(5) When the foggy write operation for a plurality of memory cells connected to the word line WL3 is finished, the word line to be written returns to the word line WL0 and the fine write operation for a plurality of memory cells connected to the word line WL0 can be executed. Then, write data for four pages (P0 to P3) that is the same as the write data for four pages (P0 to P3) used in the foggy write operation for the word line WL0 is transferred again to the NAND flash memory 5 page by page, and the fine write operation is executed for writing the write data for these four pages (P0 to P3) to a plurality of memory cells connected to a word line WL0 in the write destination block BLK #1. In this manner, the foggy and fine write operations for pages P0 to P3 are finished.

(6) Next, write data for next four pages (P16 to P19) is transferred to the NAND flash memory 5 page by page, and the foggy write operation is executed for writing the write data for these four pages (P16 to P19) to a plurality of memory cells connected to a word line WL4 in the write destination block BLK #1.

(7) When the foggy write operation for a plurality of memory cells connected to the word line WL4 is finished, the word line to be written returns to the word line WL1 and the fine write operation for a plurality of memory cells connected to the word line WL1 can be executed. Then, write data for four pages (P4 to P7) that is the same as the write data for four pages (P4 to P7) used in the foggy write operation for the word line WL1 is transferred again to the NAND flash memory 5 page by page, and the fine write operation is executed for writing the write data for these four pages (P4 to P7) to a plurality of memory cells connected to a word line WL1 in the write destination block BLK #1. In this manner, the foggy and fine write operations for pages P4 to P7 are finished.

(8) Next, write data for next four pages (P20 to P23) is transferred to the NAND flash memory 5 page by page, and the foggy write operation is executed for writing the write data for these four pages (P20 to P23) to a plurality of memory cells connected to a word line WL5 in the write destination block BLK #1.

(9) When the foggy write operation for a plurality of memory cells connected to the word line WL5 is finished, the word line to be written returns to the word line WL2 and the fine write operation for a plurality of memory cells connected to the word line WL2 can be executed. Then, write data for four pages (P8 to P11) that is the same as the write data for four pages (P8 to P11) used in the foggy write operation for the word line WL2 is transferred again to the NAND flash memory 5 page by page, and the fine write operation is executed for writing the write data for these four pages (P8 to P11) to a plurality of memory cells connected to a word line WL2 in the write destination block BLK #1. In this manner, the foggy and fine write operations for pages P8 to P11 are finished.

FIG. 46 shows the order of writing data to the write destination block BLK #1.

Here, similarly to FIG. 7, assume that foggy and fine write operations are executed in a case of reciprocating four word lines.

Data d0, data d1, data d2, data d3, data d4, data d5, data d6, data d7, . . . , data d252, data d253, data d254, and data d255 shown in the left part of FIG. 46 show a plurality of pieces of write data corresponding to a plurality of write commands designating the write destination block BLK #1. Here, for simplicity of illustration, a case where all pieces of write data have the same size is assumed.

The right part of FIG. 46 shows the order of writing data to the write destination block BLK #1. The write operation is executed in the order of writing data d0 (by foggy writing) to a plurality of memory cells connected to the word line WL0, writing data d1 (by foggy writing) to a plurality of memory cells connected to the word line WL1, writing data d2 (by foggy writing) to a plurality of memory cells connected to the word line WL2, writing data d3 (by foggy writing) to a plurality of memory cells connected to the word line WL3, writing data d0 (by fine writing) to a plurality of memory cells connected to the word line WL0, writing data d4 (by foggy writing) to a plurality of memory cells connected to the word line WL4, writing data d1 (by fine writing) to a plurality of memory cells connected to the word line WL1, writing data d5 (by foggy writing) to a plurality of memory cells connected to the word line WL5, writing data d2 (by fine writing) to a plurality of memory cells connected to the word line WL2, and so on.

FIG. 47 shows an operation of transferring write data from the host 2 to the flash storage device 3 in units of the same size as the data write unit of the NAND flash memory 5. Data d1, data d2, data d3, data d4, data d5, data d6, data d7, data d8, data d9, data d10, . . . shown in the left part of FIG. 47 show 10 pieces of write data corresponding to 10 write commands designating the write destination block BLK #1. A length (size) of the write data is different between each write command. FIG. 47 assumes a case where each of data d1, data d2, data d3, and data d4 has a size of 4K bytes, data d5 has a size of 8K bytes, data d6 has a size of 40K bytes, data d7 Has a size of 16K bytes, each of data d8 and data d9 has a size of 8K bytes, and data d10 has a size of 1M byte.

Since each write command received from the host 2 includes a data pointer, a length, and a block identifier (for example, a block address), the controller 4 of the flash storage device 3 can classify write commands received from the host 2 into a plurality of groups corresponding to a plurality of write destination blocks. The data d1, data d2, data d3, data d4, data d5, data d6, data d7, data d8, data d9, data d10, . . . described above correspond to 10 write commands classified into a group corresponding to the write destination block BLK #1. These 10 write commands are write commands including a block identifier (for example, a block address) indicating the write destination block BLK #1.

The controller 4 of the flash storage device 3 manages positions on the write data buffer 51 at which the data d1, data d2, data d3, data d4, data d5, data d6, data d7, data d8, data d9, and data d10 exist, and lengths of the data d1, data d2, data d3, data d4, data d5, data d6, data d7, data d8, data d9, and data d10 based on the data pointer and the length in these write commands designating the write destination block BLK #1. Then, the controller 4 acquires, from the host 2, write data having the same size as the data write unit of the NAND flash memory 5 which is obtained by dividing write data having a large size associated with one write command into a plurality of pieces of write data (a plurality of data portions), or combining two or more pieces of write data having a small size associated with two or more write commands with each other.

In FIG. 47, the controller 4 first acquires, from the write data buffer 51 of the host 2, 16K-byte write data obtained by combining the data d1, data d2, data d3, and data d4, each having a size of 4K bytes with each other. In this case, the controller 4 may transfer the 16K-byte write data from the write data buffer 51 of the host 2 to the internal buffer 31 by, for example and without limitation to, four times of DMA transfer. In a first DMA transfer, a transfer source address designating a head position of the data d1 and a data length=4 KB may be set in the DMAC 15. The transfer source address designating the head position of the data d1 is expressed by the data pointer in the write command corresponding to the data d1. In a second DMA transfer, a transfer source address designating a head position of the data d2 and a data length=4 KB may be set in the DMAC 15. The transfer source address designating the head position of the data d2 is expressed by the data pointer in the write command corresponding to the data d2. In a third DMA transfer, a transfer source address designating a head position of the data d3 and a data length=4 KB may be set in the DMAC 15. The transfer source address designating the head position of the data d3 is expressed by the data pointer in the write command corresponding to the data d3. In a fourth DMA transfer, a transfer source address designating the head position of the data d4 and a data length=4 KB may be set in the DMAC 15. The transfer source address designating the head position of the data d4 is expressed by the data pointer in the write command corresponding to the data d4.

Then, the controller 4 transfers the 16K-byte write data (d1, d2, d3, and d4) acquired by the DMA transfer to the NAND flash memory 5 as data to be written to the page P0 of the write destination block BLK #1.

The controller 4 changes a next write destination page of the write destination block BLK #1 to the page P1, and acquires, from the write data buffer 51 of the host 2, 16K-byte write data obtained by combining the data d3 having a size of 8K bytes and a head 8K-byte data d6-1 in the data d6 with each other. In this case, the controller 4 may transfer the 16K-byte write data from the write data buffer 51 of the host 2 to the internal buffer 31 by, for example and without limitation to, two times of DMA transfer. In a first DMA transfer, a transfer source address designating a head position of the data d5 and a data length=8 KB may be set in the DMAC 15. The transfer source address designating the head position of the data d5 is expressed by the data pointer in the write command corresponding to the data d5. In a second DMA transfer, a transfer source address designating the head position of the data d6-1 and a data length=8 KB may be set in the DMAC 15. The transfer source address designating the head position of the data d6-1 is expressed by the data pointer in the write command corresponding to the data d6.

Then, the controller 4 transfers the 16K-byte write data (d5 and d6-1) to the NAND flash memory 5 as data to be written in the page P1 of the write destination block BLK #1.

The controller 4 changes a next write destination page of the write destination block BLK #1 to the page P2 and acquires, from the write data buffer 51 of the host 2, first 16K-byte data d6-2 of the remaining 32K-byte data of the data d6. In this case, the controller 4 may transfer the 16K-byte write data from the write data buffer 51 of the host 2 to the internal buffer 31 by, for example and without limitation to, one time of DMA transfer. In this DMA transfer, a transfer source address designating the head position of the data d6-2 and a data length=16 KB may be set in the DMAC 15. The transfer source address designating the head position of the data d6-2 can be obtained by adding an offset of 8 KB to a value of the data pointer in the write command corresponding to the data d6.

Then, the controller 4 transfers the 16K-byte write data (d6-2) to the NAND flash memory 5 as data to be written to the page P2 of the write destination block BLK #1.

The controller 4 changes a next write destination page of the write destination block BLK #1 to the page P3 and acquires, from the write data buffer 51 of the host 2, the remaining 16K-byte data d6-3 of the data d6. In this case, the controller 4 may transfer the 16K-byte write data from the write data buffer 51 of the host 2 to the internal buffer 31 by, for example and without limitation to, one time of DMA transfer. In this DMA transfer, the transfer source address designating the head position of the data d6-3 and the data length=16 KB may be set in the DMAC 15. The transfer source address designating the head position of the data d6-3 can be obtained by adding an offset of 24 KB to a value of the data pointer in the write command corresponding to the data d6.

Then, the controller 4 transfers the 16K-byte write data (d6-3) to the NAND flash memory 5 as data to be written in the page P3 of the write destination block BLK #1.

Then, the controller 4 writes data for four pages (P0 to P3) to a plurality of memory cells connected to the word line WL0 of the write destination block BLK #1 by the foggy write operation.

The controller 4 changes a next write destination page of the write destination block BLK #1 to the page P4, and acquires, from the write data buffer 51 of the host 2, the data d7 having a size of 16K bytes. In this case, the controller 4 may transfer the 16K-byte write data from the write data buffer 51 of the host 2 to the internal buffer 31 by, for example and without limitation to, one time of DMA transfer. In this DMA transfer, a transfer source address designating the head position of the data d7 and the data length=16 KB may be set in the DMAC 15. The transfer source address designating the head position of the data d7 is expressed by the data pointer in the write command corresponding to the data d7.

Then, the controller 4 transfers the 16K-byte write data (d7) to the NAND flash memory 5 as data to be written to the page P4 of the write destination block BLK #1.

The controller 4 changes a next write destination page of the write destination block BLK #1 to the page P5, and acquires, from the write data buffer 51 of the host 2, 16K-byte write data obtained by combining the data d8 having a size of 8K bytes and the data d9 having a size of 8K bytes with each other. In this case, the controller 4 may transfer the 16K-byte write data from the write data buffer 51 of the host 2 to the internal buffer 31 by, for example and without limitation to, two times of DMA transfer. In a first DMA transfer, a transfer source address designating a head position of the data d8 and a data length=8 KB may be set in the DMAC 15. The transfer source address designating the head position of the data d8 is expressed by the data pointer in the write command corresponding to the data d8. In a second DMA transfer, a transfer source address designating the head position of the data d9 and a data length=8 KB may be set in the DMAC 15. The transfer source address designating the head position of the data d9 is expressed by the data pointer in the write command corresponding to the data d9.

Then, the controller 4 transfers the 16K-byte write data (d8 and d9) to the NAND flash memory 5 as data to be written in the page P5 of the write destination block BLK #1.

The controller 4 changes a next write destination page of the write destination block BLK #1 to the page P6 and acquires, from the write data buffer 51 of the host 2, a head 16K-byte data d10-1 in the data d10. In this case, the controller 4 may transfer the 16K-byte write data from the write data buffer 51 of the host 2 to the internal buffer 31 by, for example and without limitation to, one time of DMA transfer. In this DMA transfer, the transfer source address designating the head position of the data d10-1 and the data length=16 KB may be set in the DMAC 15. The transfer source address designating the head position of the data d10-1 is expressed by the data pointer in the write command corresponding to the data d10.

Then, the controller 4 transfers the 16K-byte write data (d10-1) to the NAND flash memory 5 as data to be written to the page P6 of the write destination block BLK #1.

The controller 4 changes a next write destination page of the write destination block BLK #1 to the page P7 and acquires, from the write data buffer 51 of the host 2, next 16K-byte data d10-2 in the data d10. In this case, the controller 4 may transfer the 16K-byte write data from the write data buffer 51 of the host 2 to the internal buffer 31 by, for example and without limitation to, one time of DMA transfer. In this DMA transfer, the transfer source address designating the head position of the data d10-2 and the data length=16 KB may be set in the DMAC 15. The transfer source address designating the head position of the data d10-2 can be obtained by adding an offset of 16 KB to a value of the data pointer in the write command corresponding to the data d10.

Then, the controller 4 transfers the 16K-byte write data (d10-2) to the NAND flash memory 5 as data to be written to the page P7 of the write destination block BLK #1.

Then, the controller 4 writes data for four pages (P4 to P7) to a plurality of memory cells connected to the word line WL1 of the write destination block BLK #1 by the foggy write operation.

As described above, the controller 4 acquires, from host 2, 16K-byte data to be transferred to a write destination page of the write destination block BLK #1 in accordance with progress of the write operation for the write destination block BLK #1.

Then, when the foggy write operation for a plurality of memory cells connected to the word line WL3 is finished, the fine write operation for a plurality of memory cells connected to the word line WL0 can be executed. The controller 4 changes a next write destination page of the write destination block BLK #1 to the page P1, and transfers again the write data (P0 to P3) to the NAND flash memory 5 page by page. Then, the controller 4 writes the write data for these four pages (P0 to P3) to a plurality of memory cells connected to the word line WL0 in the write destination block BLK #1 by the fine write operation.

In this manner, for each of the first six write commands, that is, the write command corresponding to the data d1, the write command corresponding to the data d2, the write command corresponding to the data d3, the write command corresponding to the data d4, the write command corresponding to the data d5, and the write commands corresponding to the data d6, all of the foggy and fine write operations with respect to the entire write data associated with each of the write commands are finished, and each piece of the data d1 to d6 becomes readable from the NAND flash memory 5. For this reason, the controller 4 returns six command completion responses corresponding to the first six write commands to the host 2.

Note that FIG. 47 describes the operation of transferring the write data associated with each of the write commands designating the write destination block BLK #1 from the host 2 to the flash storage device 3 in units of 16K bytes in accordance with the progress of the write operation for the write destination block BLK #1. An operation similar to the operation described with reference to FIG. 9 is executed for each of the other write destination blocks BLK #.

The flowchart of FIG. 48 shows a process of data write processing executed by the flash storage device 3. Here, assume that the flash storage device 3 is implemented as the type #2-storage device, and includes a mechanism of notifying the host 2 of a page address to which write data from the host 2 is to be written without waiting for writing to the NAND flash memory 5 to be finished.

The controller 4 of the flash storage device 3 receives each write command including a data pointer, a length, and a block identifier (for example, a block address) from the host 2 (Step B1).

Next, the controller 4 divides write data having a large size corresponding to one write command designating a specific write destination block into two or more data portions, or combine two or more pieces of write data corresponding to two or more write commands designating this specific write destination block, and, in this manner, transfers data from the host 2 to the flash storage device 3 in units of the same size as a write unit (data transfer size) of the NAND flash memory 5 (Step B2). In Step B2, as described with reference to FIG. 47, for example, one piece of 16K-byte data obtained by combining several write data portions having a small size, or one of several pieces of 16K-byte data obtained by dividing write data having a large size is transferred from the host 2 to the flash storage device 3. In a case where the flash storage device 3 includes the internal buffer 31, each piece of 16-byte write data transferred from the host 2 to the flash storage device 3 is stored in the internal buffer 31. In addition, in Step B2, in order to combine several write data portions having small sizes, in a case where the size of write data associated with a preceding write command having an identifier designating a certain write destination block is smaller than a write unit (for example, 16K bytes), the controller 4 waits for receiving a subsequent write command having an identifier designating this write destination block.

For the 16K-byte data transferred from the host 2, before writing the 16K-byte data to a specific write destination block, the controller 4 notifies the host 2 of an address in the specific write destination block allocated to a write destination of the 16K-byte data (Step B3). After that, the controller 4 transfers the 16K-byte data transferred from the host 2 to the NAND flash memory 5, and writes the 16K-byte data to the address allocated to the write destination in this specific write destination block (Step B4). The controller 4 determines whether or not this writing is successful (Step B5). In a case of an error (Step B5: NO), the controller 4 repeats the processing from Step B3. That is, notification of an address to the host 2 for the same data may occur a plurality of times. In a case of success (Step B5: YES), the processing proceeds to Step B6.

Then, the controller 4 determines whether or not all write operations (write operations involving transferring the same data to the NAND flash memory 5 once or a plurality of times) for entire write data associated with one write command designating the specific write destination block are finished (Step B6).

When all the write operations for the entire write data associated with one write command designating the specific write destination block are finished, the controller 4 returns a response indicating command completion of this write command to the host 2 (Step B7). A transmission timing of a releasable notification relating to a region on the write data buffer 51 in which write data is stored to the host 2 will be described later.

A flowchart of FIG. 49 shows another process of data write processing executed by the flash storage device 3. Here as well, assume that the flash storage device 3 is implemented as the type #2-storage device, and includes a mechanism of notifying the host 2 of a page address to which write data from the host 2 is to be written without waiting for writing to the NAND flash memory 5 to be finished.

The controller 4 of the flash storage device 3 receives each write command including a data pointer, a length, and a block identifier (for example, a block address) from the host 2 (Step B11).

Next, the controller 4 divides write data having a large size corresponding to one write command designating a specific write destination block into two or more data portions, or combines two or more pieces of write data corresponding to two or more write commands designating this specific write destination block, and, in this manner, transfers data from the host 2 to the flash storage device 3 in units of the same size as a write unit (data transfer size) of the NAND flash memory 5 (Step B12). In Step B12, as described with reference to FIG. 47, for example, one piece of 16K-byte data obtained by combining several write data portions having a small size with each other, or one of several pieces of 16K-byte data obtained by dividing write data having a large size is transferred from the host 2 to the flash storage device 3. In a case where the flash storage device 3 includes the internal buffer 31, each piece of 16-byte write data transferred from the host 2 to the flash storage device 3 is stored in the internal buffer 31. In addition, in Step B2, in order to combine several write data portions having small sizes, in a case where the size of write data associated with a preceding write command having an identifier designating a certain write destination block is smaller than a write unit (for example, 16K bytes), the controller 4 waits for receiving a subsequent write command having an identifier designating this write destination block.

The controller 4 transfers the 16K-byte data transferred from the host 2 to the NAND flash memory 5, and writes the 16K-byte data to the specific write destination block (Step B13).

The controller 4 determines whether or not this writing is successful (Step B14). In a case of an error (Step B14: NO), the controller 4 repeats the processing from Step B13. In a case of success (Step B14: YES), the processing proceeds to Step B15.

The controller 4 notifies the host 2 of an address in the specific write destination block allocated to a write destination of the 16K-byte data transferred from the host 2 (Step B15). Then, the controller 4 determines whether or not all write operations (write operations involving transferring the same data to the NAND flash memory 5 once or a plurality of times) for entire write data associated with one write command designating the specific write destination block are finished (Step B16).

When all the write operations for the entire write data associated with one write command designating the specific write destination block are finished, the controller 4 returns a response indicating command completion of this write command to the host 2 (Step B17). A transmission timing of a releasable notification relating to a region on the write data buffer 51 in which write data is stored to the host 2 will be described later.

A flowchart of FIG. 50 shows a process of transmitting processing of a releasable notification to the host 2 executed by the flash storage device 3.

First, the controller 4 determines whether or not all write operations for entire write data associated with one write command designating a specific write destination block are finished (Step C1). Secondly, the controller 4 determines whether or not there exists a read command for this write data (Step C2). Note that the processing of Step C1 and the processing of Step C2 are executed in parallel. Then, in a case where all the write operations for the entire write data associated with one write command designating a specific write destination block are finished (Step C1: YES), and there does not exist a read command for the write data (Step C2: NO), the controller 4 transmits a releasable notification relating to a region on the write data buffer 51 in which the write data is stored to the host 2 (Step C3).

A flowchart of FIG. 51 shows a process of write data discarding processing executed by the host 2.

The host 2 determines whether or not a response indicating command completion of a write command is received from the flash storage device 3 (Step D1). When receiving a response indicating command completion of a certain write command from the flash storage device 3 (Step D1: YES), the host 2 further determines whether or not a releasable notification relating to write data associated with this write command is received from the flash storage device 3 (Step D2). In a case where a releasable notification relating to the write data is received from the flash storage device 3 (Step D2: YES), the host 2 discards the write data associated with this write command from the write data buffer 51 (Step D3).

FIG. 52 shows dummy data write processing executed by the flash storage device 3 in a case where a next write command designating a certain write destination block is not received for a threshold period after a last write command designating the write destination block is received.

Data d1, data d2, data d3, and data d4 shown in the left part of FIG. 52 indicate four pieces of write data corresponding to four write commands designating the write destination block BLK #1. FIG. 52 assumes a case where each of the data d1, data d2, data d3, and data d4 has a size of 4K bytes.

(1) The controller 4 acquires, from the write data buffer 51 of the host 2, 16K-byte write data obtained by combining the data d1, the data d2, the data d3, and the data d4 with each other. Then, the controller 4 transfers the 16K-byte write data to the NAND flash memory 5 as data to be written to the page P0 of the write destination block BLK #1. When a subsequent write command designating the write destination block BLK #1 is not received for a threshold period after a last write command designating the write destination block BLK #1, that is, a write command requesting writing of the data d4 is received, the controller 4 writes dummy data in one or more pages in the write destination block BLK #1 so as to allow a response indicating command completion of the last write command to be returned to the host 2 within a predetermined period of time, and advances a position of a write destination page in the write destination block BLK #1 to which a next piece of write data is to be written. For example, the controller 4 transfers dummy data for three pages corresponding to the pages P1 to P3 to the NAND flash memory 5 page by page, and writes data for four pages (P0 to P3) to a plurality of memory cells connected to the word line WL0 of the write destination block BLK #1 by the foggy write operation.

(2) Next, the controller 4 transfers dummy data for four pages corresponding to the pages P4 to P7 to the NAND flash memory 5 page by page, and writes data for four pages (P4 to P7) to a plurality of memory cells connected to the word line WL1 of the write destination block BLK #1 by the foggy write operation.

(3) Next, the controller 4 transfers dummy data for four pages corresponding to the pages P8 to P11 to the NAND flash memory 5 page by page, and writes data for four pages (P8 to P11) to a plurality of memory cells connected to the word line WL2 of the write destination block BLK #1 by the foggy write operation.

(4) Next, the controller 4 transfers dummy data for four pages corresponding to the pages P12 to P15 to the NAND flash memory 5 page by page, and writes data for four pages (P12 to P15) to a plurality of memory cells connected to the word line WL3 of the write destination block BLK #1 by the foggy write operation.

(5) Next, the controller 4 transfers 16K-byte write data obtained by combining the data d1, the data d2, the data d3, and the data d4 with each other to the NAND flash memory 5 from the write data buffer 51 or the internal buffer 31, and further transfers dummy data for three pages (P0 to P3) that is the same as the dummy data for three pages (P0 to P3) used in the foggy write operation of WL0 to the NAND flash memory 5 page by page. Then, the controller 4 writes data for four pages (P0 to P3) to a plurality of memory cells connected to the word line WL0 of the write destination block BLK #1 by the fine write operation. In this manner, all the write operations in a plurality of stages of the data d1, the data d2, the data d3, and the data d4 are completed, and the data d1, the data d2, the data d3, and the data d4 become readable from the NAND flash memory 5. The controller 4 returns, to the host 2, a response indicating command completion of a first write command requesting writing of the data d1, a response indicating command completion of a second write command requesting writing of the data d2, a response indicating command completion of a third write command requesting writing of the data d3, and a response indicating command completion of a fourth write command requesting writing of the data d4.

In the present embodiment, write data is transferred from the host 2 to the flash storage device 3 in units of the same data size as the data write unit of the NAND flash memory 5, and at a time point at which all the write operations of an entire write data of a certain write command are finished, or at a time point at which all the write operations of the entire write data are finished and the entire write data becomes readable, a response indicating command completion of the write command is returned to the host 2. For this reason, in a case where, for example, a subsequent write command designating a certain write destination block is not issued from the host 2 for a while after a write command requesting small write data to be written to this write destination block is issued from the host 2 to the flash storage device 3, there is a possibility that a timeout error occurs for this write command. In the present embodiment, when a next write command having a certain block identifier is not received for a threshold period after a last write command having this block identifier is received from the host 2, the controller 4 writes dummy data to next one or more unwritten pages in a write destination block corresponding to this block identifier. Therefore, the write operation for the write destination block can be advanced as necessary, and it is possible to prevent occurrence of a timeout error for the write command.

A flowchart of FIG. 53 shows a process of dummy data write processing executed by the flash storage device 3. Here, assume that data is written to a write destination block by multi-stage write operations, such as foggy and fine write operations.

The controller 4 of the flash storage device 3 writes write data associated with a last write command designating a certain write destination block to this write destination block by a first-stage write operation such as the foggy write operation. When a next write command designating this write destination block is not received for a threshold period (Th) after this last write command is received (YES in Step S31), the controller 4 writes dummy data to one or more pages subsequent to a page in the write destination block to which write data associated with the last write command is written, and, in this manner, advances a position of a write destination page in the write destination block to which next write data is to be written (Step S32). When a position of a write destination page advances by writing the dummy data to this write destination block, and, in this manner, the fine write operation (second-stage write operation) becomes executable for the write data associated with the last write command, the controller 4 transfers again the write data associated with the last write command from the write data buffer 51 or the internal buffer (shared cache) 31 to the NAND flash memory 5 and executes the fine write operation for the write data (Step S33).

When the fine write operation for the write data associated with the last write command is finished, that is, when all of the multi-stage write operations for the entire write data are finished, the controller 4 returns a response indicating command completion of the last write command to the host 2 (Step S34).

As described above, in a case of writing write data to a write destination block by multi-stage write operations, the controller 4 writes dummy data to one or more pages in this write destination block and advances a position of a write destination page in this write destination block to which next write data is to be written, so that a second-stage write operation for write data associated with a last write command becomes executable.

FIG. 54 shows a data transfer operation executed by the controller 4 using the internal buffer (shared cache) 31.

The internal buffer (shared cache) 31 is shared by a plurality of write destination blocks BLK #1, BLK #2, . . . , BLK #n. The controller 4 of the flash storage device 3 executes processing described below for each of the write destination blocks BLK #1, BLK #2, . . . , BLK #n.

Hereinafter, the write destination block BLK #1 will be described by way of example.

After the controller 4 receives one or more write commands designating the write destination block BLK #1, the controller 4 acquires, from the write data buffer 51, write data having the same size as a write unit of the NAND flash memory 5 obtained by dividing write data associated with one write command designating the write destination block BLK #1 into a plurality pieces of write data, or combining write data associated with two or more write commands designating the write destination block BLK #1 with each other. Then, the controller 4 stores a plurality of pieces of write data each having the same size as the write unit of the NAND flash memory 5, which are acquired from the write data buffer 51, in the internal buffer (shared cache) 31.

The write data buffer 51 does not need to be configured with one continuous region on a host memory, and may be realized by, as shown in FIG. 54, a plurality of write data buffers 51-1, 51-2, . . . , 51-n.

The controller 4 acquires write data (first write data) to be written next to the write destination block BLK #1 from the internal buffer (shared cache) 31, transfers the first write data to the NAND flash memory 5, and writes the write data to the write destination block BLK #1 by a first-stage write operation such as the foggy write operation.

In order to efficiently store write data from the host 2 in the internal buffer (shared cache) 31, when the internal buffer (shared cache) 31 does not have an empty region for storing the write data acquired from the host 2, the controller 4 discards the write data (write data in a foggy state) in the internal buffer (shared cache) 31 for which the first-step write operation, such as the foggy write operation, has finished, so as to secure an empty region in the internal buffer (shared cache) 31.

For example, when receiving, from the host 2, a new write command designating an optional write destination block in a state where the internal buffer (shared cache) 31 does not have an empty region, the controller 4 may discard write data (write data in a foggy state) in the internal buffer (shared cache) 31 for which the first-step write operation, such as the foggy write operation, has finished, so as to secure an empty region, in which write data corresponding to the new write command can be stored, in the internal buffer (shared cache) 31.

For example, when receiving a new write command from the host 2 in a state where the entire internal buffer (shared cache) 31 is filled with a large amount of write data in a foggy state, the controller 4 may select a specific piece of write data to be discarded from the write data in a foggy state, and may discard the selected piece of write data. As a result, it is possible to efficiently share the internal buffer (shared cache) 31 having a limited capacity between a plurality of write destination blocks.

When the first write data does not exist in the internal buffer (shared cache) 31 at a time point at which the second-stage write operation, such as the fine write operation, for the first write data is to be executed, the controller 4 transmits a request (transfer request: DMA transfer request) for acquiring the first write data to the host 2 so as to acquire again the first write data from the write data buffer 51 of the host 2. The acquired first write data may be stored in the internal buffer (shared cache) 31. Then, the controller 4 transfers the acquired first write data to the NAND flash memory 5, and writes the first write data to the write destination block BLK #1 by a second-stage write operation such as the fine write operation.

When the first write data exists in the internal buffer (shared cache) 31 at a point at which the second-stage write operation such as the fine write operation, for the first write data is to be executed, the controller 4 acquires the first write data from the internal buffer (shared cache) 31, transfers the acquired first write data to the NAND flash memory 5, and writes the first write data to the write destination block BLK #1 by the second-stage write operation such as the fine write operation.

After performing final data transfer of the first write data to the NAND flash memory 5 (here, data transfer for the fine write operation), the controller 4 discards the first write data from the internal buffer (shared cache) 31, so as to secure an empty region in the internal buffer (shared cache) 31. Alternatively, the controller 4 may discard the first write data from the internal buffer (shared cache) 31 when the fine write operation of the first write data is finished.

Further, when the fine write operation of an entire write data associated with a certain write command is finished, or when the fine write operation of the entire write data is finished and the entire write data becomes readable from the NAND flash memory 5, the controller 4 returns a response indicating command completion of this write command to the host 2.

Although the internal buffer (shared cache) 31 has a limited capacity, if the number of write destination blocks is equal to or less than a certain number, probability (hit rate) that the first write data exists in the internal buffer (shared cache) 31 at a point at which a second-stage write operation is to be executed is comparatively high. Therefore, it is possible to execute multi-stage write operations, such as the foggy and fine write operations, without transferring the same write data from the host 2 to the flash storage device 3 a plurality of times. In this manner, data traffic between host 2 and the flash storage device 3 can be reduced. Accordingly, as compared with the case where the same write data is transferred from the host 2 to the flash storage device 3 a plurality of times each time data is written, I/O performance of the flash storage device 3 can be improved.

The number of write destination blocks may be the same as the number of clients using the host 2. In this case, data corresponding to a certain client is written to a write destination block corresponding to this client, and data corresponding to another client is written to another write destination block. Therefore, as the number of clients using the host 2 increases, a hit rate of the internal buffer (shared cache) 31 decreases. However, when the first write data does not exist in the internal buffer (shared cache) 31 (miss), the controller 4 acquires this first write data from the host 2. Therefore, even when the number of clients increases, it is possible to normally execute multi-stage write operations, such as the foggy and fine write operations.

Therefore, the flash storage device 3 can flexibly cope with an increase in the number of clients sharing the flash storage device 3 (that is, an increase in the number of write destination blocks that can be simultaneously used), and data traffic between the host 2 and the flash storage device 3 can be reduced.

Here, write processing for writing data to the write destination block BLK #1 has been described, but similar write processing is executed for each of all the other write destination blocks.

A flowchart of FIG. 55 shows a process of data write processing executed by the controller 4 using the internal buffer (shared cache) 31.

The controller 4 receives one or more write commands each including a data pointer, a length of write data, and an identifier (for example, a block address) designating any one of a plurality of write destination blocks from the host 2 (Step S101). After receiving one or more write commands designating the same write destination block, the controller 4 transfers, from the write data buffer 51 to the internal buffer (shared cache) 31, write data having the same size as a write unit of the NAND flash memory 5 obtained by dividing write data associated with one write command in these write commands into a plurality pieces of write data, or combining write data associated with two or more write commands having an identifier designating the same write destination block with each other (Step S102).

The controller 4 acquires write data to be written next to this write destination block from the internal buffer (shared cache) 31, transfers this write data to the NAND flash memory 5, and writes the first write data to the write destination block by the foggy write operation (Steps S103 and S104). When the NAND flash memory 5 is implemented as QLC-flash, write data for four pages is transferred to the NAND flash memory 5 page by page in Step S103, and write data of four pages is written to a plurality of memory cells connected to one word line to be written in this writing destination block by the foggy write operation in Step S104.

Note that transfer of write data from the write data buffer 51 to the internal buffer (shared cache) 31 is executed in accordance with progress of the write operation for each write destination block. For example, when an operation of transferring write data to be written to a certain page of a certain write destination block to a NAND flash memory chip is finished, write data to be written to a next page of this write destination block may be transferred from the write data buffer 51 to the internal buffer (shared cache) 31. Alternatively, when an operation of transferring write data to be written to a certain page of a certain write destination block to a NAND flash memory chip including this write destination block is finished, and an operation of writing the write data to this write destination block is finished, write data to be written to a next page of this write destination block may be transferred from the write data buffer 51 to the internal buffer (shared cache) 31.

At a time point at which the fine write operation for write data for which the foggy write operation has been performed is to be started, the controller 4 determines whether or not the write data exists in the internal buffer (shared cache) 31.

If this write data exists in the internal buffer (shared cache) 31 (YES in Step S106), the controller 4 acquires the write data from the internal buffer (shared cache) 31, transfers the write data to the NAND flash memory 5, and writes the write data to this write destination block by the fine write operation (Steps S107, S108, and S109). In this manner, the write data becomes readable from the NAND flash memory 5.

The controller 4 determines, for each write command, whether or not the foggy and fine write operations for the entire write data are finished and the entire write data has become readable from the NAND flash memory 5. Then, the controller 4 returns, to the host 2, a response indicating command completion of the write command corresponding to the write data, for which the foggy and fine write operations have finished, that has become readable from the NAND flash memory 5 (Step S110). If the fine write operation for the entire write data associated with a certain write command is finished by the processing of Step S109, a response indicating command completion of this write command may be returned to the host 2 in Step S110.

A flowchart of FIG. 56 shows a process of data read processing executed by the controller 4. Here, the flash storage device 3 is assumed to include a mechanism that, when a read command for data in write data existing in the write data buffer 51 of the host 2 is received from the host 2, does not allow transmission of a releasable notification for a region in which the data is stored to the host 2 until the read command is finished.

As described above, when data designated by a read command received from the host 2 is data for which not all of the write operations (write operations for transferring the same data to the NAND flash memory 5 once or a plurality of times) have finished, or data for which all of the write operations have finished but is yet to be readable from the NAND flash memory 5, the controller 4 determines whether or not the data exists in the internal buffer (shared cache) 31. When the data does not exist in the internal buffer (shared cache) 31, the controller 4 acquires the data from the write data buffer 51, stores the data in the internal buffer (shared cache) 31, and returns the data from the internal buffer (shared cache) 31 to the host 2.

Specifically, data read processing described below is executed.

When the controller 4 receives a read command from the host 2 (Step E1: YES), the controller 4 determines whether or not data designated by the read command is data for which all write operations are finished, and readable from the NAND flash memory 5 (Step E2).

If this data is readable from the NAND flash memory 5 (Step E2: YES), the controller 4 reads the data from the NAND flash memory 5 and returns the read data to the host 2 (Step E3). In Step E3, the controller 4 transfers the read data to a position in the read data buffer 53 designated by a data pointer included in the read command.

If the data is not readable from the NAND flash memory 5 (Step E2: NO), the controller 4 first sets a state in which transmission of a releasable notification to the host 2 is prohibited, so that data on the write data buffer 51 is not discarded (Step E5). Then, the controller 4 determines whether or not the data exists in the internal buffer (shared cache) 31 (Step E5).

If the data exists in the internal buffer (shared cache) 31 (Step E5: YES), the controller 4 reads the data from the internal buffer (shared cache) 31 and returns the read data to the host 2 (Step E6).

In Step E6, the controller 4 transfers the read data to a position in the read data buffer 53 designated by the data pointer included in the read command.

If the data does not exist in the internal buffer (shared cache) 31 (Step E5: NO), the controller 4 acquires the data from the write data buffer 51 and stores the data in the internal buffer (shared cache) 31 (Step E7). In Step E7, the data is transferred from the write data buffer 51 to an empty region in the internal buffer (shared cache) 31 by the DMAC 15. When there is no empty region in the internal buffer (shared cache) 31, processing of securing an empty region in the internal buffer (shared cache) 31 is executed. Then, the controller 4 reads the data from the internal buffer (shared cache) 31, and returns the read data to the host 2 (Step E6). In Step E6, the controller 4 transfers the read data to a position in the read data buffer 53 designated by the data pointer included in the read command. Then, the controller 4 releases the state which is set in Step E4 and in which transmission of a releasable notification to the host 2 is prohibited (Step E8).

FIG. 57 shows a block reuse command applied to the flash storage device 3.

The block reuse command is a command (block release request) for requesting the flash storage device 3 to return an allocated block, which becomes unnecessary due to reasons that, for example, only invalid data or unnecessary data is stored, to a free block. The block reuse command includes a QoS domain ID designating a QoS domain and a block address designating a block to be converted to a free block (released).

Further, FIG. 58 shows another example of a write command applied to the flash storage device 3. Specifically, while the write command shown in FIG. 8 is applied in the case where the flash storage device 3 is implemented as the type #1-storage device, the write command shown in FIG. 58 is applied to a case where the flash storage device 3 is implemented as the type #2-storage device. Hatching applied in FIG. 58 shows a difference from FIG. 8.

The write command is a command for requesting the flash storage device 3 to write data. The write command may include a command ID, a QoS domain ID, a logical address, a length, and the like.

The command ID is an ID (command code) indicating that this command is a write command, and the write command includes a command ID for a write command.

The QoS domain ID is an identifier by which a QoS domain to which data is to be written is uniquely identifiable. A write command transmitted from the host 2 in response to a write request from an end user may include a QoS domain ID designating a QoS domain corresponding to this end user. A namespace ID may be handled as a QoS domain ID.

The logical address is an identifier for identifying write data to be written. As described above, this logical address may be an LBA or a key of a key value store. When the logical address is an LBA, a logical address (start LBA) included in this write command indicates a logical position (first logical position) at which the write data is to be written.

The length indicates a length of write data to be written. This length (data length) may be designated by the number of granularity (Grain), may be designated by the number of LBAs, or may have its size designated by byte.

As described above, the controller 4 can classify a large number of blocks in the NAND flash memory 5 into a plurality of groups (a plurality of QoS domains) so that each of a large number of blocks in the NAND flash memory 5 belongs to only one group. Then, the controller 4 can manage a free block list (free block pool) and an active block list (active block pool) for each group (QoS domain).

States of blocks are roughly classified into an active block storing valid data and a free block not storing valid data. Each block which is an active block is managed by an active block list. On the other hand, each block which is a free block is managed by a free block list.

When receiving a write command from the host 2, the controller 4 determines a block (write destination block) to which data from the host 2 is to be written and a position (write destination position) in the write destination block. The controller 4 may determine one of free block groups belonging to a QoS domain corresponding to a QoS domain ID as a write destination block. The writing destination position is determined in consideration of restriction on page write order, a bad page, and the like. Then, the controller 4 writes the data from the host 2 to the write destination position in the write destination block.

Note that, when the entire write destination block is filled with user data, the controller 4 moves the write destination block to an active block list (active block pool). Then, the controller 4 again selects a free block from a free block list corresponding to this QoS domain, and allocates the selected free block as a new write destination block.

When the number of remaining free blocks managed by a free block list becomes smaller than a threshold value determined by a predetermined policy, or when there is an instruction to perform garbage collection from the host 2, the controller 4 may start garbage collection of this QoS domain.

In the garbage collection of this QoS domain, the controller 4 selects a copy source block (GC source block) and a copy destination block (GC destination block) from an active block group corresponding to this QoS domain. Which block is selected as a GC candidate (copy source block) may be determined according to the above policy designated by the host 2, or may be designated by the host 2. In a case where selection is made based also on the policy, for example, a block having a smallest valid data amount may be selected as a GC candidate (copy source block).

FIG. 59 shows a response to the write command of FIG. 58. Hatching applied in FIG. 59 also shows a difference from FIG. 9.

This response includes a logical address, a physical address, and a length.

The logical address is the logical address included in the write command of FIG. 7.

The physical address indicates a physical storage position in the NAND flash memory 5 at which data is written according to the write command in FIG. 7. In the present embodiment, this physical address is not a combination of a block number and a page number, but is designated by a combination of a block number and an offset (in-block offset) as described above. The block number is an identifier by which any one of all blocks in the flash storage device 3 is uniquely identifiable. If different block numbers are assigned to all blocks, these block numbers may be directly used. Alternatively, the block number may be expressed by a combination of a die number and an in-die block number. The length indicates a length of write data to be written. This length (data length) may be designated by the number of granularity (Grain), may be designated by the number of LBAs, or may have its size designated by byte.

FIG. 60 shows another example of a sequence of the write operation processing executed by the host 2 and the flash storage device 3. Specifically, while the sequence shown in FIG. 25 is for the case where the flash storage device 3 is implemented as the type #1-storage device, the sequence shown in FIG. 60 is for the flash storage device 3 implemented as the type #2-storage device.

The host 2 transmits a write command including the QoS domain ID, an LBA, and a length to the flash storage device 3. When the controller 4 of the flash storage device 3 receives this write command, the controller 4 determines a write destination block to which write data from the host 2 is to be written and a position in the write destination block. More specifically, the controller 4 selects one free block from a free block list and allocates the selected free block as a write destination block (Step S11). That is, the selected free block and an available first page in the selected free block are determined as a write destination block to which the write data from the host 2 is to be written and a position in the write destination block. If the write destination block has already been allocated, there is no need to execute the write destination block allocation processing in Step 12. An available next page in the write destination block that has already been allocated is determined as a position in the write destination block to which the write data from the host 2 is to be written.

The controller 4 may manage a plurality of free block lists corresponding to a plurality of QoS domains. In a free block list corresponding to a certain QoS domain, only a block group reserved for this QoS domain is registered. In this case, in Step S12, the controller 4 may select a free block list corresponding to a QoS domain designated by a QoS domain ID of the write command, select one free block from the selected free block list, and allocate the selected free block as a write destination block. In this manner, it is possible to prevent data corresponding to different QoS domains from coexisting in the same block.

The controller 4 writes write data received from the host 2 to the write destination block (Step S12). In Step S12, the controller 4 writes both the logical address (LBA in this case) and the write data to the write destination block.

The controller 4 updates the block management table 32 to change a bitmap flag corresponding to the written data (that is, a bitmap flag corresponding to the physical address of the physical storage position at which the data is written) from 0 to 1 (Step S13). For example, as shown in FIG. 26, assume that 16K-byte update data whose start LBA is LBAx is written at a physical storage position corresponding to offsets +4 to +7 of the block BLK #1. In this case, as shown in FIG. 27, in a block management table for the block BLK #1, each of the bit map flags corresponding to the offsets +4 to +7 is changed from 0 to 1.

The controller 4 returns a response to this write command to the host 2 (Step S14). For example, as shown in FIG. 26, if 16K-byte update data whose start LBA is LBAx is written to physical storage positions corresponding to offsets +4 to +7 of the block BLK #1, a response including the LBAx, a block number (=BLK1), an offset (=+4), and a length (=4) is transmitted from the controller 4 to the host 2.

When the host 2 receives this response, the host 2 updates an LUT managed by the host 2, and maps a physical address to each logical address corresponding to the written write data. As shown in FIG. 28, an LUT includes a plurality of entries corresponding to a plurality of logical addresses (for example, LBAs). In an entry corresponding to a certain logical address (for example, a certain LBA), a physical address PBA indicating a position (physical storage position) in the NAND flash memory 5 in which data corresponding to this LBA is stored, that is, a block number and an offset (in-block offset), is stored. As shown in FIG. 26, if 16K-byte update data whose start LBA is LBAx is written to a physical storage position corresponding to offsets +4 to +7 of the block BLK #1, the LUT is updated as shown in FIG. 28, and BLK #1 and the offset +4 are stored in an entry corresponding to LBAx, BLK #1 and the offset +5 are stored in an entry corresponding to LBAx+1, BLK #1 and the offset +6 are stored in an entry corresponding to LBAx+2, and BLK #1 and the offset +7 are stored in an entry corresponding to LBAx+3.

After the above, the host 2 transmits, to the flash storage device 3, a Trim command for invalidating previous data which has become unnecessary by writing the above-mentioned update data (Step S21). In a case where previous data is stored at positions corresponding to the offset +0, the offset +1, the offset +2, and the offset +3 of a block BLK #0 as shown in FIG. 26, a Trim command designating a block number (=BLK #0), an offset (=+0), and a length (=4) is transmitted from the host 2 to the flash storage device 3 as shown in FIG. 29. In response to this Trim command, the controller 4 of the flash storage device 3 updates the block management table 32 (Step S15). In Step S15, as shown in FIG. 29, in a block management table for the block BLK #0, each of bit map flags corresponding to offsets +0 to +3 is changed from 1 to 0.

FIG. 61 shows another example of a GC control command applied to the flash storage device 3. Specifically, while the GC control command shown in FIG. 34 is applied in the case where the flash storage device 3 is implemented as the type #1-storage device, the GC control command shown in FIG. 61 is applied to a case where the flash storage device 3 is implemented as the type #2-storage device. Hatching applied in FIG. 61 shows a difference from FIG. 34.

The GC control command may include a command ID, a policy, a source QoS domain ID, a destination QoS domain ID, and the like.

The command ID is an ID (command code) indicating that this command is a GC control command, and the GC control command includes a command ID for the GC control command.

The policy is a parameter that designates a condition (GC policy) for selecting a GC candidate block (GC source block).

The controller 4 of the flash storage device 3 supports a plurality of GC policies.

The GC policy supported by the controller 4 may include a policy (Greedy) of preferentially selecting a block having a small valid data amount as a GC candidate block (GC source block).

Further, a GC policy supported by the controller 4 may include a policy of preferentially selecting, as a GC candidate block (GC source block), a block in which data having a low update frequency (cold data) is gathered, rather than a block in which data having a high update frequency (hot data) is gathered.

Moreover, the GC policy may designate a GC start condition. For example, the GC start condition may indicate the number of remaining free blocks.

The controller 4 manages a block group including valid data by an active block list, and, when executing GC, selects one or more GC candidate blocks (GC source blocks) from the block group managed by the active block list based on a GC policy designated by a GC control command.

The QoS domain ID is a parameter that designates a QoS domain for which GC is to be executed. The controller 4 selects one or more GC candidate blocks (GC source blocks) from a block group belonging to a QoS domain designated by a QoS domain ID, that is, an active block list corresponding to this QoS domain. Further, the controller 4 selects one or more free blocks in a free block group belonging to the QoS domain designated by the QoS domain ID as a GC destination block.

The controller 4 may start GC when the number of remaining free blocks corresponding to the QoS domain becomes smaller than or equal to a threshold value designated by a policy. If a GC control command including a policy designating forced execution of GC is received, the controller 4 may immediately start GC when receiving this GC control command from the host 2.

FIG. 62 shows another example of a process of garbage collection (GC) operation. Specifically, while the process shown in FIG. 36 is for the case where the flash storage device 3 is implemented as the type #1-storage device, the process shown in FIG. 62 is for the flash storage device 3 implemented as the type #2-storage device. Hatching applied in FIG. 62 shows a difference from FIG. 36.

The controller 4 of the flash storage device 3 selects one or more GC source blocks (copy source blocks) in which valid data and invalid data coexist from a block group belonging to a QoS domain designated by a QoS domain ID based on a policy designated by the host 2 (Step S41). Next, the controller 4 selects one or more free blocks from a free block group belonging to the QoS domain designated by the QoS domain ID, and allocates the selected free block as a GC destination block (copy destination block) (Step S42).

The controller 4 copies all valid data in the GC source block (copy source block) to the GC destination block (copy destination block) (Step S44). In Step S44, the controller 4 copies not only valid data in the GC source block (copy source block) but also both the valid data and a logical address corresponding to the valid data from the GC source block (copy source block) to the GC destination block (copy destination block). As a result, a pair of data and a logical address is held in the GC destination block (copy destination block).

Then, the controller 4 notifies, by using a GC callback command, the host 2 of the logical address of the copied valid data and a destination physical address (block number, offset (in-block offset)) indicating a position in the GC destination block (copy destination block) to which the valid data is copied (Step S44). In Step S44, the controller 4 may notify the host 2 of not only the logical address of the copied valid data and the destination physical address, but also a source physical address.

When the host 2 receives the GC callback command, the host 2 updates an LUT managed by the host 2, and maps a destination physical address to each logical address corresponding to the copied valid data (Step S51).

Flowcharts of FIGS. 63 and 64 show a process of allocation of a free block in a case where the flash storage device 3 includes a mechanism of separating blocks into a block to which data from the host 2 is to be written and a block to which data in the flash storage device 3 is to be copied.

The process shown in FIG. 63 is a process of allocating a free block in Step S11 (allocation of a write destination block) in the sequence of the write operation processing shown in FIG. 60. The controller 4 of the flash storage device 3 determines whether or not a block (write destination block) to which write data from the host 2 is to be written is allocated (Step F1). Even when a block including an empty page is allocated, if the block is a block to which data in the flash storage device 3 is to be copied, the controller 4 determines that a block to which write data from the host 2 is to be written is not allocated. For example, this determination is executed based on attribute information indicating use of a block, which is held as metadata of the block.

In a case where it is determined that a block to which the write data from the host 2 is to be written is not allocated (Step F1: NO), the controller 4 allocates one free block in a free block group shared between QoS domains in the same virtual storage device as a block to which the write data from the host 2 is to be written (Step F2), for example. At this time, the controller 4 records attribute information indicating that it is a block to which write data from the host 2 is to be written as metadata of the block or the like.

On the other hand, the process shown in FIG. 64 is a process of allocating a free block in Step S42 (allocation of a GC destination block) in the process of the garbage collection (GC) operation shown in FIG. 62.

The controller 4 of the flash storage device 3 determines whether or not a block (GC destination block) to which valid data in a GC source block (copy source block) is to be copied, that is, a block to which data in the flash storage device 3 is to be copied is allocated (Step F11). Even when a block including an empty page is allocated, if the block is a block to which write data from the host 2 is to be written, the controller 4 determines that a block to which data in the flash storage device 3 is to be copied is not allocated.

In a case where it is determined that a block to which data in the flash storage device 3 is to be copied is not allocated (Step F11: NO), the controller 4 allocates one free block in a free block group shared between QoS domains in the same virtual storage device as a block to which data in the flash storage device 3 is to be copied (Step F12), for example. At this time, the controller 4 records attribute information indicating that it is a block to which data in the flash storage device 3 is to be copied as metadata of this block or the like.

As described above, according to the flash storage device 3 of the present embodiment, improvement in I/O performance can be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system connectable to a host, comprising:
a nonvolatile memory including a plurality of blocks, each of the plurality of blocks being a unit of a data erase operation, the plurality of blocks including at least a first block; and
a controller electrically coupled to the nonvolatile memory and configured to:
in response to receiving, from the host, a first command for changing a state of the first block from a first state to a second state, the first state being a state in which the host can designate the first block as a write destination, the second state being a state in which the host cannot designate the first block as the write destination and cannot read any valid data from the first block, determine whether a read operation to the first block is pending or not; and in a case where the read operation to the first block is pending, suspend to change the state of the first block from the first state to the second state until the read operation to the first block is finished.

2. The memory system of claim 1, wherein the controller is further configured to change the state of the first block from the first state to the second state after the read operation to the first block is finished.

3. The memory system of claim 1, wherein the controller is further configured to, in response to receiving the first command while the read operation to the first block is pending, notify the host of an error to the first command.

4. The memory system of claim 1, wherein the controller is further configured to:

manage a counter for the first block, the counter showing the number of pending read operations to the first block; and determine, based on a value of the counter, whether the read operation to the first block is pending or not.

5. The memory system of claim 1, wherein the controller is further configured to:

manage a queue for storing a plurality of commands that are to be transmitted to the nonvolatile memory; and determine, by searching the queue, whether the read operation to the first block is pending or not.

6. The memory system of claim 1, wherein the controller is further configured to, in response to receiving, from the host, a second command for allocating the first block to the host, change the state of the first block from the second state to the first state.

7. The memory system of claim 1, wherein the read operation to the first block is pending when the read operation to the first block is not yet started to be executed or the read operation to the first block is being executed.

8. The memory system of claim 1, wherein the controller is configured to, in response to receiving, from the host, a third command for reading data from the nonvolatile memory, execute the read operation to the first block.

9. The memory system of claim 1, wherein the controller is configured to execute the read operation to the first block for a garbage collection.

10. The memory system of claim 1, wherein the controller is further configured to:

manage a plurality of block groups each including at least two of the plurality of blocks; and in response to receiving, from the host, the first command that designates one of the plurality of block groups, determine the first block from among the at least two of the plurality of blocks included in the one of the plurality of block groups, as a target of changing the state.

11. A method of controlling a nonvolatile memory that includes a plurality of blocks, each of the plurality of blocks being a unit of a data erase operation, the plurality of blocks including at least a first block, the method comprising:

in response to receiving, from a host, a first command for changing a state of the first block from a first state to a second state, the first state being a state in which the host can designate the first block as a write destination, the second state being a state in which the host cannot designate the first block as the write destination and cannot read any valid data from the first block, determining that a read operation to the first block is pending; and in response to determining that the read operation to the first block is pending, suspending to change the state of the first block from the first state to the second state until the read operation to the first block is finished.

12. The method of claim 11, further comprising:

changing the state of the first block from the first state to the second state after the read operation to the first block is finished.

13. The method of claim 11, wherein the first command is received while the read operation to the first block is pending, and the method further comprises:

in response to receiving the first command while the read operation to the first block is pending, notifying the host of an error to the first command.

14. The method of claim 11, further comprising:

managing a counter for the first block, the counter showing the number of pending read operations to the first block, wherein whether the read operation to the first block is pending or not is determined based on a value of the counter.

15. The method of claim 11, further comprising:

managing a queue for storing a plurality of commands that are to be transmitted to the nonvolatile memory, wherein whether the read operation to the first block is pending or not is determined by searching the queue.

16. The method of claim 11, further comprising:

receiving, from the host, a second command for allocating the first block to the host; and in response to receiving the second command, changing the state of the first block from the second state to the first state.

17. The method of claim 11, wherein the read operation to the first block is pending when the read operation to the first block is not yet started to be executed or the read operation to the first block is being executed.

18. The method of claim 11, further comprising:

receiving, from the host, a third command for reading data from the nonvolatile memory, wherein the read operation to the first block is executed in response to receiving the third command.

19. The method of claim 11, wherein the read operation to the first block is executed for a garbage collection.

20. The method of claim 11, further comprising:

managing a plurality of block groups each including at least two of the plurality of blocks; and in response to receiving, from the host, the first command that designates one of the plurality of block groups, determining the first block from among the at least two of the plurality of blocks included in the one of the plurality of block groups, as a target of changing the state.

* * * * *